US012273702B2

(12) United States Patent
Brown et al.

(10) Patent No.: US 12,273,702 B2
(45) Date of Patent: Apr. 8, 2025

(54) HEADTRACKING FOR PRE-RENDERED BINAURAL AUDIO

(71) Applicant: Dolby Laboratories Licensing Corporation, San Francisco, CA (US)

(72) Inventors: C. Phillip Brown, Castro Valley, CA (US); Joshua Brandon Lando, San Francisco, CA (US); Mark F. Davis, Pacifica, CA (US); Alan J. Seefeldt, Alameda, CA (US); David Matthew Cooper, Carlton (AU); Dirk Jeroen Breebaart, Ultimo (AU); Rhonda Wilson, San Francisco, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 227 days.

(21) Appl. No.: 18/060,232

(22) Filed: Nov. 30, 2022

(65) Prior Publication Data

US 2023/0091218 A1 Mar. 23, 2023

Related U.S. Application Data

(63) Continuation of application No. 17/167,442, filed on Feb. 4, 2021, now Pat. No. 11,553,296, which is a (Continued)

(30) Foreign Application Priority Data

Jun. 21, 2016 (EP) .................................... 16175495

(51) Int. Cl.
*H04S 7/00* (2006.01)

(52) U.S. Cl.
CPC .......... *H04S 7/304* (2013.01); *H04S 2420/01* (2013.01); *H04S 2420/03* (2013.01)

(58) Field of Classification Search
CPC ... H04S 2420/03; H04S 2420/01; H04S 7/304
See application file for complete search history.

(56) References Cited

U.S. PATENT DOCUMENTS

| | | | |
|---|---|---|---|
| 4,060,696 | A | 11/1977 | Iwahara |
| 5,917,916 | A | 6/1999 | Sibbald |

(Continued)

FOREIGN PATENT DOCUMENTS

| | | |
|---|---|---|
| AU | 20130263871 | 1/2014 |
| CN | 102597987 | 7/2012 |

(Continued)

OTHER PUBLICATIONS

Algazi, V. Ralph, et al."Effective Use of Psychoacoustics in Motion-Tracked Binaural Audio" IEEE International Symposium on Multimedia, Dec. 15, 2008.

(Continued)

*Primary Examiner* — Jason R Kurr

(57) ABSTRACT

A system and method of modifying a binaural signal using headtracking information. The system calculates a delay, a first filter response, and a second filter response, and applies these to the left and right components of the binaural signal according to the headtracking information. The system may also apply headtracking to parametric binaural signals. In this manner, headtracking may be applied to pre-rendered binaural audio.

6 Claims, 29 Drawing Sheets

Related U.S. Application Data continuation of application No. 16/309,578, filed as application No. PCT/US2017/038372 on Jun. 20, 2017, now Pat. No. 10,932,082.

(60) Provisional application No. 62/405,677, filed on Oct. 7, 2016, provisional application No. 62/352,685, filed on Jun. 21, 2016.

(56) References Cited

U.S. PATENT DOCUMENTS

| | | | | |
|---|---|---|---|---|
| 6,108,430 | A * | 8/2000 | Kurisu | H04S 7/304 381/74 |
| 6,243,476 | B1 | 6/2001 | Gardner | |
| 6,259,795 | B1 | 7/2001 | McGrath | |
| 6,442,277 | B1 | 8/2002 | Lueck | |
| 8,229,143 | B2 | 7/2012 | Bharitkar | |
| 8,917,916 | B2 | 12/2014 | Martin | |
| 9,191,733 | B2 * | 11/2015 | Yamada | H04R 3/12 |
| 9,237,398 | B1 | 1/2016 | Algazi | |
| 11,032,660 | B2 * | 6/2021 | Schaefer | H04S 3/008 |
| 2002/0025054 | A1 * | 2/2002 | Yamada | H04R 3/12 381/310 |
| 2002/0151996 | A1 | 10/2002 | Wilcock | |
| 2003/0076973 | A1 | 4/2003 | Yamada | |
| 2003/0210800 | A1 | 11/2003 | Yamada | |
| 2006/0045294 | A1 | 3/2006 | Smyth | |
| 2006/0062410 | A1 | 3/2006 | Kim | |
| 2008/0008327 | A1 | 1/2008 | Ojala | |
| 2008/0008342 | A1 | 1/2008 | Sauk | |
| 2008/0031462 | A1 | 2/2008 | Walsh | |
| 2008/0056517 | A1 | 3/2008 | Algazi | |
| 2008/0298610 | A1 | 12/2008 | Virolainen | |
| 2010/0328423 | A1 | 12/2010 | Etter | |
| 2011/0268281 | A1 | 11/2011 | Florencio | |
| 2011/0286614 | A1 | 11/2011 | Hess | |
| 2013/0064375 | A1 | 3/2013 | Atkins | |
| 2014/0064526 | A1 | 3/2014 | Otto | |
| 2015/0304791 | A1 | 10/2015 | Crockett | |
| 2015/0382130 | A1 | 12/2015 | Connor | |
| 2016/0269849 | A1 | 9/2016 | Riggs | |
| 2017/0295446 | A1 | 10/2017 | Thagadur Shivappa | |
| 2017/0353812 | A1 | 12/2017 | Schaefer | |

FOREIGN PATENT DOCUMENTS

| | | |
|---|---|---|
| CN | 104919820 | 9/2015 |
| EP | 0438281 | 7/1991 |
| EP | 0762803 | 3/1997 |
| EP | 2357854 | 8/2011 |
| JP | 2007006432 | 1/2007 |
| JP | 2012070135 | 4/2012 |
| JP | 2012151529 | 8/2012 |
| WO | 1997037514 | 10/1997 |
| WO | 9951063 | 10/1999 |
| WO | 2004039123 | 5/2004 |
| WO | 2006024850 | 3/2006 |
| WO | 2007110087 | 10/2007 |
| WO | 2007112756 | 10/2007 |
| WO | 2008006938 | 1/2008 |
| WO | 2009046223 | 4/2009 |
| WO | 2010036321 | 4/2010 |
| WO | 2010141371 | 12/2010 |
| WO | 2011135283 | 11/2011 |
| WO | 2013181172 | 12/2013 |
| WO | 2014035728 | 3/2014 |
| WO | 2014145133 | 9/2014 |
| WO | 2014194088 | 12/2014 |
| WO | 2015066062 | 5/2015 |
| WO | 2015108824 | 7/2015 |

OTHER PUBLICATIONS

Algazi, V. Ralph, et al "High-Frequency Interpolation for Motion-Tracked Binaural Sound" AES Convention 121, Oct. 2006.
Algazi, V. Ralph, et al "Motion-Tracked Binaural Sound for Personal Music Players" AES Presented at the 119th Convention, Oct. 7-10, 2005, New York, USA, pp. 1-8.
Algazi, V. Ralph, et al "Motion-Tracked Binaural Sound" Journal of the Audio Engineering Society, Nov. 1, 2004, pp. 1142-1156.
Avendano, C. et al., "Ambience extraction and synthesis from stereo signals for multi-channel audio up-mix", 2002 IEEE International Conference on Acoustics, Speech, and Signal Processing Year : 2002, vol. 2, pp. II-1957-II-1960.
Breebaart, j. et al "Parametric binaural synthesis: background, applications and standards", in Proceedings of the NAG-DAGA (2009).
C.P. Brown and R.O. Duda, "A Structural Model for Binaural Sound Synthesis", in IEEE Transactions on Speech and Audio Processing, 6(5):476-488 (Sep. 1998).
Delikaris-Manias, S., "Binaural Reproduction Over Loudspeakers Using In-situ Measurements of Real Rooms—A Feasibility Study", AES Conference:35th International Conference: Audio for Games (Feb. 2009).
Edgar Y, C., "Optimal crosstalk cancellation for binaural audio with two loudspeakers", Princeton University, BACCH Paper.
Faller, C. et al "Binaural Audio with Relative and Pseudo Head Tracking" AES Convention, 138, May 2015, pp. 1-8.
Hess, Wolfgang "Head-Tracking Techniques for Virtual Acoustics Applications" AES Convention Paper 8782 presented at the 133rd Convention, Oct. 26-29, 2012, pp. 1-15.
Huang, Y. et al., "On crosstalk cancellation and equalization with multiple loudspeakers for 3-D sound reproduction", IEEE Signal Processing Letters Year: 2007, vol. 14, Issue: 10, pp. 649-652.
Julia Jakka, "Binaural to Multichannel Audio Upmix", Master's Thesis (Helsinki University of Technology, 2005).
Laitinen, Mikko-Ville, et al "Influence of Resolution of Head Tracking in Synthesis of Binaural Audio" AES presented at the 132nd Convention, Apr. 26-29, 2012, Budapest, Hungary, pp. 1-8.
Lopez, J. et al., "Experimental evaluation of cross- talk cancellation regarding loudspeakers angle of listening", IEEE Signal Processing Letters 8.1 (Feb. 20, 2001): 13-15.
Lopez, J. et al., "Modeling and Measurement of Cross-talk Cancellation Zones for Small Displacements of the Listener in Transaural Sound Reproduction with Different Loudspeaker arrangements", AES Convention: 109 (Sep. 2000) Paper No. 5267.
Lord Rayleigh, "On Our Perception of Sound Direction", in Philosophical Magazine, 13:214-232 (J.W. Strutt, 1907).
Mannerheim, P. et al "Image Processing Algorithms for Listener Head Tracking in Virtual Acoustics" Institute of Acoustics Spring Conference Futures in Acoustics, Dec. 1, 2006, pp. 114-123.
Mannerheim, P. et al., "Virtual Sound Imaging Using Visually Adaptive Loudspeakers", Acta Acustica United With Acustica 94.6 (Nov 2008-Dec. 2008): 1024-1039.
Matsui, K., "Binaural Reproduction over Loudspeakers Using Low-Order Modeled HRTFs", AES Convention:137 (Oct. 2014) Paper No. 9128.
McKeag, Adam et al "Sound Field Format to Binaural Decoder with Head Tracking" AES Convention, Aug. 1, 1996.
Melick, J.B. "Customization for Personalized Rendering of Motion-Tracked Binaural Sound" AES Convention Paper 6225, presented at the 117th Convention, Oct. 28-31, 2004, San Francisco, CA USA.
Myung-Suk, S. et al., "Enhanced Binaural Loudspeaker Audio System with Room Modeling", Oct. 2010.
Nawfal, I. et al., "Perceptual Evaluation of Loudspeaker Binaural Rendering Using a Linear Array", AES Convention:137(Oct. 2014) Paper No. 9151.
Papadopoulos, T. et al., "Inverse Filtering for Binaural Audio Reproduction Using Loudspeakers—Potential and Limitations", Proceedings—Institute of Acoustics, 30.2 (2008) p. 45.
Parodi, Y. et al "A Subjective Evaluation of the Minimum Channel Separation for Reproducing Binaural Signals Over Loudspeakers" JAES vol. 59 Issue 7/8, pp. 487-497, Jul. 2011.

(56) References Cited

OTHER PUBLICATIONS

Parodi, Y., "A Subjective Evaluation of the Minimum Audible Channel Separation in Binaural Reproduction Systems through Loudspeakers", AES Convention: 128 (May 2010) Paper No. 8104.

R.S. Woodworth and G. Schlosberg, Experimental Psychology, pp. 349-361 (Holt Rinehard and Winston, New York, 1954).

Rao, H., et al., "A joint minimax approach for binaural rendering of audio through loudspeakers", ICASSP, IEEE International Conference on Acoustics, Speech and Signal Processing—Proceedings 1 (Aug. 20, 2007): I173-I176.

Saebo, Asbjorn "Effect of Early Reflections in Binaural Systems with Loudspeaker Reproduction" Proc. 1999 IEEE workshop on Applications of Signal Processing to Audio and Acoustics, New Paltz, New York, Oct. 17-20, 1999, pp. W991-W994.

Schulein, B. et al., "The Design, Calibration, and Validation of a Binaural Recording and playback system for Headphone and Two-speaker 3D-Audio Reproduction", AES Convention: 137 (Oct. 2014) Paper No. 9130.

Shoji, Seiichiro "Efficient Individualisation of Binaural Audio Signals" The University of York, 2007.

Sugaya, M. et al., "Method of designing inverse system for binaural reproduction over loudspeakers by using diagonalization method", 2015 IEEE Conference on Control Applications (CCA). Proceedings (2015): 1032-7;609.

Takeuchi, T. "Optimal Source Distribution for Binaural Synthesis Over Loudspeakers" Journal of the Acoustical Society of America, 112.6, Dec. 2002, pp. 2786-2797.

Tikander, M. "Acoustic Positioning and Head Tracking Based on Binaural Signals" AES Convention, May 2004, pp. 1-10.

Vinton, M. et al "Next Generation Surround Decoding and Upmixing for Consumer and Professional Applications", AES 57th International Conference (Mar. 6-8, 2015).

Winter, et al "Localization Properties of Data-Based Binaural Synthesis Including Translatory Head-Movements" University of Rostock, Jan. 1, 2014.

Zhang, C. et al "Dynamic Binaural Reproduction of 5.1 Channel Surround Sound with Low Cost Head-Tracking Module" AES Conference 55th International Conference, Aug. 2014.

Zotkin, D.N. "Efficient Conversion of X.Y Surround Sound Content to Binaural Head-Tracked Form for HRTF-Enabled Playback" IEEE International Conference on Acoustics, Speech, and Signal Processing, Apr. 15-20, 2007.

* cited by examiner

Listening Environment 100

2600

HEADTRACKING FOR PRE-RENDERED BINAURAL AUDIO

CROSS REFERENCE TO RELATED APPLICATIONS

This application is a continuation of U.S. patent application Ser. No. 17/167,442 filed 4 Feb. 2021; which is a continuation of U.S. patent application Ser. No. 16/309,578 filed 13 Dec. 2018; which is a 371 of International App. No. PCT/US2017/038372 filed 20 Jun. 2017; which claims priority from U.S. Provisional App. No. 62/352,685 filed 21 Jun. 2016, European Patent App. No. 16175495.7 filed 21 Jun. 2016, and U.S. Provisional App. No. 62/405,677 filed 7 Oct. 2016; all of which are hereby incorporated by reference in their entirety.

BACKGROUND

The present disclosure relates to binaural audio, and in particular, to adjustment of a pre-rendered binaural audio signal according to movement of a listener's head.

Unless otherwise indicated herein, the approaches described in this section are not prior art to the claims in this application and are not admitted to be prior art by inclusion in this section.

Binaural audio generally refers to audio that is recorded, or played back, in such a way that accounts for the natural ear spacing and head shadow of the ears and head of a listener. The listener thus perceives the sounds to originate in one or more spatial locations. Binaural audio may be recorded by using two microphones placed at the two ear locations of a dummy head. Binaural audio may be played back using headphones. Binaural audio may be rendered from audio that was recorded non-binaurally by using a head-related transfer function (HRTF) or a binaural room impulse response (BRIR). Binaural audio generally includes a left signal (to be output by the left headphone), and a right signal (to be output by the right headphone). Binaural audio differs from stereo in that stereo audio may involve loudspeaker crosstalk between the loudspeakers.

Head tracking (or headtracking) generally refers to tracking the orientation of a user's head to adjust the input to, or output of, a system. For audio, headtracking refers to changing an audio signal according to the head orientation of a listener.

Binaural audio and headtracking may be combined as follows. First, a sensor generates headtracking data that corresponds to the orientation of the listener's head. Second, the audio system uses the headtracking data to generate a binaural audio signal from channel-based or object-based audio. Third, the audio system sends the binaural audio signal to the listener's headphones for playback. The process then continues, with the headtracking data being used to generate the binaural audio signal.

SUMMARY

In contrast to channel-based or object-based audio, pre-rendered binaural audio does not account for the orientation of the listener's head. Instead, pre-rendered binaural audio uses a default orientation according to the rendering. Thus, there is a need to apply headtracking to pre-rendered binaural audio.

According to an embodiment, a method modifies a binaural signal using headtracking information. The method includes receiving, by a headset, a binaural audio signal, where the binaural audio signal includes a first signal and a second signal. The method further includes generating, by a sensor, headtracking data, and where the headtracking data relates to an orientation of the headset. The method further includes calculating, by a processor, a delay based on the headtracking data, a first filter response based on the headtracking data, and a second filter response based on the headtracking data. The method further includes applying the delay to one of the first signal and the second signal, based on the headtracking data, to generate a delayed signal, where an other of the first signal and the second signal is an undelayed signal. The method further includes applying the first filter response to the delayed signal to generate a modified delayed signal. The method further includes applying the second filter response to the undelayed signal to generate a modified undelayed signal. The method further includes outputting, by a first speaker of the headset according to the headtracking data, the modified delayed signal. The method further includes outputting, by a second speaker of the headset according to the headtracking data, the modified undelayed signal.

The headtracking data may corresponds to an azimuthal orientation, where the azimuthal orientation is one of a leftward orientation and a rightward orientation.

When the first signal is a left signal and the second signal is a right signal, the delayed signal may correspond to the left signal, the undelayed signal may be the right signal, the first speaker may be a left speaker, and the second speaker may be a right speaker. Alternatively, the delayed signal may correspond to the right signal, the undelayed signal may be the left signal, the first speaker may be a right speaker, and the second speaker may be a left speaker.

The sensor and the processor may be components of the headset. The sensor may be one of an accelerometer, a gyroscope, a magnetometer, an infrared sensor, a camera, and a radio-frequency link.

The method may further include mixing the first signal and the second signal, based on the headtracking data, before applying the delay, before applying the first filter response, and before applying the second filter response.

When the headtracking data is current headtracking data that relates to a current orientation of the headset, the delay is a current delay, the first filter response is a current first filter response, the second filter response is a current second filter response, the delayed signal is a current delayed signal, and the undelayed signal is a current undelayed signal, the method may further include storing previous headtracking data, where the previous headtracking data corresponds to the current headtracking data at a previous time. The method may further include calculating, by the processor, a previous delay based on the previous headtracking data, a previous first filter response based on the previous headtracking data, and a previous second filter response based on the previous headtracking data. The method may further include applying the previous delay to one of the first signal and the second signal, based on the previous headtracking data, to generate a previous delayed signal, where an other of the first signal and the second signal is a previous undelayed signal. The method may further include applying the previous first filter response to the previous delayed signal to generate a modified previous delayed signal. The method may further include applying the previous second filter response to the previous undelayed signal to generate a modified previous undelayed signal. The method may further include cross-fading the modified delayed signal and the modified previous delayed signal, where the first speaker outputs the modified delayed signal and the modified previous delayed signal having been cross-faded. The method may further include cross-fading the modified undelayed signal and the modified previous undelayed signal, where the second speaker outputs the modified undelayed signal and the modified previous undelayed signal having been cross-faded.

The headtracking data may correspond to an elevational orientation, where the elevational orientation is one of an upward orientation and a downward orientation.

The headtracking data may correspond to an azimuthal orientation and an elevational orientation.

The method may further include calculating, by the processor, an elevation filter based on the headtracking data. The method may further include applying the elevation filter to the modified delayed signal prior to outputting the modified delayed signal. The method may further include applying the elevation filter to the modified undelayed signal prior to outputting the modified undelayed signal.

Calculating the elevation filter may include accessing a plurality of generalized pinna related impulse responses based on the headtracking data. Calculating the elevation filter may further include determining a ratio between a current elevational orientation of a first selected one of the plurality of generalized pinna related impulse responses and a forward elevational orientation of a second selected one of the plurality of generalized pinna related impulse responses.

According to an embodiment, an apparatus modifies a binaural signal using headtracking information. The apparatus includes a processor, a memory, a sensor, a first speaker, a second speaker, and a headset. The headset is adapted to position the first speaker nearby a first ear of a listener and to position the second speaker nearby a second ear of the listener. The processor is configured to control the apparatus to execute processing that includes receiving, by the headset, a binaural audio signal, where the binaural audio signal includes a first signal and a second signal. The processing further includes generating, by the sensor, headtracking data, where the headtracking data relates to an orientation of the headset. The processing further includes calculating, by the processor, a delay based on the headtracking data, a first filter response based on the headtracking data, and a second filter response based on the headtracking data. The processing further includes applying the delay to one of the first signal and the second signal, based on the headtracking data, to generate a delayed signal, where an other of the first signal and the second signal is an undelayed signal. The processing further includes applying the first filter response to the delayed signal to generate a modified delayed signal. The processing further includes applying the second filter response to the undelayed signal to generate a modified undelayed signal. The processing further includes outputting, by the first speaker of the headset according to the headtracking data, the modified delayed signal. The processing further includes outputting, by the second speaker of the headset according to the headtracking data, the modified undelayed signal. The processor may be further configured to perform one or more of the other method steps described above.

According to an embodiment, a non-transitory computer readable medium stores a computer program for controlling a device to modify a binaural signal using headtracking information. The device may include a processor, a memory, a sensor, a first speaker, a second speaker, and a headset. The computer program when executed by the processor may perform one or more of the method steps described above.

According to an embodiment, a method modifies a binaural signal using headtracking information. The method includes receiving, by a headset, a binaural audio signal. The method further includes upmixing the binaural audio signal into a four-channel binaural signal, where the four-channel binaural signal includes a front binaural signal and a rear binaural signal. The method further includes generating, by a sensor, headtracking data, where the headtracking data relates to an orientation of the headset. The method further includes applying the headtracking data to the front binaural signal to generate a modified front binaural signal. The method further includes applying an inverse of the headtracking data to the rear binaural signal to generate a modified rear binaural signal. The method further includes combining the modified front binaural signal and the modified rear binaural signal to generate a combined binaural signal. The method further includes outputting, by at least two speakers of the headset, the combined binaural signal.

According to an embodiment, a method modifies a parametric binaural signal using headtracking information. The method includes generating, by a sensor, headtracking data, where the headtracking data relates to an orientation of a headset. The method further includes receiving an encoded stereo signal, where the encoded stereo signal includes a stereo signal and presentation transformation information, and where the presentation transformation information relates the stereo signal to a binaural signal. The method further includes decoding the encoded stereo signal to generate the stereo signal and the presentation transformation information. The method further includes performing presentation transformation on the stereo signal using the presentation transformation information to generate the binaural signal and acoustic environment simulation input information. The method further includes performing acoustic environment simulation on the acoustic environment simulation input information to generate acoustic environment simulation output information. The method further includes combining the binaural signal and the acoustic environment simulation output information to generate a combined signal. The method further includes modifying the combined signal using the headtracking data to generate an output binaural signal. The method further includes outputting, by at least two speakers of the headset, the output binaural signal.

According to an embodiment, a method modifies a parametric binaural signal using headtracking information. The method includes generating, by a sensor, headtracking data, where the headtracking data relates to an orientation of a headset. The method further includes receiving an encoded stereo signal, where the encoded stereo signal includes a stereo signal and presentation transformation information, and where the presentation transformation information relates the stereo signal to a binaural signal. The method further includes decoding the encoded stereo signal to generate the stereo signal and the presentation transformation information. The method further includes performing presentation transformation on the stereo signal using the presentation transformation information to generate the binaural signal and acoustic environment simulation input information. The method further includes performing acoustic environment simulation on the acoustic environment simulation input information to generate acoustic environment simulation output information. The method further includes modifying the binaural signal using the headtracking data to generate an output binaural signal. The method further includes combining the output binaural signal and the acoustic environment simulation output information to generate a combined signal. The method further includes outputting, by at least two speakers of the headset, the combined signal.

According to an embodiment, a method modifies a parametric binaural signal using headtracking information. The method includes generating, by a sensor, headtracking data, where the headtracking data relates to an orientation of a headset. The method further includes receiving an encoded stereo signal, where the encoded stereo signal includes a stereo signal and presentation transformation information, and where the presentation transformation information relates the stereo signal to a binaural signal. The method further includes decoding the encoded stereo signal to generate the stereo signal and the presentation transformation information. The method further includes performing presentation transformation on the stereo signal using the presentation transformation information and the headtracking data to generate a headtracked binaural signal, where the headtracked binaural signal corresponds to the binaural signal having been matrixed. The method further includes performing presentation transformation on the stereo signal using the presentation transformation information to generate acoustic environment simulation input information. The method further includes performing acoustic environment simulation on the acoustic environment simulation input information to generate acoustic environment simulation output information. The method further includes combining the headtracked binaural signal and the acoustic environment simulation output information to generate a combined signal. The method further includes outputting, by at least two speakers of the headset, the combined signal.

According to an embodiment, a method modifies a parametric binaural signal using headtracking information. The method includes generating, by a sensor, headtracking data, where the headtracking data relates to an orientation of a headset. The method further includes receiving an encoded stereo signal, where the encoded stereo signal includes a stereo signal and presentation transformation information, where the presentation transformation information relates the stereo signal to a binaural signal. The method further includes decoding the encoded stereo signal to generate the stereo signal and the presentation transformation information. The method further includes performing presentation transformation on the stereo signal using the presentation transformation information to generate the binaural signal. The method further includes modifying the binaural signal using the headtracking data to generate an output binaural signal. The method further includes outputting, by at least two speakers of the headset, the output binaural signal.

According to an embodiment, an apparatus modifies a parametric binaural signal using headtracking information. The apparatus includes a processor, a memory, a sensor, at least two speakers, and a headset. The headset is adapted to position the at least two speakers nearby ears of a listener. The processor is configured to control the apparatus to execute processing that includes generating, by the sensor, headtracking data, wherein the headtracking data relates to an orientation of the headset. The processing further includes receiving an encoded stereo signal, where the encoded stereo signal includes a stereo signal and presentation transformation information, and where the presentation transformation information relates the stereo signal to a binaural signal. The processing further includes decoding the encoded stereo signal to generate the stereo signal and the presentation transformation information. The processing further includes performing presentation transformation on the stereo signal using the presentation transformation information to generate the binaural signal. The processing further includes modifying the binaural signal using the headtracking data to generate an output binaural signal. The processing further includes outputting, by the at least two speakers of the headset, the output binaural signal. The processor may be further configured to perform one or more of the other method steps described above.

The following detailed description and accompanying drawings provide a further understanding of the nature and advantages of various implementations.

DETAILED DESCRIPTION

Figure 1:
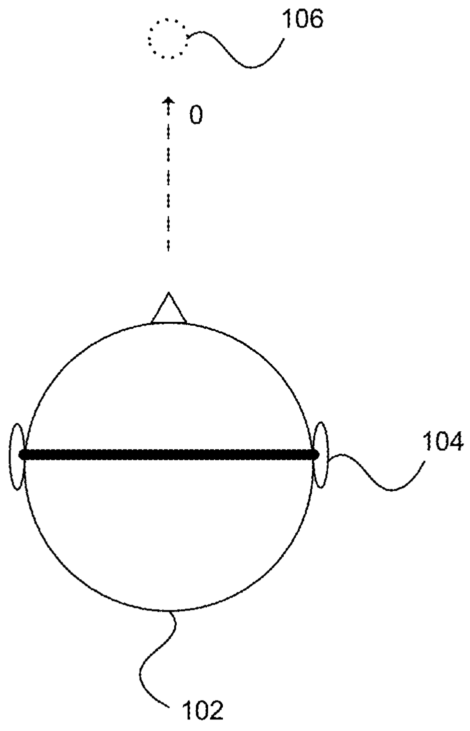
FIG. 1 is a stylized top view of a listening environment 100.

Described herein are techniques for using headtracking with pre-rendered binaural audio. In the following description, for purposes of explanation, numerous examples and specific details are set forth in order to provide a thorough understanding of the present disclosure. It will be evident, however, to one skilled in the art that the present disclosure as defined by the claims may include some or all of the features in these examples alone or in combination with other features described below, and may further include modifications and equivalents of the features and concepts described herein.

In the following description, various methods, processes and procedures are detailed. Although particular steps may be described in gerund form, such wording also indicates the state of being in that form. For example, "storing data in a memory" may indicate at least the following: that the data currently becomes stored in the memory (e.g., the memory did not previously store the data); that the data currently exists in the memory (e.g., the data was previously stored in the memory); etc. Such a situation will be specifically pointed out when not clear from the context. Although particular steps may be described in a certain order, such order is mainly for convenience and clarity. A particular step may be repeated more than once, may occur before or after other steps (even if those steps are otherwise described in another order), and may occur in parallel with other steps. A second step is required to follow a first step only when the first step must be completed before the second step is begun. Such a situation will be specifically pointed out when not clear from the context.

In this document, the terms "and", "or" and "and/or" are used. Such terms are to be read as having an inclusive meaning. For example, "A and B" may mean at least the following: "both A and B", "at least both A and B". As another example, "A or B" may mean at least the following: "at least A", "at least B", "both A and B", "at least both A and B". As another example, "A and/or B" may mean at least the following: "A and B", "A or B". When an exclusive-or is intended, such will be specifically noted (e.g., "either A or B", "at most one of A and B").

This document uses the terms "audio", "audio signal" and "audio data". In general, these terms are used interchangeably. When specificity is desired, the term "audio" is used to refer to the input captured by a microphone, or the output generated by a loudspeaker. The term "audio data" is used to refer to data that represents audio, e.g. as processed by an analog to digital converter (ADC), as stored in a memory, or as communicated via a data signal. The term "audio signal" is used to refer to audio transmitted in analog or digital electronic form.

This document uses the terms "headphones" and "headset". In general, these terms are used interchangeably. When specificity is desired, the term "headphones" is used to refer to the speakers, and the term "headset" is used to refer to both the speakers and the additional components such as the headband, housing, etc. The term "headset" may also be used to refer to a device with a display or screen such as a head-mounted display.

Without Headtracking

FIG. 1 is a stylized top view of a listening environment 100. The listening environment 100 includes a listener 102 wearing headphones 104. The headphones 104 receive a pre-rendered binaural audio signal and generate a sound that the listener 102 perceives as originating at a location 106 directly in front of the listener 102. In this top view, the location 106 is at 0 (zero) degrees from the perspective of the listener 102. (Note that the binaural signal is pre-rendered and does not account for headtracking or other changes in the orientation of the headset 104.)

The pre-rendered binaural audio signal includes a left signal that is provided to the left speaker of the headphones 104, and a right signal that is provided to the right speaker of the headphones 104. By changing the parameters of the left signal and the right signal, the listener's perception of the location of the sound may be changed. For example, the sound may be perceived to be to the left of the listener 102, to the right, behind, closer, further away, etc. The sound may also be perceived to be positioned in three-dimensional space, e.g., above or below the listener 102, in addition to its perceived position in the horizontal plane.

Figure 2A:
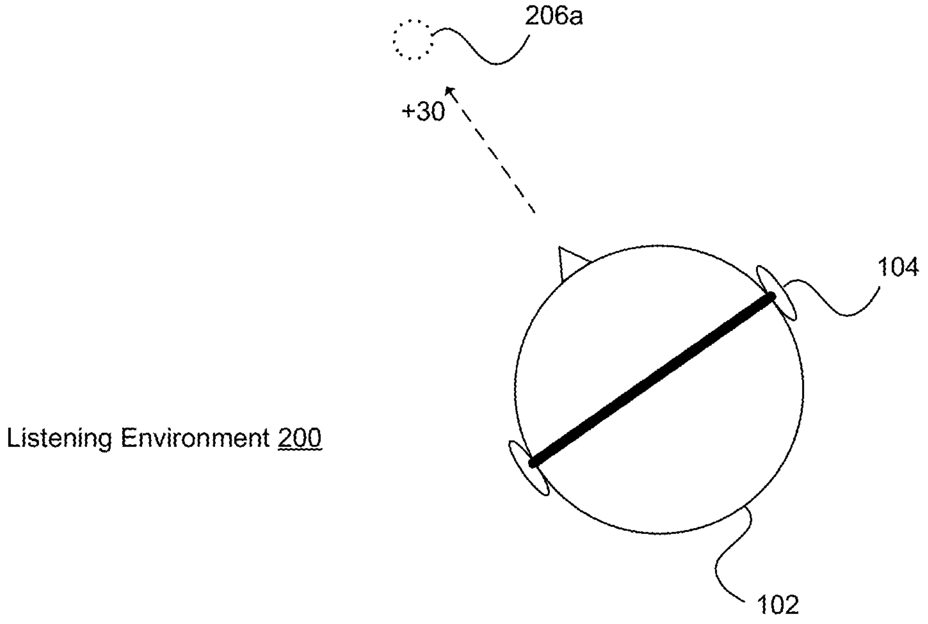
FIGS. 2A-2B are stylized top views of a listening environment 200.
Figure 2B:
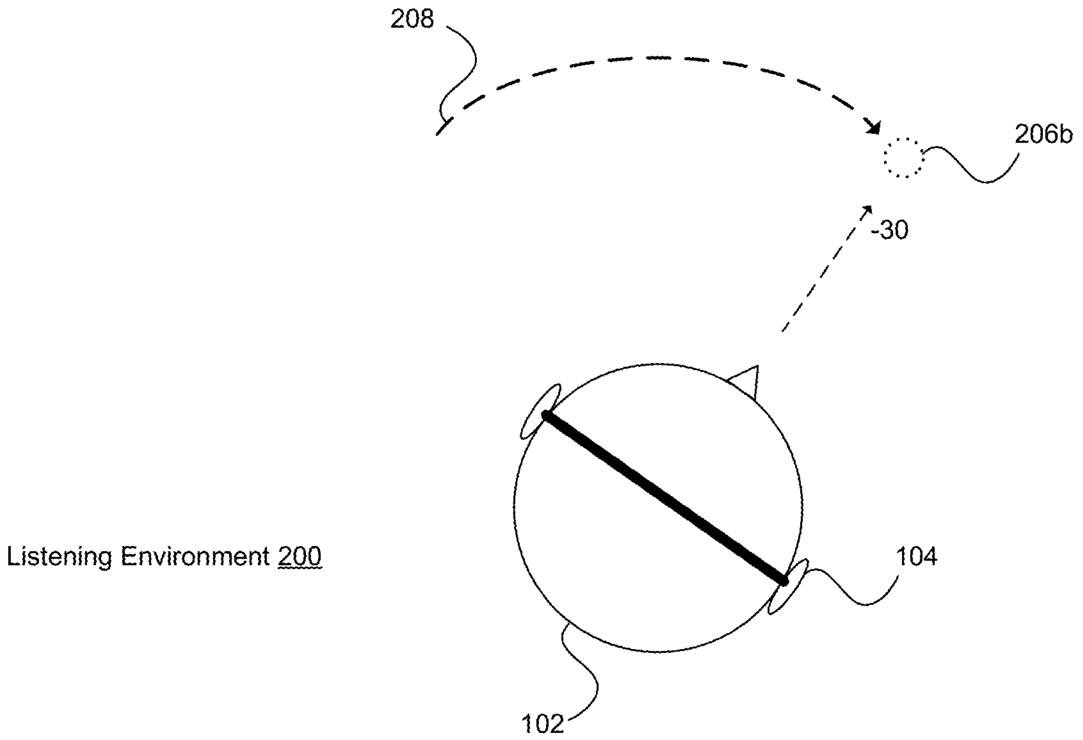

FIGS. 2A-2B are stylized top views of a listening environment 200. FIG. 2A shows the listener 102 turned leftward at 30 degrees (also referred to as +30 degrees), and FIG. 2B shows the listener 102 turned rightward at 30 degrees (also referred to as −30 degrees). The listener 102 receives the same pre-rendered binaural signal as in FIG. 1 (e.g., with no headtracking). In FIG. 2A, the listener 102 perceives the sound of the pre-rendered binaural audio signal as originating at location 206*a* (e.g., at zero degrees from the perspective of the listener 102, as in FIG. 1), which is +30 degrees in the listening environment 200, since the binaural audio signal is pre-rendered and does not account for headtracking. Similarly in FIG. 2B, the listener 102 perceives the sound of the pre-rendered binaural audio signal as originating at location 206*b* (e.g., at zero degrees from the perspective of the listener 102, as in FIG. 1), which is −30 degrees in the listening environment 200, since the binaural audio signal is pre-rendered and does not account for headtracking.

Similarly to FIG. 1, the listener's perception of the location of the sound in FIGS. 2A-2B may be changed by changing the parameters of the binaural audio signal. And since FIGS. 2A-2B likewise do not use headtracking, the user perceives the locations of the sound relative to a fixed orientation of the headset 104 (zero degrees, in this case) regardless of how the orientation of the headset 104 may be changed. For example, if the listener's head begins at the leftward 30 degree angle as shown in FIG. 2A, then pans rightward to the −30 degree angle as shown in FIG. 2B, the listener's perception is that the sound begins at location 206*a*, tracks an arc 208 corresponding with the panning of the listener's head, and ends at location 206*b*. That is, the listener's perception is that the sound always originates at zero degrees relative to the orientation of the headset 104.

Headtracking

Head tracking may be used to perform real-time binaural audio processing in response to a listener's head movements. Using a one or more sensors, such as accelerometers, gyroscopes, and magnetometers along with a sensor-fusion algorithm, a binaural processing algorithm can be driven with stable yaw, pitch, and roll values representing the current rotation of a listener's head. Typical binaural processing uses head-related transfer functions (HRTFs), which are a function of azimuth and elevation. By inverting the current head rotation parameters, head-tracked binaural processing can give the perception of a physically consistent sound source with respect to a listener's head rotation.

In the use case where binaural audio is pre-rendered, it is typically too late to apply headtracking. The pre-rendered binaural is usually rendered for the head facing directly "forward", as shown in FIG. 1. When the listener moves her head, the sound locations move as well, as shown in FIGS. 2A-2B. It would be more convincing if the sound locations stayed fixed, as they do in natural (real-world) listening.

The present disclosure describes a system and method to adjust the pre-rendered binaural signal so that headtracking is still possible. The process is derived from a model of the head that allows for an adjustment of the pre-rendered binaural cues so that headtracking is facilitated.

Normally when headtracking is used for binaural rendering, the headphones are able to track the head rotation and the incoming audio is rendered on the fly, and is constantly adjusted based on the head rotation. In the case of pre-rendered binaural, we can still track the head motion, and use concepts from the Duplex Theory of Localization to adjust for the head motion. These concepts include interaural time delay (ITD) and interaural level difference (ILD).

Figure 3A:
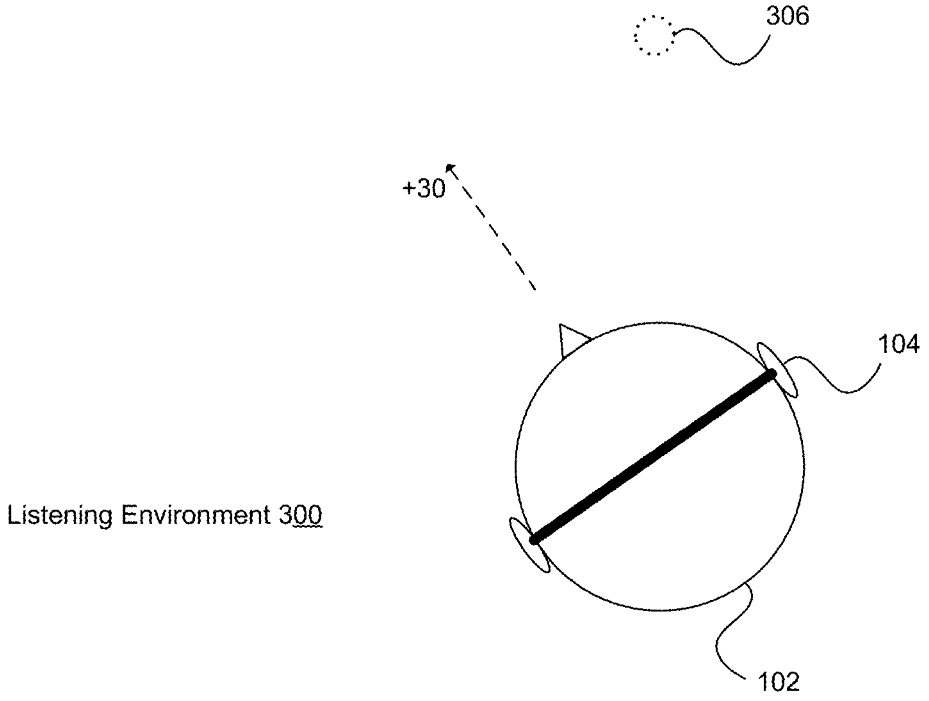
FIGS. 3A-3B are stylized top views of a listening environment 300.
Figure 3B:
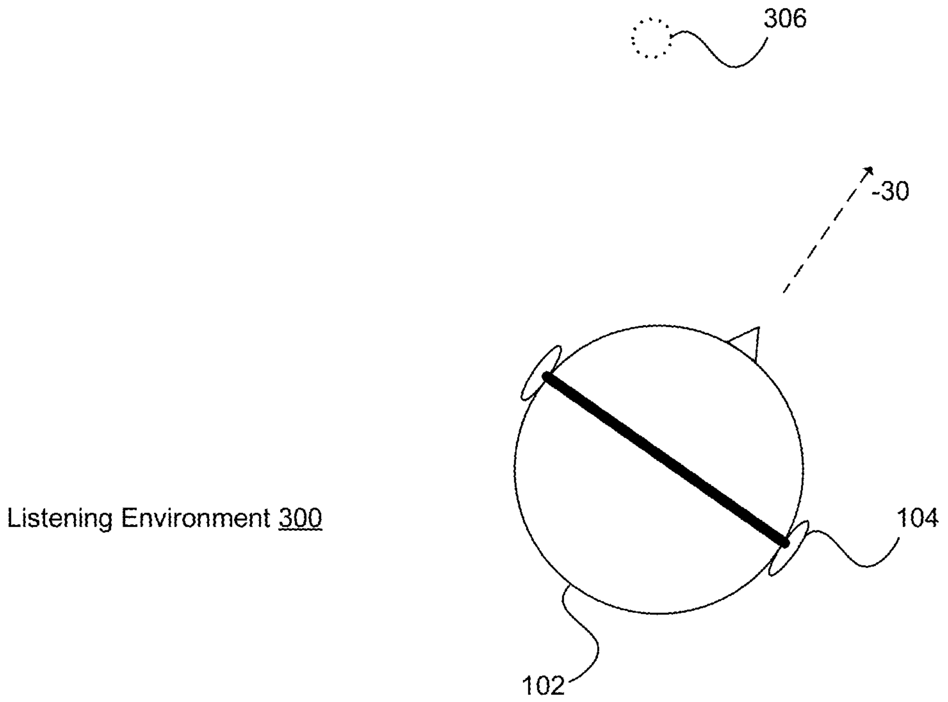

FIGS. 3A-3B are stylized top views of a listening environment 300. Similarly to FIGS. 2A-2B, FIG. 3A shows the listener 102 turned leftward at 30 degrees (also referred to as +30 degrees), and FIG. 3B shows the listener 102 turned rightward at 30 degrees (also referred to as −30 degrees). The listener 102 receives the same pre-rendered binaural signal as in FIG. 1. However in contrast to FIGS. 2A-2B, the pre-rendered audio signal is adjusted with headtracking information. As a result, in FIG. 3A the listener 102 perceives the sound of the pre-rendered binaural audio signal as originating at location 306, at zero degrees, despite the listener's head turned to +30 degrees. Similarly, in FIG. 3B the listener 102 perceives the sound of the pre-rendered binaural audio signal as originating at location 306, at zero degrees, despite the listener's head turned to −30 degrees.

An example is as follows. Assume the sound is to be perceived directly in front, as in FIG. 1. If the listener 102 moves her head to the left (as in FIG. 2A), or to the right (as in FIG. 2B), the image moves as well. The function of the system is to push the image back to the original frontal location (zero degrees), as in FIGS. 3A-3B. This can be accomplished for FIG. 3A by adding the appropriate delay to the left ear, so that the sound arrives first to the right ear, then later to the left ear; and for FIG. 3B by adding the appropriate delay to the right ear, so that the sound arrives first to the left ear, then later to the right ear. This is akin to the concept of ITD. Similarly, the system can for FIG. 3A filter the sound to the left ear so as to attenuate the high frequencies, as well as filter the sound to the right ear to boost the high frequencies; and for FIG. 3B filter the sound to the right ear so as to attenuate the high frequencies, as well as filter the sound to the left ear to boost the high frequencies. Again, this is similar to the concept of ILD, but with the filters applied separately to the left and right ears with no crosstalk.

Further sections describe a system and method of applying headtracking to a pre-rendered binaural audio signal.

Figure 4:
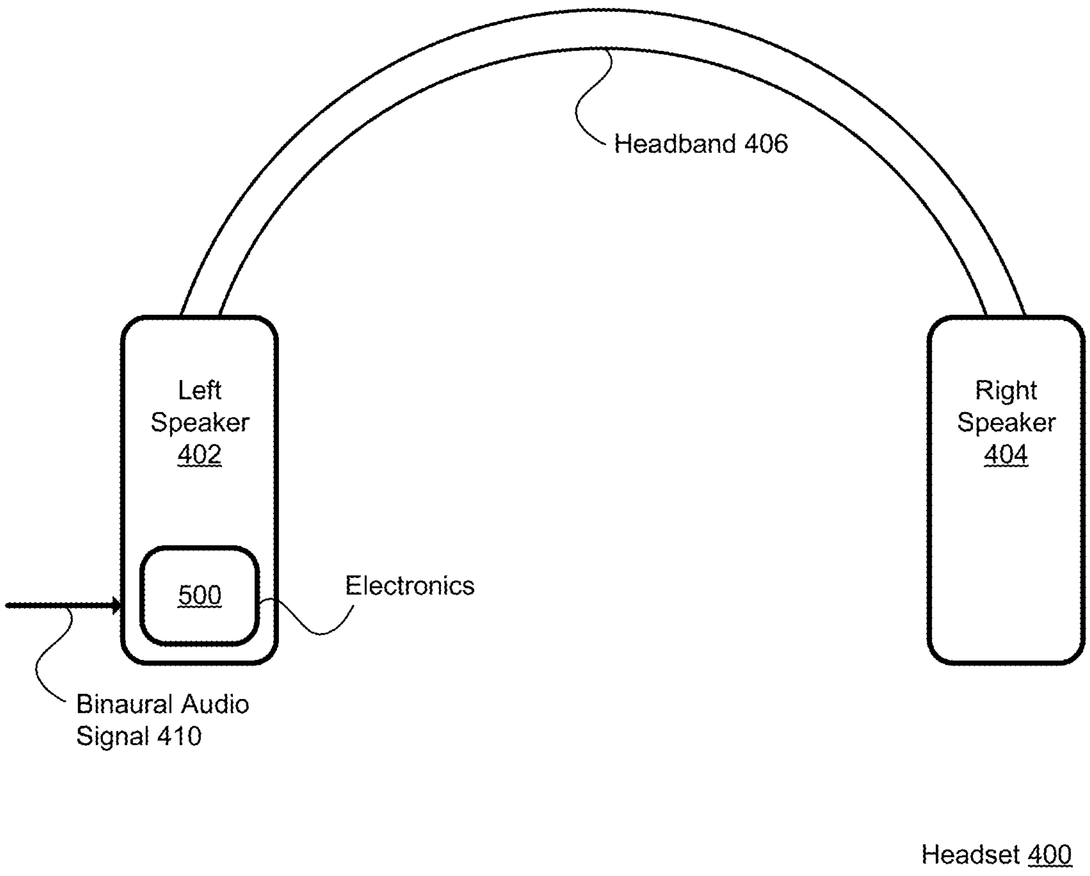
FIG. 4 is a stylized rear view of a headset 400 that applies headtracking to a pre-rendered binaural signal.

FIG. 4 is a stylized rear view of a headset 400 that applies headtracking to a pre-rendered binaural signal (e.g., to accomplish what was shown in FIGS. 3A-3B). The headset 400 includes a left speaker 402, a right speaker 404, a headband 406, and electronics 500. The headset 400 receives a pre-rendered binaural audio signal 410 that includes a left signal and a right signal. The left speaker 402 outputs the left signal, and the right speaker 404 outputs the right signal. The headband 406 connects the left speaker 402 and the right speaker 404, and positions the headset 400 on the head of the listener. The electronics 500 perform headtracking and adjustment of the binaural audio signal 410 in accordance with the headtracking, as further detailed below.

The binaural audio signal 410 may be received via a wired connection. Alternatively, the binaural audio signal 410 may be received wirelessly (e.g., via an IEEE 802.15.1 standard signal such as a Bluetooth™ signal, an IEEE 802.11 standard signal such as a Wi-Fi™ signal, etc.).

Alternatively, the electronics 500 may be located in another location, such as in another device (e.g., a computer, not shown), or on another part of the headset 400, such as in the right speaker 404, on the headband 406, etc.

Figure 5:
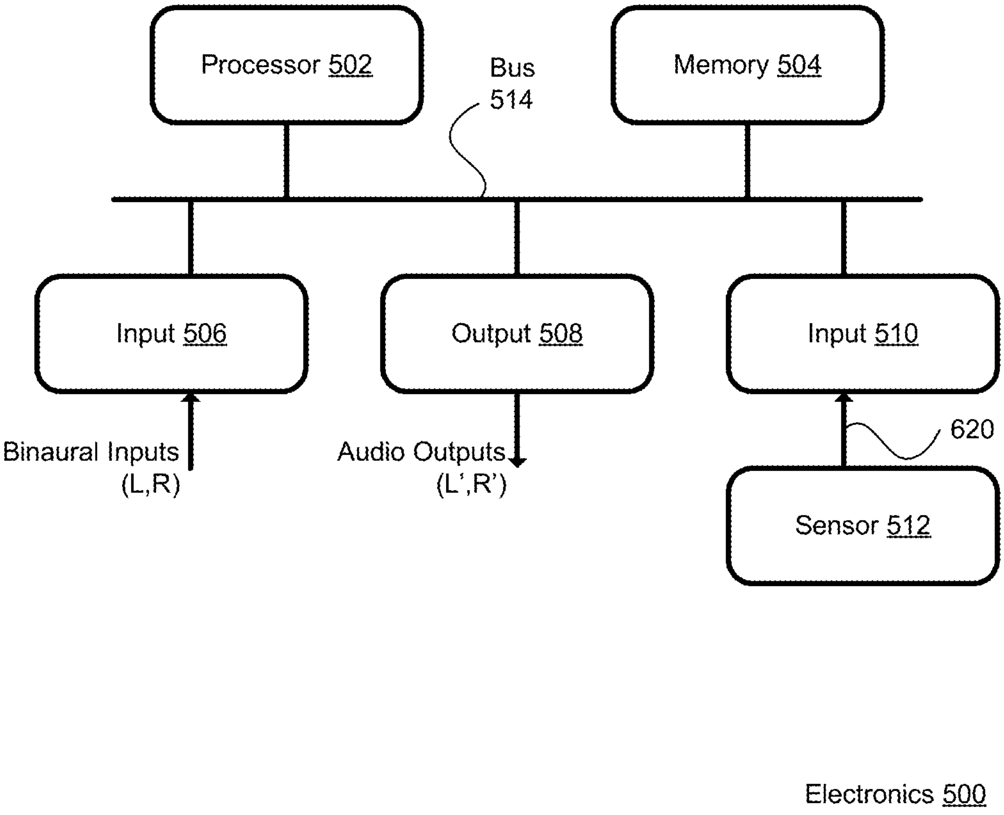
FIG. 5 is a block diagram of the electronics 500 (see FIG. 4).

FIG. 5 is a block diagram of the electronics 500 (see FIG. 4). The electronics 500 include a processor 502, a memory 504, an input interface 506, an output interface 508, an input interface 510, and a sensor 512, connected via a bus 514. Various components of the electronics 500 may be implemented using a programmable logic device or system on a chip.

The processor 502 generally controls the operation of the electronics 500. The processor 502 also applies headtracking to a pre-rendered binaural audio signal, as further detailed below. The processor 502 may execute one or more computer programs as part of its operation.

The memory 504 generally stores data operated on by the electronics 500. For example, the memory 504 may store one or more computer programs executed by the processor 502. The memory may store the pre-rendered binaural audio signal as it is received by the electronics 500 (e.g., as data samples), the left signal and right signal to be sent to the left and right speakers (see 402 and 404 in FIG. 4), or intermediate data as part of processing the pre-rendered binaural audio signal into the left and right signals. The memory 504 may include volatile and non-volatile components (e.g., random access memory, read only memory, programmable read only memory, etc.).

The input interface 506 generally receives an audio signal (e.g., the left and right components L and R of the pre-rendered binaural audio signal). The output interface 508 generally outputs the left and right audio signals L' and R' to the left and right speakers (e.g., 402 and 404 in FIG. 4). The input interface 510 generally receives headtracking data generated by the sensor 512.

The sensor 512 generally generates headtracking data 620. The headtracking data 620 relates to an orientation of the sensor 512 (or more generally, to the orientation of the electronics 500 or the headset 400 of FIG. 4 that includes the sensor 512). The sensor 512 may be an accelerometer, a gyroscope, a magnetometer, an infrared sensor, a camera, a radio-frequency link, or any other type of sensor that allows for headtracking. The sensor 512 may be a multi-axis sensor. The sensor 512 may be one of a number of sensors that generate the headtracking data 620 (e.g., one sensor generates azimuthal data, another sensor generates elevational data, etc.).

Alternatively, the sensor 512 may be a component of a device other than the electronics 500 or the headset 400 of FIG. 4. For example, the sensor 512 may be located in a source device that provides the pre-rendered binaural audio signal to the electronics 500. In such a case, the source device provides the headtracking data to the electronics 500, for example via the same connection that it provides the pre-rendered binaural audio signal.

Figure 6:
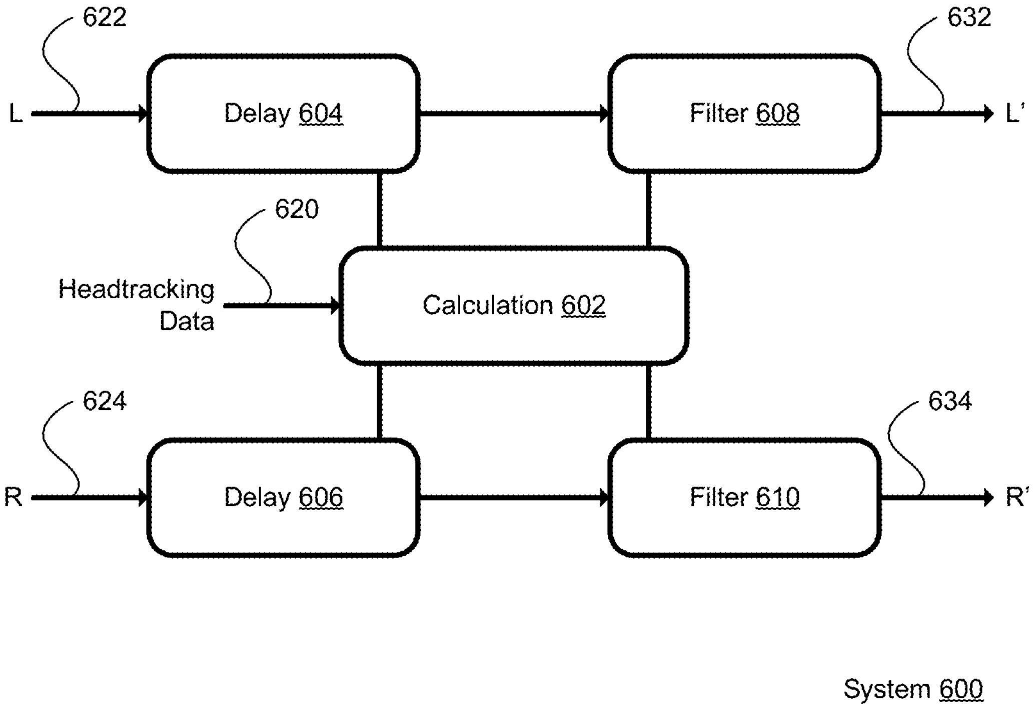
FIG. 6 is a block diagram of a system 600 that modifies a pre-rendered binaural audio signal using headtracking information.

FIG. 6 is a block diagram of a system 600 that modifies a pre-rendered binaural audio signal using headtracking information. The system 600 is shown as functional blocks, in order to illustrate the operation of the headtracking system. The system 600 may be implemented by the electronics 500 (see FIG. 5). The system 600 includes a calculation block 602, a delay block 604, a delay block 606, a filter block 608, and a filter block 610. The system 600 receives as inputs headtracking data 620, an input left signal L 622, and an input right signal R 624. The system 600 generates as outputs an output left signal L' 632 and an output right signal R' 634.

In general, the calculation block 602 generates a delay and filter parameters based on the headtracking data 620, provides the delay to the delay blocks 604 and 606, and provides the filter parameters to the filter blocks 608 and 610. The filter coefficients may be calculated according to the Brown-Duda model, and the delay values may be calculated according to the Woodsworth approximation. The delay and the filter parameters may be calculated as follows.

The delay D corresponds to the ITD as discussed above. The delay D may be calculated using Equation 1:

$$D=(r/c)\cdot(\arcsin(\cos\varphi\cdot\sin\theta)+\cos\varphi\cdot\sin\theta) \quad (1)$$

In Equation 1, θ is the azimuth angle (e.g., in a horizontal plane, the head turned left or right, as shown in FIGS. 3A-3B), φ is the elevation angle (e.g., the head turned upward or downward from the horizontal plane), r is the head radius, and c is the speed of sound. The angles for Equation 1 are expressed in radians (rather than degrees), where 0 radians (0 degrees) is straight ahead (e.g., as shown in FIG. 1), +π/2 (+90 degrees) is directly left, and −π/2 (−90 degrees) is directly right. The head radius r may be a fixed value, for example according to the size of the headset. A common fixed value of 0.0875 meters may be used. Alternatively, the head radius r may be detected, for example according to the flex of the headband of the headset on the listener's head. The speed of sound c may be a fixed value, for example corresponding to the speed of sound at sea level (340.29 meters per second).

For φ=0 (e.g., the horizontal plane), Equation 1 may be simplified to Equation 2:

$$D=(r/c)\cdot(\theta+\sin\theta)\ 0\le\theta\pi/2 \quad (2)$$

The filter models may be derived as follows. In the continuous domain, the filter takes the form of Equations 3-5:

$$H(s,\theta)=\frac{\alpha(\theta)s+\beta}{s+\beta} \quad (3)$$

$$\alpha(\theta)=1+\cos(\theta) \quad (4)$$

$$\beta=\frac{2c}{r} \quad (5)$$

The bilinear transform may be used to convert to the discrete domain, as shown in Equation 6:

$$H(z)=\frac{\alpha(\theta)s+\beta}{s+\beta}\Big|_{s=2fs\left(\frac{z-1}{z+1}\right)}=\frac{2\alpha(\theta)\left(\frac{z-1}{z+1}\right)+\frac{\beta}{fs}}{2\left(\frac{z-1}{z+1}\right)+\frac{\beta}{fs}}=\frac{\left(\frac{\beta}{fs}+2\alpha(\theta)\right)+\left(\frac{\beta}{fs}-2\alpha(\theta)\right)z^{-1}}{\left(\frac{\beta}{fs}+2\right)+\left(\frac{\beta}{fs}-2\right)z^{-1}} \quad (6)$$

Now, redefine β from Equation 5 as in Equation 7:

$$\beta=\frac{2c}{a\cdot fs} \quad (7)$$

In Equations 6-7, fs is the sample rate of the pre-rendered binaural audio signal. For example, 44.1 kHz is a common sample rate for digital audio signals.

Equation 8 then follows:

$$H(z)=\frac{(\beta+2\alpha(\theta))+(\beta-2\alpha(\theta))z^{-1}}{(\beta+2)+(\beta-2)z^{-1}}=\frac{b_0+b_1z^{-1}}{a_0+a_1z^{-1}} \quad (8)$$

For two ears (the "near" ear, turned toward the perceived sound location, and the "far" ear, turned away from the perceived sound location), Equations 9-10 result:

$$H_{ipsi}(z)=\frac{b_{i0}+b_{i1}z^{-1}}{a_{i0}+a_{i1}z^{-1}} \quad (9)$$

$$H_{contra}(z)=\frac{b_{c0}+b_{c1}z^{-1}}{a_{c0}+a_{c1}z^{-1}} \quad (10)$$

In Equations 9-10, Hipsi is the transfer function of the filter for the "near" ear (referred to as the ipsilateral filter), Hcontra is the transfer function for the filter for the "far" ear (referred to as the contralateral filter), the subscript i is associated with the ipsilateral components, and the subscript c is associated with the contralateral components.

The components of Equations 9-10 are as given in Equations 11-18:

$$a_o = a_{i0} = a_{co} = \beta + 2 \quad (11)$$

$$a_1 = a_{i1} = a_{c1} = \beta - 2 \quad (12)$$

$$b_{i0} = \beta + 2\alpha_i(\theta) \quad (13)$$

$$b_{i1} = \beta - 2\alpha_i(\theta) \quad (14)$$

$$b_{c0} = \beta + 2\alpha_c(\theta) \quad (15)$$

$$b_{c1} = \beta - 2\alpha_c(\theta) \quad (16)$$

$$\alpha_i(\theta) = 1 + \cos(\theta - 90°) = 1 + \sin(\theta) \quad (17)$$

$$\alpha_c(\theta) = 1 + \cos(\theta + 90°) = 1 - \sin(\theta) \quad (18)$$

Figure 7:
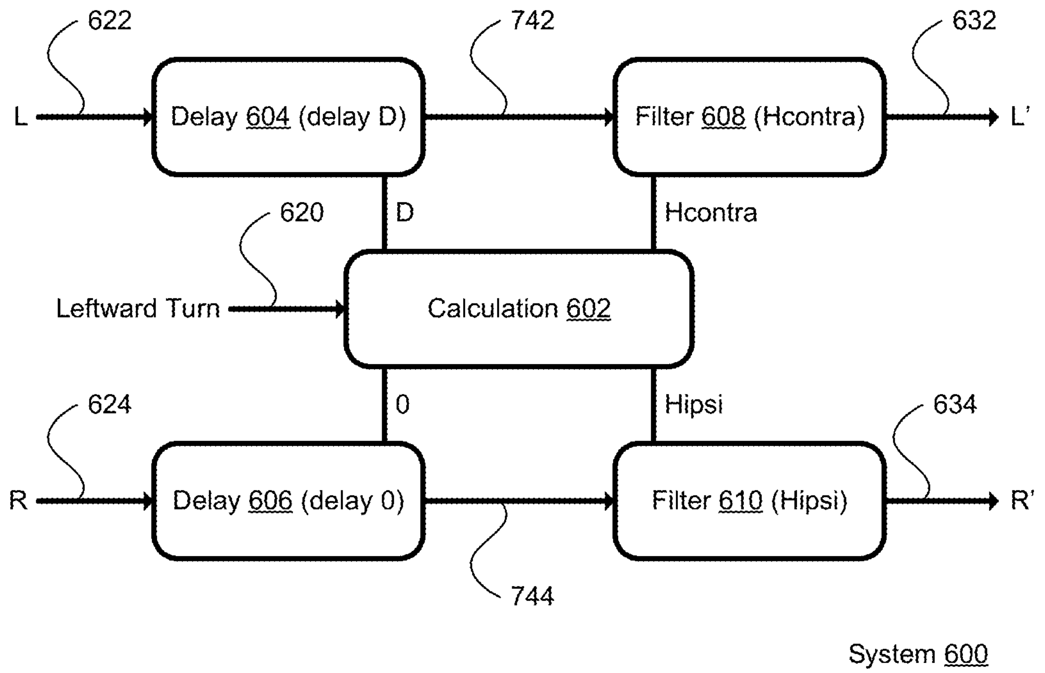
FIG. 7 shows the configuration of the system 600 for a leftward turn.
Figure 8:
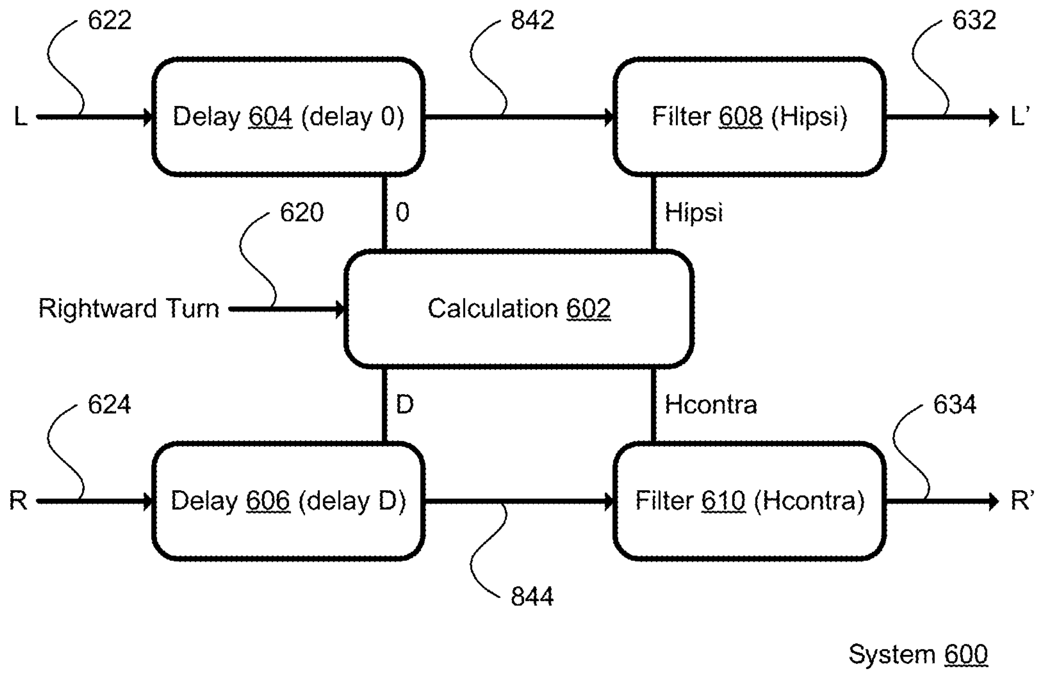
FIG. 8 shows the configuration of the system 600 for a rightward turn.

Based on the head angle, the delay and filters are applied to the system 600 of FIG. 6 as shown in FIGS. 7-8. FIG. 7 shows the configuration of the system 600 for a leftward turn (e.g., as shown in FIG. 3A), and FIG. 8 shows the configuration of the system 600 for a rightward turn (e.g., as shown in FIG. 3B).

In FIG. 7, the headtracking data 620 indicates a leftward turn (e.g., as shown in FIG. 3A), so the input left signal 622 is delayed and contralaterally filtered, and the input right signal 624 is ipsilaterally filtered. This is accomplished by the calculation block 602 configuring the delay block 604 with the delay D and the delay block 606 with no delay, configuring the filter 608 as the contralateral filter Hcontra, and configuring the filter 610 as the ipsilateral filter Hipsi. The signal 742 may be referred to as the delayed signal, or the left delayed signal. The signal 744 may be referred to as the undelayed signal, or the right undelayed signal. The output left signal 632 may be referred to as the modified delayed signal, or the left modified delayed signal. The output right signal 634 may be referred to as the modified undelayed signal, or the right modified undelayed signal.

In FIG. 8, the headtracking data 620 indicates a rightward turn (e.g., as shown in FIG. 3B), so the input left signal 622 is ipsilaterally filtered, and the input right signal 624 is delayed and contralaterally filtered. This is accomplished by the calculation block 602 configuring the delay block 604 with no delay and the delay block 606 with the delay D, configuring the filter 608 as the ipsilateral filter Hipsi, and configuring the filter 610 as the contralateral filter Hcontra. The signal 842 may be referred to as the undelayed signal, or the left undelayed signal. The signal 844 may be referred to as the delayed signal, or the right delayed signal. The output left signal 632 may be referred to as the modified undelayed signal, or the left modified undelayed signal. The output right signal 634 may be referred to as the modified delayed signal, or the right modified delayed signal.

Figure 9:
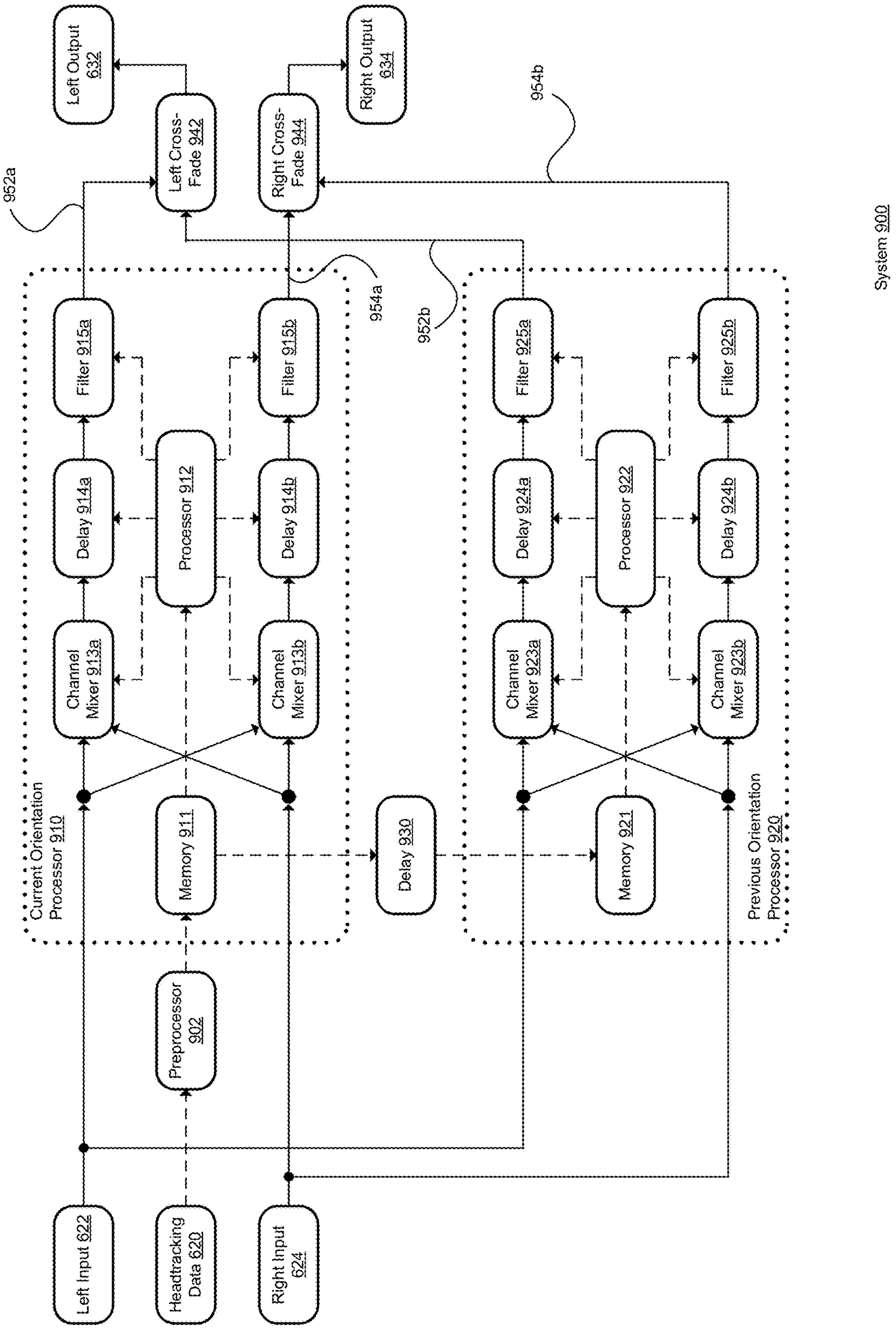
FIG. 9 is a block diagram of a system 900 for using headtracking to modify a pre-rendered binaural audio signal.

FIG. 9 is a block diagram of a system 900 for using headtracking to modify a pre-rendered binaural audio signal. The system 900 may be implemented by the electronics 500 (see FIG. 5), and may be implemented in the headset 400 (see FIG. 4). The system 900 is similar to the system 600 (see FIG. 6), with the addition of cross-fading (to improve the listener's perception as the head moves between two orientations), and other details. The system 900 receives a left input signal 622 and a right input signal 624 (see FIG. 6), which are the left and right signal components of the pre-rendered binaural audio signal (e.g., 410 in FIG. 4). The system 900 receives headtracking data 620, and generates the left and right output signals 632 and 634 (see FIG. 6). In FIG. 9, the signal paths are shown with solid lines, and the control paths are shown with dashed lines. The system 900 includes a head angle preprocessor 902, a current orientation processor 910, a previous orientation processor 920, a delay 930, a left cross-fade 942, and a right cross-fade 944.

The system 900 operates on blocks of samples of the left input signal 622 and the right input signal 624. The delay and channel filters are then applied on a per block basis. A block size of 256 samples may be used in an embodiment. The size of the block may be adjusted as desired.

The head angle processor (preprocessor) 902 generally performs processing of the headtracking data 620 from the headtracking sensor (e.g., 512 in FIG. 5). This processing includes converting the headtracking data 620 into the virtual head angles used in Equations 1-18, determining which channel is the ipsilateral channel and which is the contralateral channel (based on the headtracking data 620), and determining which channel is to be delayed (based on the headtracking data 620). As an example, when the headtracking data 620 indicates a leftward orientation (e.g., as in FIG. 3A), the left input signal 622 is the contralateral channel and is delayed, and the right input signal 624 is the ipsilateral channel (e.g., as in FIG. 7). When the headtracking data 620 indicates a rightward orientation (e.g., as in FIG. 3B), the left input signal 622 is the ipsilateral channel, and the right input signal 624 is the contralateral channel and is delayed (e.g., as in FIG. 8).

The head angle $\theta$ ranges between −180 and +180 degrees, and the virtual head angle ranges between 0 and 90 degrees, so the head angle processor 902 may calculate the virtual head angle $\theta$ as follows. If the absolute value of the head angle is less than or equal to 90 degrees, then the virtual head angle is the absolute value of the head angle; else the virtual head angle is 180 minus the absolute value of the head angle.

The decision to designate the left or right channels as ipsilateral and contralateral is a function of the head angle $\theta$. If the head angle is equal to or greater than zero (e.g., a leftward orientation), the left input is the contralateral input, and the right input is the ipsilateral input. If the head angle is less than zero (e.g., a rightward orientation), the left input is the ipsilateral input, and the right input is the contralateral input.

The delay is applied relatively between the left and right binaural channels. The contralateral channel is always delayed relative to the ipsilateral channel. Therefore if the head angle is greater than zero (e.g., looking left), the left channel is delayed relative to the right. If the head angle is less than zero (e.g., looking right), the right channel is delayed relative to the left. If the head angle is zero, no ITD correction is performed. In some embodiments, both channels may be delayed, with the amount of relative delay dependent on the headtracking data. In these embodiments, the labels "delayed" and "undelayed" may be interpreted as "more delayed" and "less delayed".

The current orientation processor 910 generally calculates the delay (Equation 2) and the filter responses (Equations 9-10) for the current head orientation, based on the headtracking data 620 as processed by the head angle processor 902. The current orientation processor 910 includes a memory 911, a processor 912, channel mixers 913*a* and 913*b*, delays 914*a* and 914*b*, and filters 915*a* and 915*b*. The memory 911 stores the current head orientation. The processor 912 calculates the parameters for the channel mixers 913*a* and 913*b*, the delays 914*a* and 914*b*, and the filters 915*a* and 915*b*.

The channel mixers 913*a* and 913*b* selectively mix part of the left input signal 622 with the right input signal 624 and vice versa, based on the head angle $\theta$. This mixing process handles channel inversion for the cases of θ>90 and θ<90, which allows the system to calculate the equations to work smoothly across a full 360 degrees of head angles. The channel mixers 913*a* and 913*b* implement a dynamic matrix mixer, where the coefficients are a function of θ. The 2×2 mixing matrix coefficients M are defined in TABLE 1:

TABLE 1

| | | |
|---|---|---|
| M(0, 0) | left input to left output gain | sqrt(1 − (sin(θ/2)^2)) |
| M(0, 1) | left input to right output gain | sin(θ/2) |
| M(1, 0) | right input to left output gain | sin(θ/2) |
| M(1, 1) | right input to right output gain | sqrt(1 − (sin(θ/2)^2)) |

Figure 10:
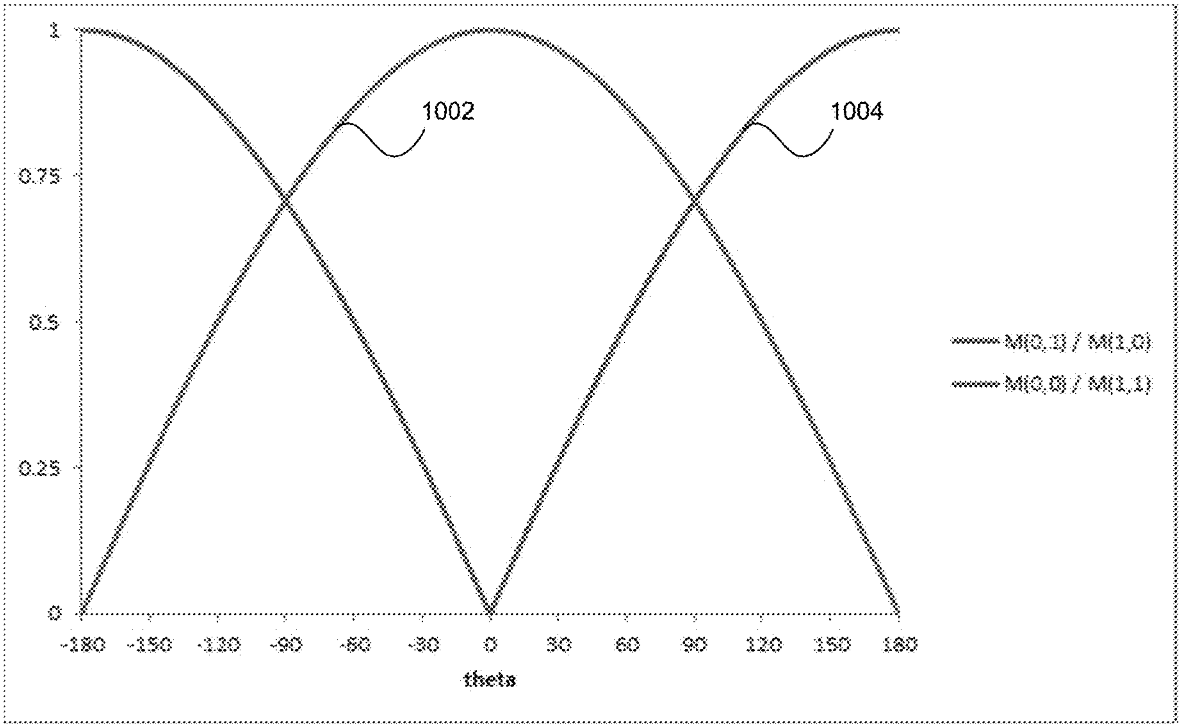
FIG. 10 shows a graphical representation of the functions implemented in TABLE 1.

FIG. 10 shows a graphical representation of the functions implemented in TABLE 1 over the range of −180 to +180 for θ. The line 1002 corresponds to the functions for M(0,1) and M(1,0), and the line 1004 corresponds to the functions for M(0,0) and M(1,1).

The delays 914*a* and 914*b* generally apply the delay (see Equation 2) calculated by the processor 912. For example, when the headtracking data 620 indicates a leftward orientation (e.g., as in FIG. 3A), the delay 914*a* delays the left input signal 622, and the delay 914*b* does not delay the right input signal 624 (e.g., as in FIG. 7). When the headtracking data 620 indicates a rightward orientation (e.g., as in FIG. 3B), the delay 914*a* does not delay the left input signal 622, and the delay 914*b* delays the right input signal 624 (e.g., as in FIG. 8).

The filters 915*a* and 915*b* generally apply the filters (see Equations 9-10) calculated by the processor 912. For example, when the headtracking data 620 indicates a leftward orientation (e.g., as in FIG. 3A), the filter 915*a* is configured as Hcontra, and the filter 915*b* is configured as Hipsi (e.g., as in FIG. 7). When the headtracking data 620 indicates a rightward orientation (e.g., as in FIG. 3B), the filter 915*a* is configured as Hipsi, and the filter 915*b* is configured as Hcontra (e.g., as in FIG. 8). The filters 915*a* and 915*b* may be implemented as infinite impulse response (IIR) filters.

The previous orientation processor 920 generally calculates the delay (Equation 2) and the filter responses (Equations 9-10) for the previous head orientation, based on the headtracking data 620 as processed by the head angle processor 902. The previous orientation processor 920 includes a memory 921, a processor 922, channel mixers 923*a* and 923*b*, delays 924*a* and 924*b*, and filters 925*a* and 925*b*. The memory 921 stores the previous head orientation. The remainder of the components operate in a similar manner to the similar components of the current orientation processor 910, but operate on the previous head angle (instead of the current head angle).

The delay 930 delays by the block size (e.g., 256 samples), then stores the current head orientation (from the memory 911) in the memory 921 as the previous head orientation. As discussed above, the system 900 operates on blocks of samples of the pre-rendered binaural audio signal. When the head angle θ changes, the system 900 computes the equations twice: once for the previous head angle by the previous orientation processor 920, and once for the current head angle by the current orientation processor 910. The current orientation processor 910 outputs a current left intermediate output 952*a* and a current right intermediate output 954*a*. The previous orientation processor 920 outputs a previous left intermediate output 952*b* and a previous right intermediate output 954*b*.

The left cross-fade 942 and right cross-fade 944 generally perform cross-fading on the intermediate outputs from the current orientation processor 910 and the previous orientation processor 920. The left cross-fade 942 performs cross-fading of the current left intermediate output 952*a* and the previous left intermediate output 952*b* to generate the output left signal 632. The right cross-fade 944 performs cross-fading of the current right intermediate output 954*a* and the previous right intermediate output 954*b* to generate the output right signal 634. The left cross-fade 942 and right cross-fade 944 may be implemented with linear cross-faders.

In general, the left cross-fade 942 and right cross-fade 944 enable the system 900 to avoid clicks in the audio when the head angle changes. In alternative embodiments, the left cross-fade 942 and right cross-fade 944 may be replaced with circuits to limit the slew rate of the changes in the delay and filter coefficients.

Figure 11A:
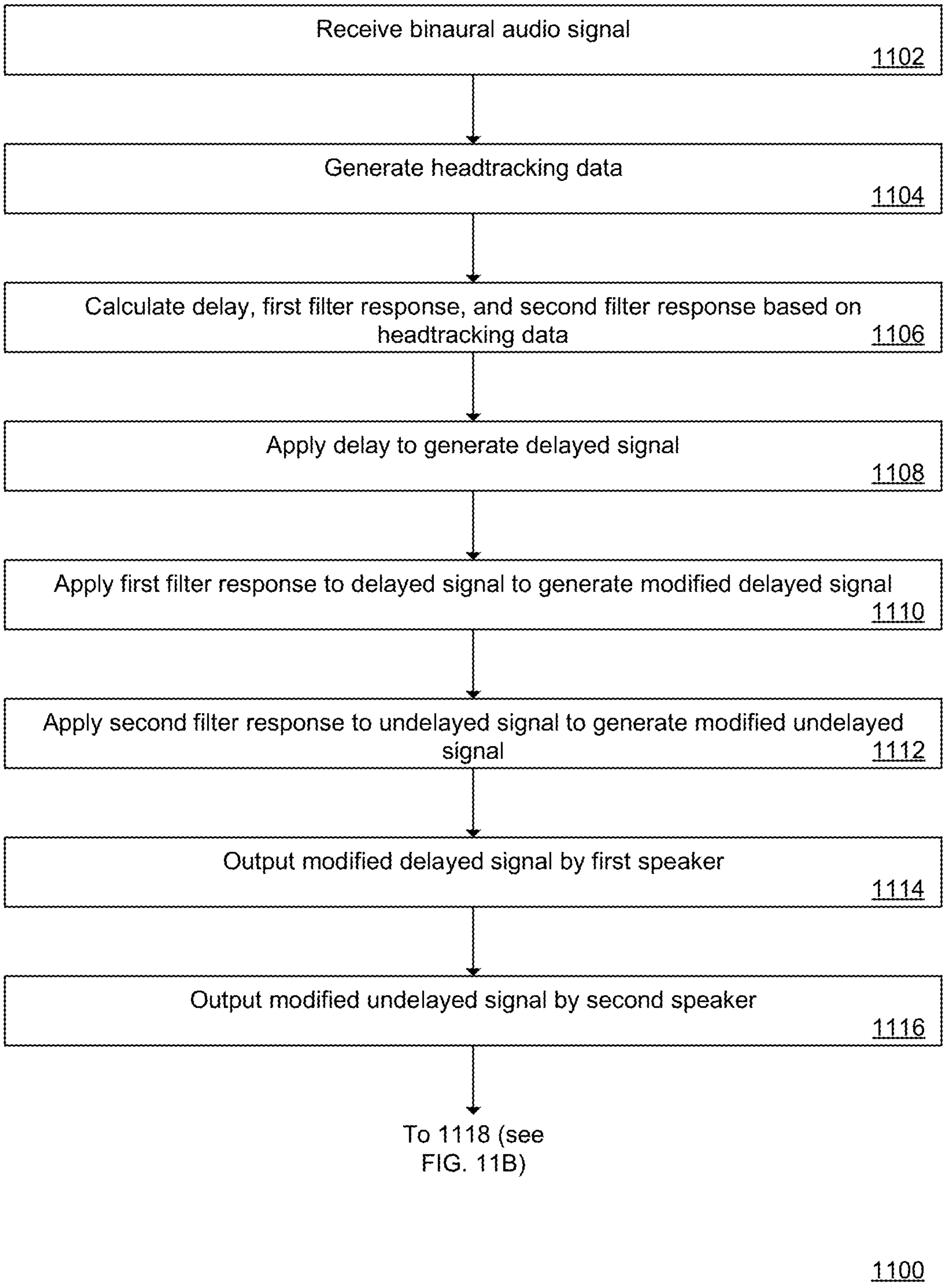
FIGS. 11A-11B are flowcharts of a method 1100 of modifying a binaural signal using headtracking information.
Figure 11B:
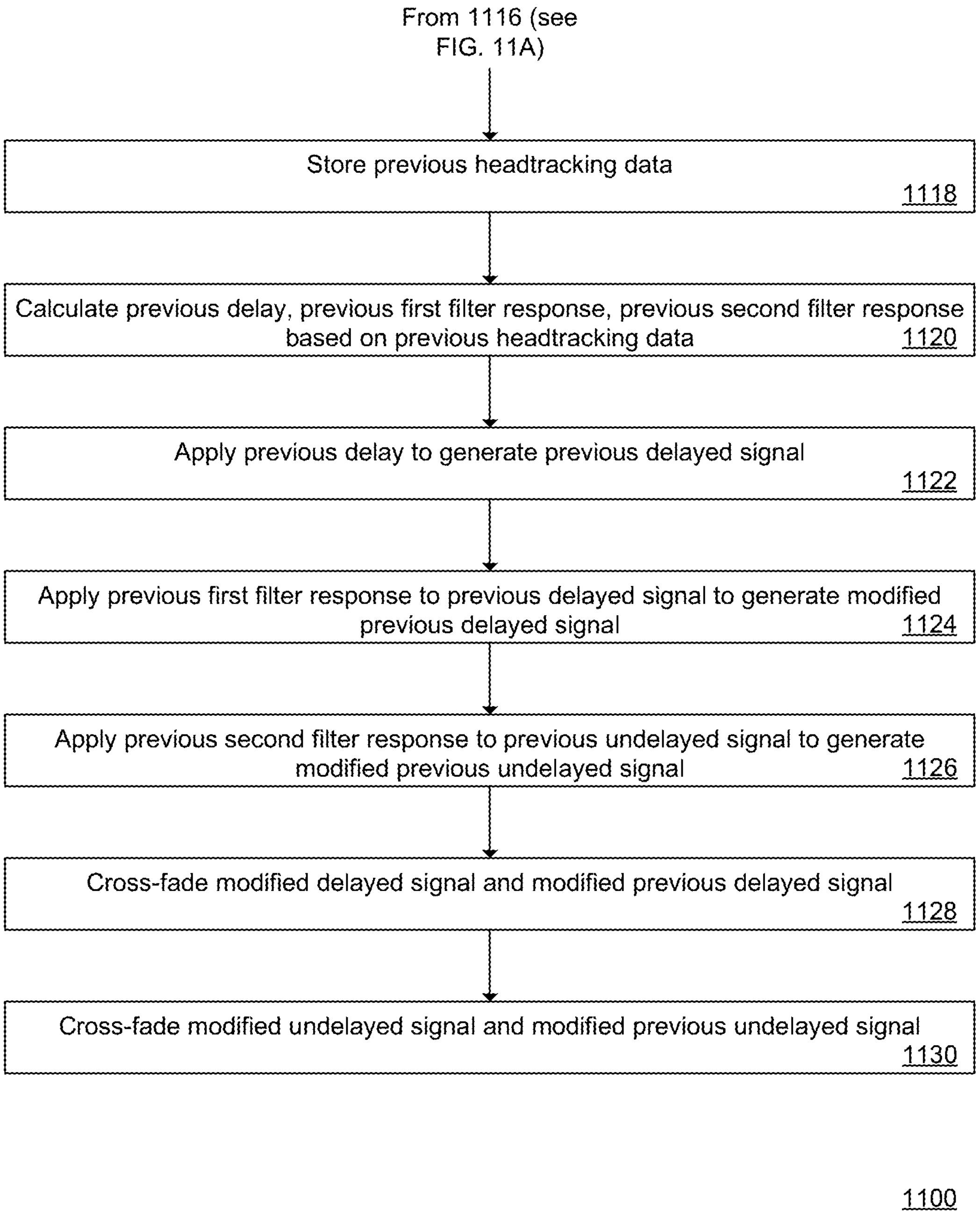

FIGS. 11A-11B are flowcharts of a method 1100 of modifying a binaural signal using headtracking information. The method 1100 may be performed by the system 900 (see FIG. 9), the system 600 (see FIG. 6 or FIG. 7 or FIG. 8), etc. The method 1100 may be implemented as a computer program that is stored by a memory of a system or executed by a processor of a system, such as the processor 502 of FIG. 5.

At 1102, a binaural audio signal is received. The binaural audio signal includes a first signal and a second signal. A headset may receive the binaural audio signal. For example, the headset 400 (see FIG. 4) receives the pre-rendered binaural audio signal 410, which includes an input left signal 622 and an input right signal 624 (see FIG. 6).

At 1104, headtracking data is generated. A sensor may generate the headtracking data. The headtracking data relates to an orientation of the headset. For example, the sensor 512 (see FIG. 5) may generate the headtracking data.

At 1106, a delay is calculated based on the headtracking data, a first filter response is calculated based on the headtracking data, and a second filter response is calculated based on the headtracking data. A processor may calculate the delay, the first filter response, and the second filter response. For example, the processor 502 (see FIG. 5) may calculate the delay using Equation 2, the filter response Hipsi using Equation 9, and the filter response Hcontra using Equation 10.

At 1108, the delay is applied to one of the first signal and the second signal, based on the headtracking data, to generate a delayed signal. The other of the first signal and the second signal is an undelayed signal. For example, in FIG. 7 the calculation block 602 uses the delay block 604 to apply the delay D to the input left signal 622 to generate the left delayed signal 742; the input right signal 624 is undelayed (the right undelayed signal 744). As another example, in FIG. 8 the calculation block 602 uses the delay block 606 to apply the delay D to the right input signal 624 to generate the right delayed signal 844; the input left signal 622 is undelayed (the left undelayed signal 842).

At 1110, the first filter response is applied to the delayed signal to generate a modified delayed signal. For example, in FIG. 7 the calculation block 602 uses the filter 608 to apply the Hcontra filter response to the left delayed signal 742 to generate the output left signal 632. As another example, in FIG. 8 the calculation block 602 uses the filter 610 to apply the Hcontra filter response to the right delayed signal 844 to generate the output right signal 634.

At 1112, the second filter response is applied to the undelayed signal to generate a modified undelayed signal.

For example, in FIG. 7 the calculation block 602 uses the filter 610 to apply the Hipsi filter response to the right undelayed signal 744 to generate the output right signal 634. As another example, in FIG. 8 the calculation block 602 uses the filter 608 to apply the Hipsi filter response to the left undelayed signal 842 to generate the output left signal 632.

At 1114, the modified delayed signal is output by a first speaker of the headset according to the headtracking data. For example, when the input left signal 622 is delayed (see FIG. 7 and the signal 742), the left speaker 402 (see FIG. 4) outputs the output left signal 632. As another example, when the input right signal 624 is delayed (see FIG. 8 and the signal 844), the right speaker 404 (see FIG. 4) outputs the output right signal 634.

At 1116, the modified undelayed signal is output by a second speaker of the headset according to the headtracking data. For example, when the input right signal 624 is undelayed (see FIG. 7 and the signal 744), the right speaker 404 (see FIG. 4) outputs the output right signal 634. As another example, when the input left signal 622 is undelayed (see FIG. 8 and the signal 842), the left speaker 402 (see FIG. 4) outputs the output left signal 632.

For ease of description, the examples for steps 1102-1116 have been described with reference to the system 600 of FIGS. 6-8, but they are equally applicable to the system 900 of FIG. 9. For example, the current orientation processor 910 (see FIG. 9) as implemented by the processor 502 (see FIG. 5) may calculate and apply the delays and the filters (steps 1106-1112). However, the following steps 1118-1130 are more applicable to the system 900 of FIG. 9, and relate to the cross-fading aspects.

In steps 1118-1130 (see FIG. 11B), the headtracking data (of steps 1102-1116) is current headtracking data that relates to a current orientation of the headset, the delay (of steps 1102-1116) is a current delay, the first filter response (of steps 1102-1116) is a current first filter response, the second filter response (of steps 1102-1116) is a current second filter response, the delayed signal (of steps 1102-1116) is a current delayed signal, and the undelayed signal (of steps 1102-1116) is a current undelayed signal. For example, the current orientation processor 910 (see FIG. 9) may calculate and apply the delays and the filters based on the current headtracking data.

At 1118, previous headtracking data is stored. The previous headtracking data corresponds to the current headtracking data at a previous time. For example, the memory 921 (see FIG. 9) may store the previous head orientation, which corresponds to the current head orientation (stored in the memory 911) at a previous time (e.g., as delayed by the blocksize by the delay 930).

As 1120, a previous delay is calculated based on the previous headtracking data, a previous first filter response is calculated based on the previous headtracking data, and a previous second filter response is calculated based on the previous headtracking data. For example, the previous orientation processor 920 (see FIG. 9) as implemented by the processor 502 (see FIG. 5) may calculate the previous delay using Equation 2, the previous filter response Hipsi using Equation 9, and the previous filter response Hcontra using Equation 10.

At 1122, the previous delay is applied to one of the first signal and the second signal, based on the previous headtracking data, to generate a previous delayed signal. The other of the first signal and the second signal is a previous undelayed signal. For example, the previous orientation processor 920 (see FIG. 9) may apply the previous delay to either the input left signal 622 or the input right signal 624 (as mixed by the channel mixers 923*a* and 923*b*), using a respective one of the delays 924*a* and 924*b*.

At 1124, the previous first filter response is applied to the previous delayed signal to generate a modified previous delayed signal. For example, the previous orientation processor 920 (see FIG. 9) applies the previous filter response Hcontra to the previous delayed signal; the previous delayed signal is output from the respective one of the delays 924*a* and 924*b* (see 1120), depending upon which of the input left signal 622 or the input right signal 624 was delayed.

At 1126, the previous second filter response is applied to the previous undelayed signal to generate a modified previous undelayed signal. For example, the previous orientation processor 920 (see FIG. 9) applies the previous filter response Hipsi to the previous undelayed signal; the previous undelayed signal is output from the other of the delays 924*a* and 924*b* (see 1120), depending upon which of the input left signal 622 or the input right signal 624 was not delayed.

At 1128, the modified delayed signal and the modified previous delayed signal are cross-faded. The first speaker outputs the modified delayed signal and the modified previous delayed signal having been cross-faded (instead of outputting just the modified delayed signal, as in 1114). For example, when the input left signal 622 is delayed, the left cross-fade 942 (see FIG. 9) may cross-fade the current left intermediate output 952*a* and the previous left intermediate output 952*b* to generate the output left signal 632 for output by the left speaker 402 (see FIG. 4). As another example, when the input right signal 624 is delayed, the right cross-fade 944 (see FIG. 9) may cross-fade the current right intermediate output 954*a* and the previous right intermediate output 954*b* to generate the output right signal 634 for output by the right speaker 404 (see FIG. 4).

At 1130, the modified undelayed signal and the modified previous undelayed signal are cross-faded. The second speaker outputs the modified undelayed signal and the modified previous undelayed signal having been cross-faded (instead of outputting just the modified undelayed signal, as in 1114). For example, when the input left signal 622 is not delayed, the left cross-fade 942 (see FIG. 9) may cross-fade the current left intermediate output 952*a* and the previous left intermediate output 952*b* to generate the output left signal 632 for output by the left speaker 402 (see FIG. 4). As another example, when the input right signal 624 is not delayed, the right cross-fade 944 (see FIG. 9) may cross-fade the current right intermediate output 954*a* and the previous right intermediate output 954*b* to generate the output right signal 634 for output by the right speaker 404 (see FIG. 4).

The method 1100 may include additional steps or substeps, e.g. to implement other of the features discussed above regarding FIGS. 1-10.

Figure 12:
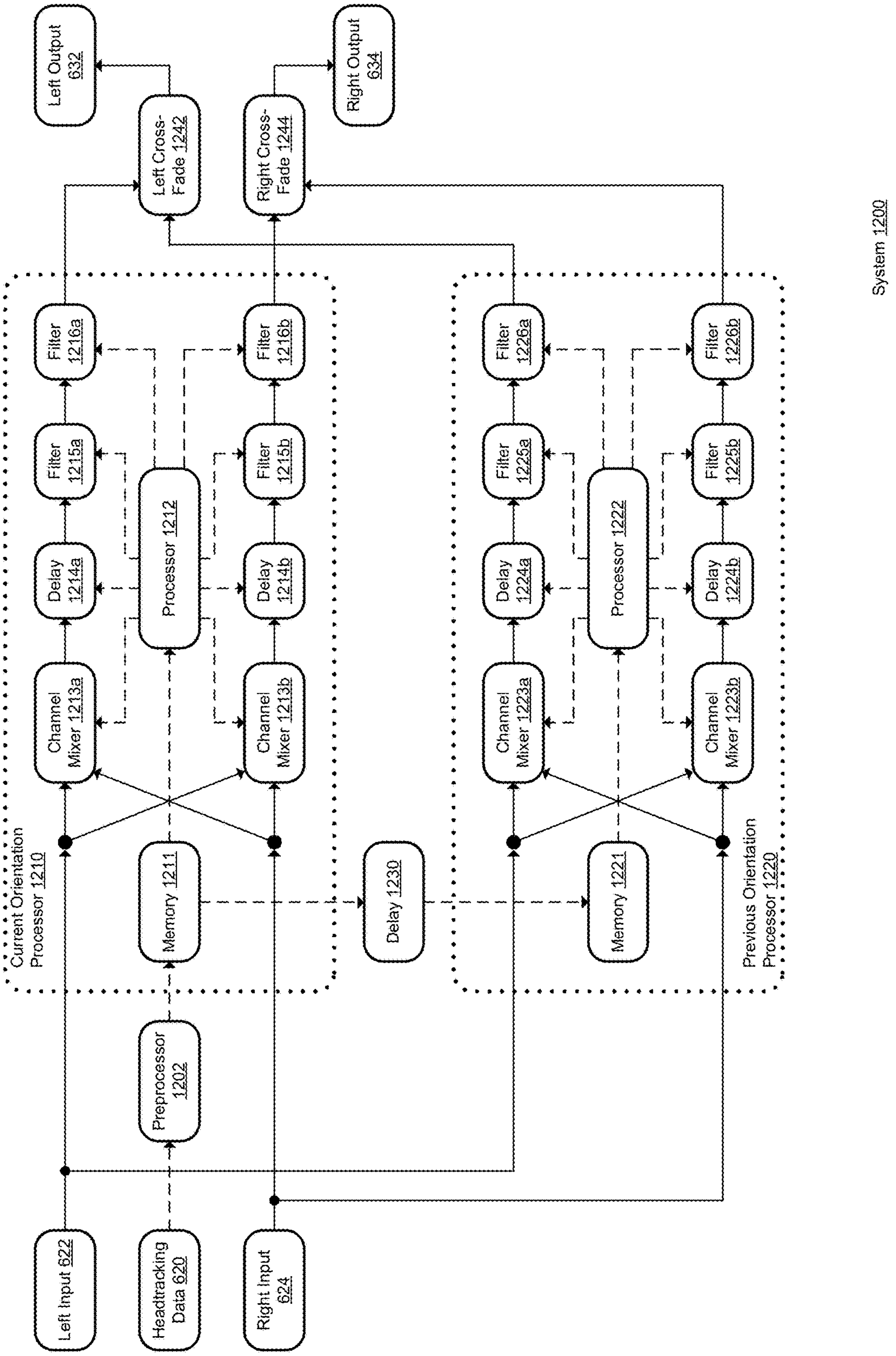
FIG. 12 is a block diagram of a system 1200 for using headtracking to modify a pre-rendered binaural audio signal.

FIG. 12 is a block diagram of a system 1200 for using headtracking to modify a pre-rendered binaural audio signal. The system 1200 may be implemented by the electronics 500 (see FIG. 5), and may be implemented in the headset 400 (see FIG. 4). The system 1200 is similar to the system 900 (see FIG. 9), with the addition of four filters 1216*a*, 1216*b*, 1226*a* and 1226*b*. Otherwise the components of the system 1200 (the preprocessor 1202, the memories 1211 and 1221, the current and previous orientation processors 1210 and 1220, the processors 1212 and 1222, the channel mixers 1213*a*, 1213*b*, 1223*a* and 1223*b*, the delays 1214*a*, 1214*b*, 1224*a* and 1224*b*, the filters 1215*a*, 1215*b*, 1225*a* and 1225*b*, and cross-fades 1242 and 1244) are similar to those with similar names and reference numerals as in the system 900 (see FIG. 9). In general, the system 1200 adds elevation processing to the system 900, in order to adjust the binaural audio signal as the orientation of the listener's head changes elevationally (e.g., upward or downward from the horizontal plane). The elevation of the listener's head may also be referred to as the tilt or pitch.

The pinna (outer ear) is responsible for directional cues relating to elevation. To simulate the effects of elevation, the filters 1216*a*, 1216*b*, 1226*a* and 1226*b* incorporate the ratio of an average pinna response when looking directly ahead to the response when the head is elevationally tilted. The filters 1216*a*, 1216*b*, 1226*a* and 1226*b* implement filter responses that change dynamically based on the elevation angle relative to the listener's head. If the listener is looking straight ahead, the ratio is 1:1 and no filtering is going on. This gives the benefit of no coloration of the sound when the head is pointed in the default direction (straight ahead). As the listener's head moves away from straight ahead, a larger change in the ratio occurs.

The processors 1212 and 1222 calculate the parameters for the filters 1216*a*, 1216*b*, 1226*a* and 1226*b*, similarly to the processors 912 and 922 of FIG. 9. In general, the filters 1216*a*, 1216*b*, 1226*a* and 1226*b* enable the system 1200 to operate between elevations of +90 degrees (e.g., straight up) and −45 degrees (halfway downward), from the horizontal plane.

To simulate the effects of headtracking for elevation, the filters 1216*a*, 1216*b*, 1226*a* and 1226*b* are used to mimic the difference between looking forward (or straight ahead) and looking up or down. These are derived by first doing a weighted average over multiple subjects, with anthropometric outliers removed, to obtain a generalized pinna related impulse response (PRIR) for a variety of directions. For example, generalized PRIRs may be obtained for straight ahead (e.g., 0 degrees elevation), looking upward at 45 degrees (e.g., −45 degrees elevation), and looking directly downward (e.g., +90 degrees elevation). According to various embodiments, the generalized PRIRs may be obtained for each degree (e.g., 135 PRIRs from +90 to −45 degrees), or for every five degrees (e.g., 28 PRIRs from +90 to −45 degrees), or for every ten degrees (e.g., 14 PRIRs from +90 to −45 degrees), etc. These generalized PRIRs may be stored in a memory of the system 1200 (e.g., in the memory 504 as implemented by the electronics 500). The system 1200 may interpolate between the stored generalized PRIRs, as desired, to accommodate elevations other than those of the stored generalized PRIRs. (As the just-noticeable distance (JND) for localization is about one degree, interpolation to resolutions finer than one degree may be avoided.)

Let P(θ, φ, f) be the generalized pinna related transfer function in the frequency domain, where θ is the azimuth angle and φ is the elevation angle. The ratio of the forward PRIR to the PRIR of the current orientation of the listener is given by Equation 19:

$$Pr(\theta,\varphi,f)=P(\theta,\varphi,f)/P(\theta,0,f) \tag{19}$$

In Equation 19, Pr(θ, φ, f) represents the ratio of the two PRIRs at any given frequency f, and 0 degrees is the elevation angle when looking forward or straight ahead.

These ratios are computed for any given "look" angle and applied to both left and right channels as the listener moves her head up and down. If the listener is looking straight ahead, the ratio is 1:1 and no net filtering is going on. This gives the benefit of no coloration of the sound when the head is pointed in the default direction (forward or straight ahead). As the listener's head moves away from straight ahead, a larger change in the ratio occurs. The net effect is that the default direction pinna cue is removed and the "look" angle pinna cue is inserted.

The system 1200 may implement a method similar to the method 1100 (see FIGS. 11A-11B), with the addition of steps to access, calculate and apply the parameters for the filters 1216*a*, 1216*b*, 1226*a* and 1226*b*. The filters 1216*a*, 1216*b*, 1226*a* and 1226*b* may be finite impulse response (FIR) filters. Alternatively, the filters 1216*a*, 1216*b*, 1226*a* and 1226*b* may be IIR filters.

Four-Channel Audio

Headtracking may also be used with four-channel audio, as further detailed below with reference to FIGS. 13-16.

Figure 13:
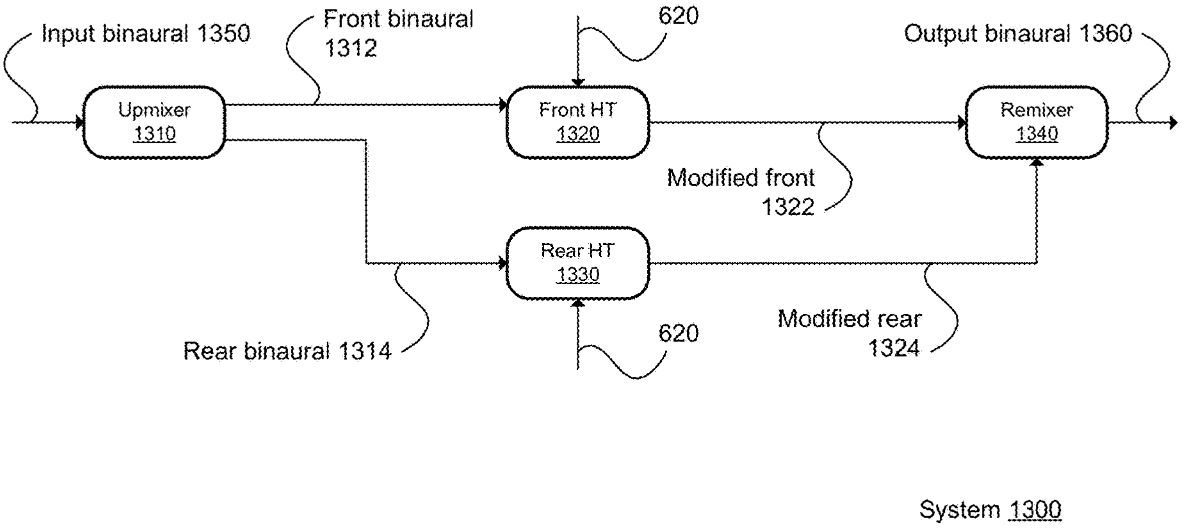
FIG. 13 is a block diagram of a system 1300 for using headtracking to modify a pre-rendered binaural audio signal using a 4-channel mode.

FIG. 13 is a block diagram of a system 1300 for using headtracking to modify a pre-rendered binaural audio signal using a 4-channel mode. The system 1300 may be implemented by the electronics 500 (see FIG. 5), and may be implemented in the headset 400 (see FIG. 4). The system 1300 includes an upmixer 1310, a front headtracking (HT) system 1320, a rear headtracking system 1330, and a remixer 1340. The system 1300 receives an input binaural signal 1350 (that includes left and right channels) and generates an output binaural signal 1360 (that includes left and right channels). As described more fully below, the system 1300 generally upmixes the input binaural signal 1350 into separate front and rear binaural signals, and processes the front binaural signal using the headtracking data 620 and the rear binaural signal using an inverse of the headtracking data 620. For example, a leftward turn of 5 degrees is processed as (+5 degrees) for the front, and as (−5 degrees) for the rear.

The upmixer 1310 generally receives the input binaural signal 1350 and upmixes it to generate a 4-channel binaural signal that includes a front binaural signal 1312 (that includes left and right channels) and a rear binaural signal 1314 (that includes left and right channels). In general, the front binaural signal 1312 includes the direct components (e.g., not including reverb components), and the rear binaural signal 1314 includes the diffuse components (e.g., the reverb components). The upmixer 1310 may generate the front binaural signal 1312 and the rear binaural signal 1314 in various ways, including using metadata and using a signal model.

Regarding the metadata, the input binaural signal 1350 may be a pre-rendered signal (e.g., similar to the binaural audio signal 410 of FIG. 4, including the left input 622 and right input 624), with the addition of metadata that further classifies the input binaural signal 1350 into front components (or direct components) and rear components (or diffuse components). The upmixer 1310 then uses the metadata to generate the front binaural signal 1312 using the front components, and the rear binaural signal 1314 using the rear components.

Regarding the signal model, the upmixer 1310 may generate the 4-channel binaural signal using a signal model that allows for a single steered (e.g., direct) signal between the inputs $L_T$ and $R_T$ with a diffuse signal in each input signal. The signal model is represented by Equations 20-25 for input $L_T$ and $R_T$ respectively. For simplicity, the time, frequency and complex signal notations have been omitted.

$$L_T=G_Ls+d_L \tag{20}$$

$$R_T=G_Rs+d_R \tag{21}$$

From Equation 20, $L_T$ is constructed from a gain $G_L$ multiplied by the steered signal s plus a diffuse signal dL. $R_T$ is similarly constructed as shown in Equation 21. It is further assumed that the power of the steered signal is $S^2$ as shown in Equation 22. The cross-correlation between s, $d_L$, and $d_R$ are all zero as shown in Equation 23, and power in the left diffuse signal ($d_L$) is equal to the power in the right diffuse signal ($d_R$), which are equal to $D^2$ as shown in Equation 24. With these assumptions, the covariance matrix between the input signals $L_T$ and $R_T$ is given by Equation 25.

$$E\{ss\} = S^2 \tag{22}$$

$$E\{sd_L\} = E\{sd_R\} = E\{d_L d_R\} = 0 \tag{23}$$

$$E\{d_L d_L\} = E\{d_R d_R\} = D^2 \tag{24}$$

$$\mathrm{cov}\{L_T R_T\} = \begin{bmatrix} G_L^2 S^2 + D^2 & G_L G_R S^2 \\ G_L G_R S^2 & G_R^2 S^2 + D^2 \end{bmatrix} \tag{25}$$

In order to separate out the steered signals from $L_T$ and $R_T$, a 2×2 signal dependent separation matrix is calculated using the least squares method as shown in Equation 26. The solution to the least squares equation is given by Equation 27. The separated steered signal s (e.g., the front binaural signal 1312) is therefore estimated by Equation 28. The diffuse signals $d_L$, and $d_R$ may then be calculated according to Equations 20-21 to give the combined diffuse signal d (e.g., the rear binaural signal 1314).

$$\min_W \left[ E\left\{ \left( \begin{bmatrix} G_L s \\ G_R s \end{bmatrix} - W \begin{bmatrix} G_L s + d_L \\ G_R s + d_R \end{bmatrix} \right)^2 \right\} \right] \tag{26}$$

$$W = \begin{bmatrix} \dfrac{G_L^2 S^2}{G_L^2 S^2 + G_R^2 S^2 + D^2} & \dfrac{G_L G_R S^2}{G_L^2 S^2 + G_R^2 S^2 + D^2} \\ \dfrac{G_L G_R S^2}{G_L^2 S^2 + G_R^2 S^2 + D^2} & \dfrac{G_R^2 S^2}{G_L^2 S^2 + G_R^2 S^2 + D^2} \end{bmatrix} \tag{27}$$

$$\begin{bmatrix} G_L s \\ G_R s \end{bmatrix} \cong W \begin{bmatrix} L_T \\ R_T \end{bmatrix} \tag{28}$$

The derivation of the signal dependent separation matrix W for time block m in processing band b with respect to signal statistic estimations X, Y and T is given by Equation 29.

$$W(m, b) = \begin{bmatrix} \dfrac{\sqrt{X(m, b)^2 + Y(m, b)^2} + Y(m, b)}{2T(m, b)} & \dfrac{X(m, b)}{2T(m, b)} \\ \dfrac{X(m, b)}{2T(m, b)} & \dfrac{\sqrt{X(m, b)^2 + Y(m, b)^2} + Y(m, b)}{2T(m, b)} \end{bmatrix} \tag{29}$$

The 3 measured signal statistics (X, Y and T) with respect to the assumed signal model are given by Equations 30 through 32. The result of substituting equations 30, 31 32 into Equation 29 is an estimate of the least squares solution given by Equation 33.

$$X \cong 2G_L G_R S^2 \tag{30}$$

$$Y \cong G_L^2 S^2 - G_R^2 S^2 \tag{31}$$

$$T \cong G_L^2 S^2 + G_R^2 S^2 + 2D^2 \tag{32}$$

$$W = \begin{bmatrix} \dfrac{G_L^2 S^2}{G_L^2 S^2 + G_R^2 S^2 + 2D^2} & \dfrac{G_L G_R S^2}{G_L^2 S^2 + G_R^2 S^2 + 2D^2} \\ \dfrac{G_L G_R S^2}{G_L^2 S^2 + G_R^2 S^2 + 2D^2} & \dfrac{G_R^2 S^2}{G_L^2 S^2 + G_R^2 S^2 + 2D^2} \end{bmatrix} \tag{33}$$

The front headtracking system 1320 generally receives the front binaural signal 1312 and generates a modified front binaural signal 1322 using the headtracking data 620. The front headtracking system 1320 may be implemented by the system 900 (see FIG. 9) or the system 1200 (see FIG. 12), depending upon whether or not elevational processing is to be performed. The front binaural signal 1312 is provided as the left input 622 and the right input 624 (see FIG. 9 or FIG. 12), and the left output 632 and the right output 634 (see FIG. 9 or FIG. 12) become the modified front binaural signal 1322.

The rear headtracking system 1330 generally receives the rear binaural signal 1314 and generates a modified rear binaural signal 1324 using an inverse of the headtracking data 620. The details of the rear headtracking system 1330 are shown in FIG. 14 or FIG. 15 (depending upon whether or not elevational processing is to be performed).

The remixer 1340 generally combines the modified front binaural signal 1322 and the modified rear binaural signal 1324 to generate the output binaural signal 1360. For example, the output binaural signal 1360 includes left and right channels, where the left channels is a combination of the respective left channels of the modified front binaural signal 1322 and the modified rear binaural signal 1324, and the right channel is a combination of the respective right channels thereof. The output binaural signal 1360 may then be output by speakers (e.g., by the headset 400 of FIG. 4).

Figure 14:
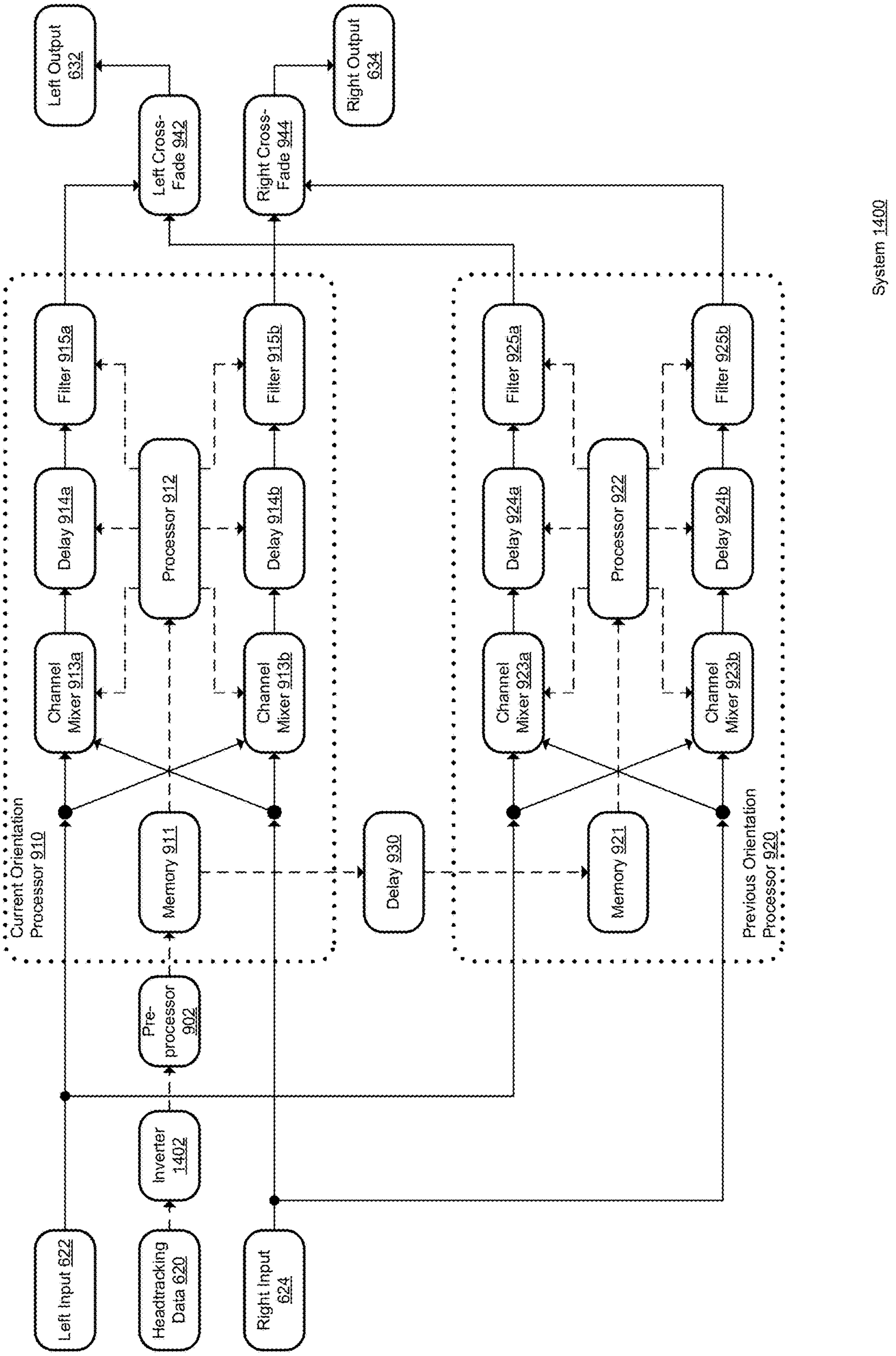
FIG. 14 is a block diagram of a system 1400 that implements the rear headtracking system 1330 (see FIG. 13) without using elevational processing.

FIG. 14 is a block diagram of a system 1400 that implements the rear headtracking system 1330 (see FIG. 13) without using elevational processing. The system 1400 is similar to the system 900 (see FIG. 9, with similar elements having similar labels), plus an inverter 1402. The inverter 1402 inverts the headtracking data 620 prior to processing by the preprocessor 902. For example, when the headtracking data 620 indicates a leftward turn of 5 degrees (+5 degrees), the inverter 1402 inverts the headtracking data 620 to (−5 degrees). The rear binaural signal 1314 (see FIG. 13) is provided as the left input 622 and the right input 624, and the left output 632 and the right output 634 become the modified rear binaural signal 1324 (see FIG. 13).

Figure 15:
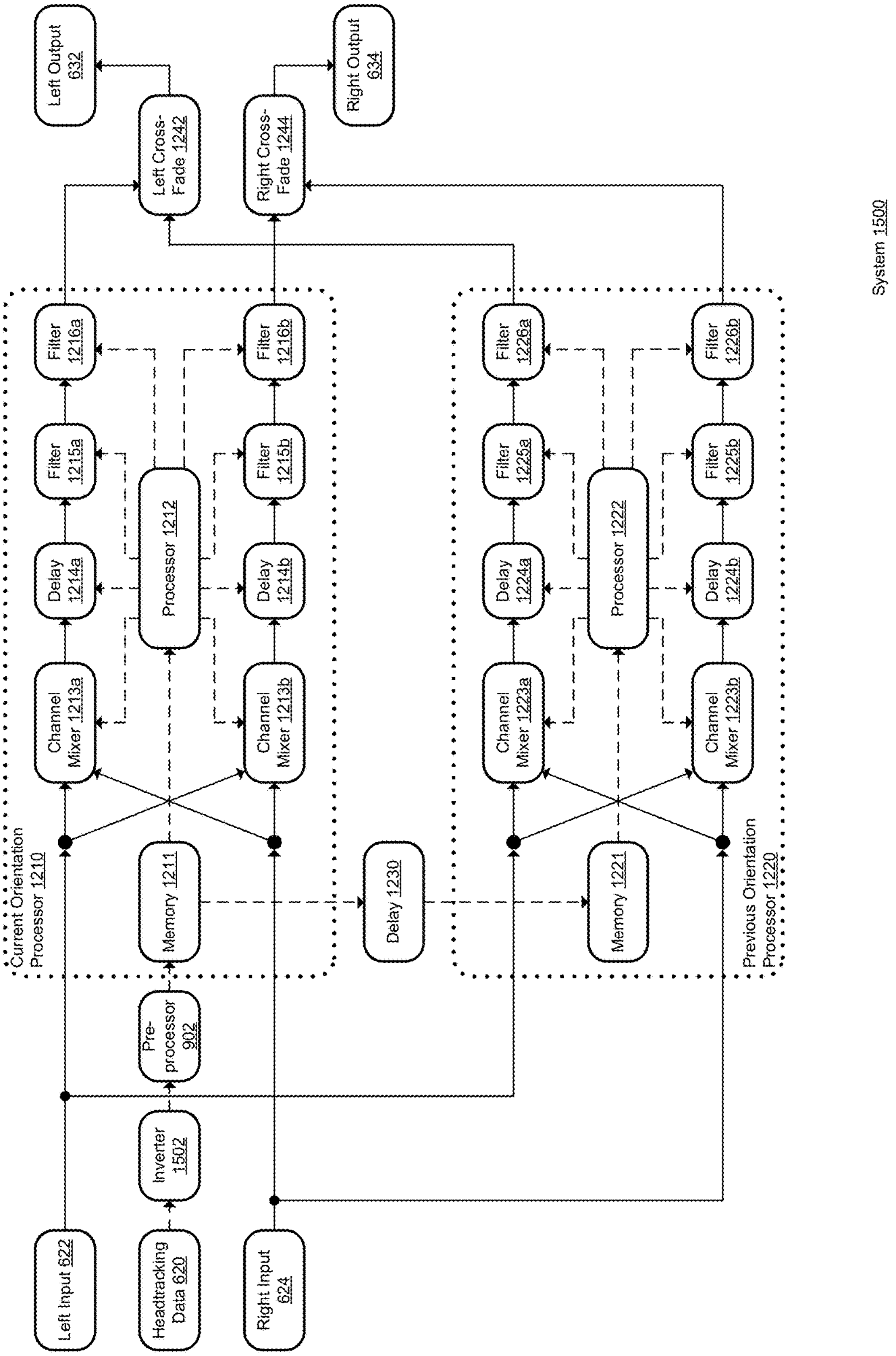
FIG. 15 is a block diagram of a system 1500 that implements the rear headtracking system 1330 (see FIG. 13) using elevational processing.

FIG. 15 is a block diagram of a system 1500 that implements the rear headtracking system 1330 (see FIG. 13) using elevational processing. The system 1500 is similar to the system 1200 (see FIG. 12, with similar elements having similar labels), plus an inverter 1502. The inverter 1502 inverts the headtracking data 620 prior to processing by the preprocessor 902. For example, when the headtracking data 620 indicates a leftward turn of 5 degrees (+5 degrees), the inverter 1502 inverts the headtracking data 620 to (−5 degrees). The rear binaural signal 1314 (see FIG. 13) is provided as the left input 622 and the right input 624, and the left output 632 and the right output 634 become the modified rear binaural signal 1324 (see FIG. 13).

Figure 16:
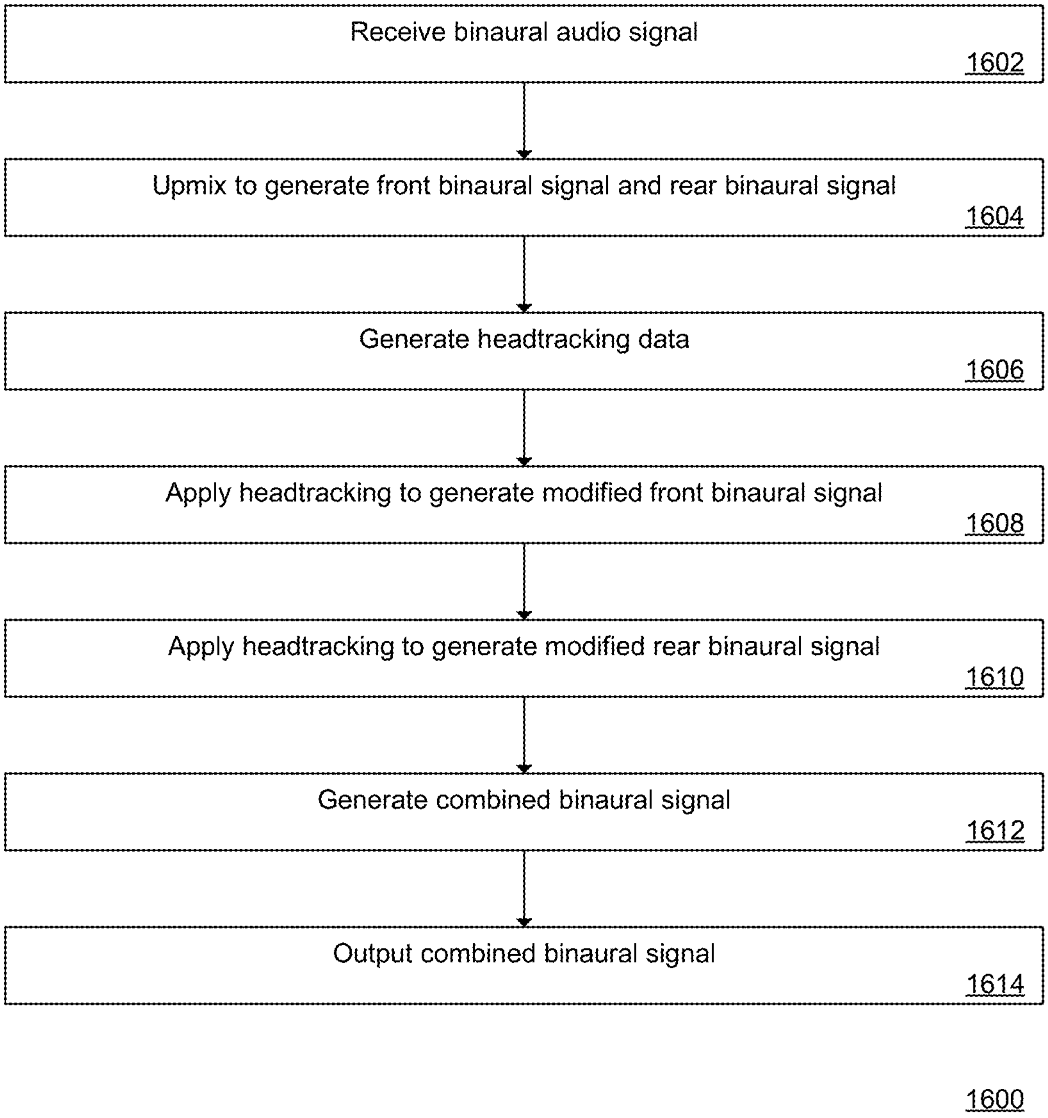
FIG. 16 is a flowchart of a method 1600 of modifying a binaural signal using headtracking information.

FIG. 16 is a flowchart of a method 1600 of modifying a binaural signal using headtracking information. The method 1600 may be performed by the system 1300 (see FIG. 13). The method 1600 may be implemented as a computer program that is stored by a memory of a system (e.g., the memory 504 of FIG. 5) or executed by a processor of a system (e.g., the processor 502 of FIG. 5).

At 1602, a binaural audio signal is received. A headset may receive the binaural audio signal. For example, the headset 400 (see FIG. 4) receives the pre-rendered binaural audio signal 410 (see FIG. 6).

At 1604, the binaural audio signal is upmixed into a four-channel binaural signal. The four-channel binaural signal includes a front binaural signal and a rear binaural signal. For example, the upmixer 1310 (see FIG. 13) upmixes the input binaural signal 1350 into the front binaural signal 1312 and the rear binaural signal 1314. The binaural audio signal may be upmixed using metadata or using a signal model.

At 1606, headtracking data is generated. The headtracking data relates to an orientation of the headset. A sensor may generate the headtracking data. For example, the sensor 512 (see FIG. 5) may generate the headtracking data. The sensor may be a component of the headset (e.g., the headset 400 of FIG. 4).

At 1608, the headtracking data is applied to the front binaural signal to generate a modified front binaural signal. For example, the front headtracking system 1320 (see FIG. 13) may use the headtracking data 620 to generate the modified front binaural signal 1322 from the front binaural signal 1312.

At 1610, an inverse of the headtracking data is applied to the rear binaural signal to generate a modified rear binaural signal. For example, the rear headtracking system 1330 (see FIG. 13) may use an inverse of the headtracking data 620 to generate the modified rear binaural signal 1324 from the rear binaural signal 1314.

At 1612, the modified front binaural signal and the modified rear binaural signal are combined to generate a combined binaural signal. For example, the remixer 1340 (see FIG. 13) may combine the modified front binaural signal 1322 and the modified rear binaural signal 1324 to generate the output binaural signal 1360.

At 1614, the combined binaural signal is output. For example, speakers 402 and 404 (see FIG. 4) may output the output binaural signal 1360.

The method 1600 may include further steps or substeps, e.g. to implement other of the features discussed above regarding FIGS. 13-15.

Parametric Binaural

Headtracking may also be used when decoding binaural audio using a parametric binaural presentation, as further detailed below with reference to FIGS. 17-29. Parametric binaural presentations can be obtained from a loudspeaker presentation by means of presentation transformation parameters that transform a loudspeaker presentation into a binaural (headphone) presentation. The general principle of parametric binaural presentations is described in International App. No. PCT/US2016/048497; and in U.S. Provisional App. No. 62/287,531. For completeness the operation principle of parametric binaural presentations is explained below and will be referred to as ‘parametric binaural’ in the sequel.

Figure 17:
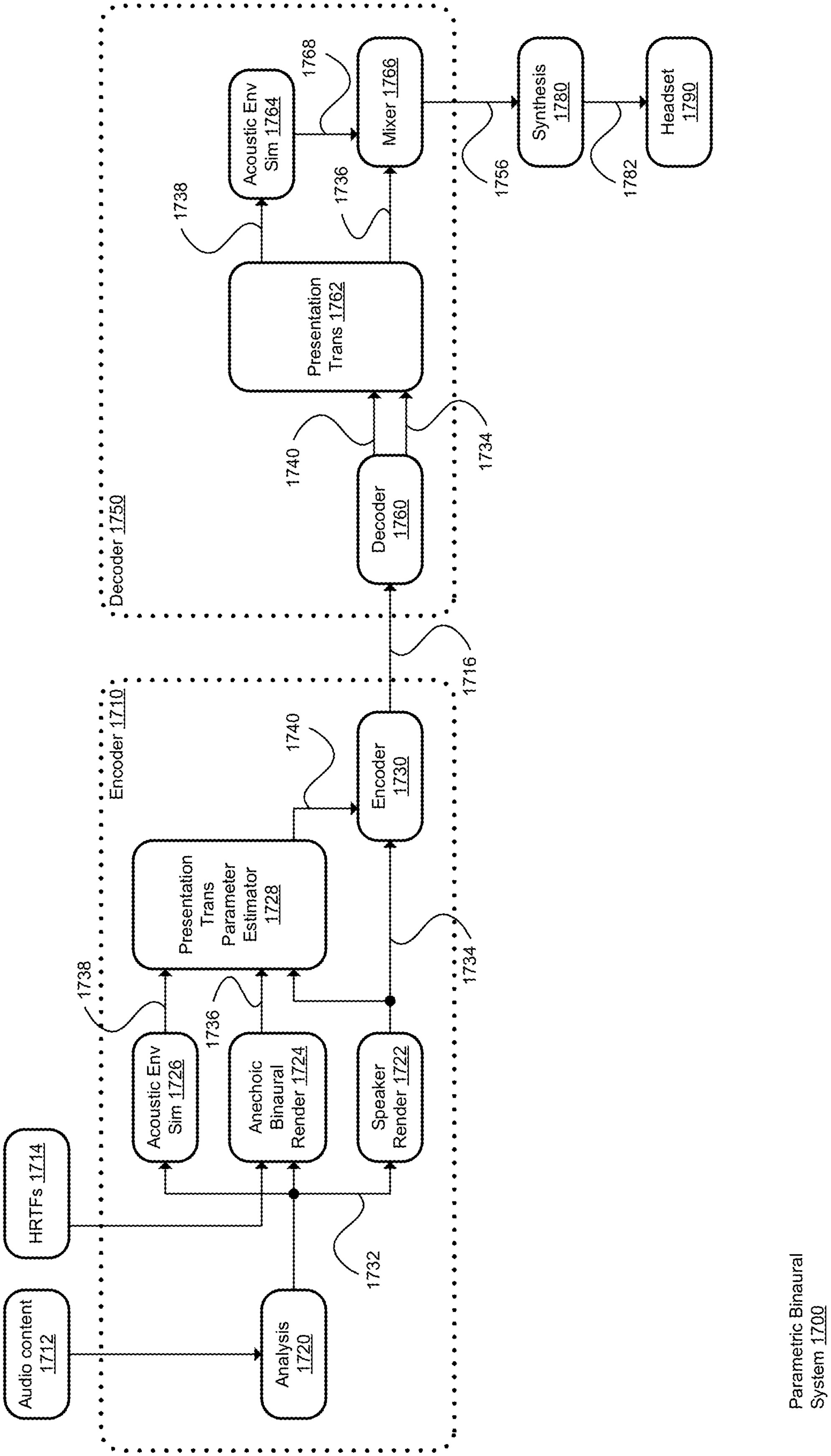
FIG. 17 is a block diagram of a parametric binaural system 1700 that provides an overview of a parametric binaural system.

FIG. 17 is a block diagram of a parametric binaural system 1700 that provides an overview of a parametric binaural system. The system 1700 may implement Dolby™ AC-4 encoding. The system 1700 may be implemented by one or more computer systems (e.g., that include the electronics 500 of FIG. 5). The system 1700 includes an encoder 1710, a decoder 1750, a synthesis block 1780, and a headset 1790.

The encoder 1710 generally transforms audio content 1712 using head-related transfer functions (HRTFs) 1714 to generate an encoded signal 1716. The audio content 1712 may be channel based or object based. The encoder 1710 includes an analysis block 1720, a speaker renderer 1722, an anechoic binaural renderer 1724, an acoustic environment simulation input matrix 1726, a presentation transformation parameter estimation block 1728, and an encoder block 1730.

The analysis block 1720 generates an analyzed signal 1732 by performing time-to-frequency analysis on the audio content 1712. The analysis block 1720 may also perform framing. The analysis block 1720 may implement a hybrid complex quadrature mirror filter (HCQMF).

The speaker renderer 1722 generates a loudspeaker signal 1734 (LoRo, where “L” and “R” indicate left and right components) from the analyzed signal 1732. The speaker renderer 1722 may perform matrixing or convolution.

The anechoic binaural renderer 1724 generates an anechoic binaural signal 1736 (LaRa) from the analyzed signal 1732 using the HRTFs 1714. In general, the anechoic binaural renderer 1724 convolves the input channels or objects of the analyzed signal 1732 with the HRTFs 1714 in order to simulate the acoustical pathway from an object position to both ears. The HRTFs may vary as a function of time if object-based audio is provided as input, based on positional metadata associated with one or more object-based audio inputs.

The acoustic environment simulation input matrix 1726 generates acoustic environment simulation input information 1738 (ASin) from the analyzed signal 1732. The acoustic environment simulation input information 1738 generates a signal intended as input for an artificial acoustical environment simulation algorithm.

The presentation transformation parameter estimation block 1728 generates presentation transformation parameters 1740 (W) that relate the anechoic binaural signal LaRa 1736 and the acoustic environment simulation input information ASin 1738 to the loudspeaker signal LoRo 1734. The presentation transformation parameters 1740 may also be referred to as presentation transformation information or parameters.

The encoder block 1730 generates the encoded signal 1716 using the loudspeaker signal LoRo 1734 and the presentation transformation parameters W 1740.

The decoder 1750 generally decodes the encoded signal 1716 into a decoded signal 1756. The decoder 1750 includes a decoder block 1760, a presentation transformation block 1762, an acoustic environment simulator 1764, and a mixer 1766.

The decoder block 1760 decodes the encoded signal 1716 to generate the presentation transformation parameters W 1740 and the loudspeaker signal LoRo 1734. The presentation transformation block 1762 transforms the loudspeaker signal LoRo 1734 using the presentation transformation parameters W 1740, in order to generate the anechoic binaural signal LaRa 1736 and the acoustic environment simulation input information ASin 1738. The presentation transformation process may include matrixing operations, convolution operations, or both. The acoustic environment simulator 1764 performs acoustic environment simulation using the acoustic environment simulation input information ASin 1738 to generate acoustic environment simulation output information ASout 1768 that models the artificial acoustical environment. There are many existing algorithms and methods to simulate an acoustical environment, which include convolution with a room impulse response, or algorithmic synthetic reverberation algorithms such as feedback-delay networks (FDNs). The mixer 1766 mixes the anechoic binaural signal LaRa 1736 and the acoustic environment simulation output information ASout 1768 to generate the decoded signal 1756.

The synthesis block 1780 performs frequency-to-time synthesis (e.g., HCQMF synthesis) on the decoded signal 1756 to generate a binaural signal 1782. The headset 1790 includes left and right speakers that output respective left and right components of the binaural signal 1782.

As discussed above, the system 1700 operates in a transform (frequency) or filterbank domain, using (for example) HCQMF, discrete Fourier transform (DFT), modified discrete cosine transform (MDCT), etc.

In this manner, the decoder 1750 generates the anechoic binaural signal (LaRa 1736) by means of the presentation transformation block 1762 and mixes it with a "rendered at the time of listening" acoustic environment simulation output signal (ASout 1768). This mix (the decoded signal 1756) is then presented to the listener via the headphones 1790.

Headtracking may be added to the decoder 1750 according to various options, as described with reference to FIGS. 18-29.

Figure 18:
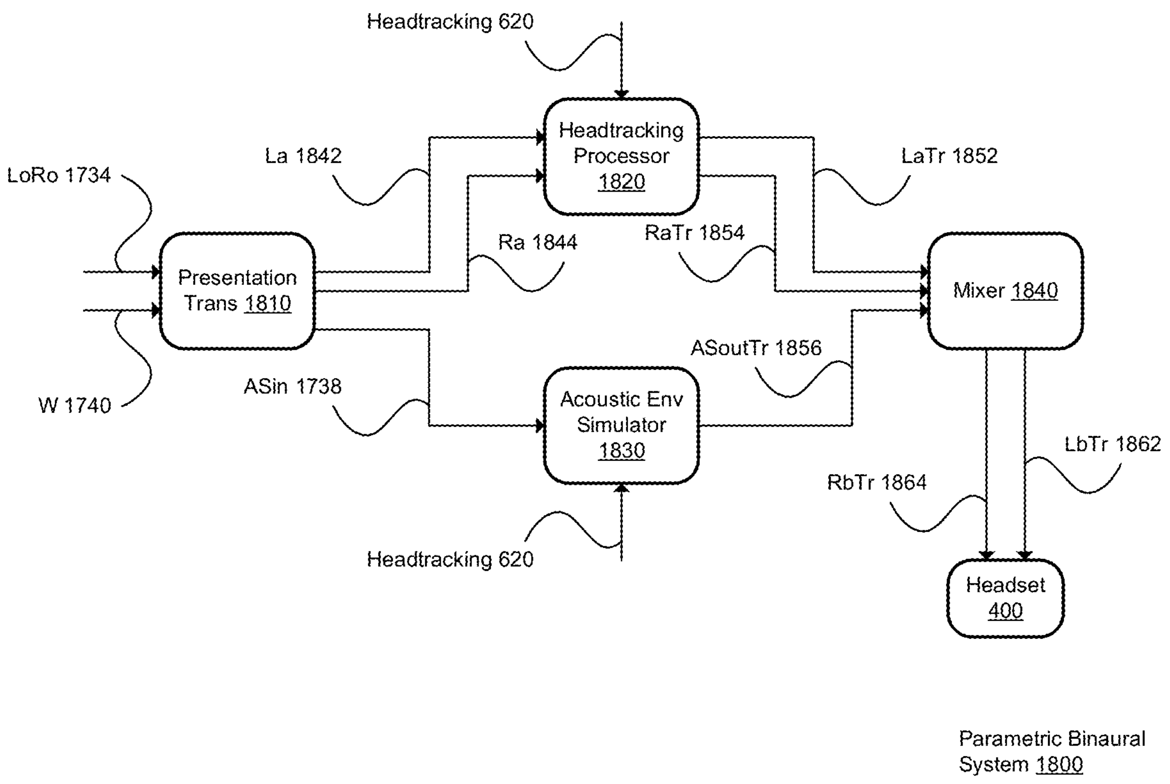
FIG. 18 is a block diagram of a parametric binaural system 1800 that adds headtracking to the stereo parametric binaural decoder 1750 (see FIG. 17).

FIG. 18 is a block diagram of a parametric binaural system 1800 that adds headtracking to the stereo parametric binaural decoder 1750 (see FIG. 17). The system 1800 may be implemented by electronics or by a computer system that includes electronics (e.g., the electronics 500 of FIG. 5). The system 1800 may connect to, or be a component of, a headset (e.g., the headset 400 of FIG. 4). Various of the elements use the same labels as in previous figures (e.g., the headtracking data 620 of FIG. 6, the loudspeaker signal LoRo 1734 of FIG. 17, etc.). The system 1800 includes a presentation transformation block 1810, a headtracking processor 1820, an acoustic environment simulator 1830, and a mixer 1840. The system 1800 operates on various signals, including a left anechoic (HRTF processed) signal 1842 (La), a right anechoic (HRTF processed) signal 1844 (Ra), a headtracked left anechoic (HRTF processed) signal 1852 (LaTr), a headtracked right anechoic (HRTF processed) signal 1854 (RaTr), headtracked acoustic environment simulation output information 1856 (ASoutTr), a headtracked left binaural signal 1862 (LbTr), and a headtracked right binaural signal 1864 (RbTr).

The presentation transformation block 1810 receives the loudspeaker signal LoRo 1734 and the presentation transformation parameters W 1740, and generates the left anechoic signal La 1842, the right anechoic signal Ra 1844, and the acoustic environment simulation input information ASin 1738. The presentation transformation block 1810 may implement signal matrixing and convolution in a manner similar to the presentation transformation block 1762 (see FIG. 17). The left anechoic signal La 1842 and the right anechoic signal Ra 1844 collectively form the anechoic binaural signal LaRa 1736 (see FIG. 17).

The headtracking processor 1820 processes the left anechoic signal La 1842 and the right anechoic signal Ra 1844 using the headtracking data 620 to generate the headtracked left anechoic signal LaTr 1852 and the headtracked right anechoic signal RaTr 1854.

The acoustic environment simulator 1830 processes the acoustic environment simulation input information ASin 1738 using the headtracking data 620 to generate the headtracked acoustic environment simulation output information ASoutTr 1856.

The mixer 1840 mixes the headtracked left anechoic signal LaTr 1852, the headtracked right anechoic signal RaTr 1854, and the headtracked acoustic environment simulation output information ASoutTr 1856 to generate the headtracked left binaural signal LbTr 1862 and the headtracked right binaural signal RbTr 1864.

The headset 400 (see FIG. 4) outputs the headtracked left binaural signal LbTr 1862 and the headtracked right binaural signal RbTr 1864 via respective left and right speakers.

Figure 19:
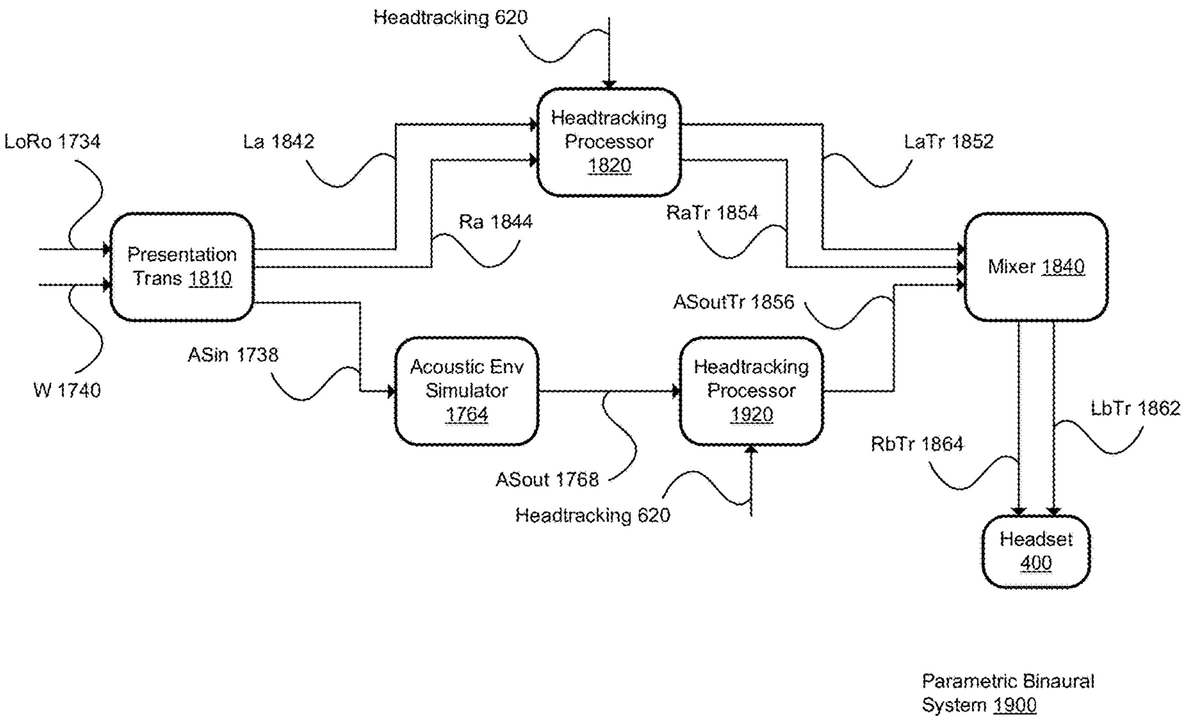
FIG. 19 is a block diagram of a parametric binaural system 1900 that adds headtracking to the decoder 1750 (see FIG. 17).

FIG. 19 is a block diagram of a parametric binaural system 1900 that adds headtracking to the decoder 1750 (see FIG. 17). The system 1900 may be implemented by electronics or by a computer system that includes electronics (e.g., the electronics 500 of FIG. 5). Various of the elements use the same labels as in previous figures (e.g., the headtracking data 620 of FIG. 6, the acoustic environment simulator 1764 of FIG. 17, the headtracking processor 1820 of FIG. 18, etc.). The system 1900 includes the presentation transformation block 1810 (see FIG. 18), the headtracking processor 1820 (see FIG. 18), the acoustic environment simulator 1764 (see FIG. 17), a headtracking processor 1920, and the mixer 1840 (see FIG. 18). The presentation transformation block 1810, headtracking processor 1820, acoustic environment simulator 1764, mixer 1840, and headset 400 operate as described above regarding FIGS. 17-18.

The headtracking processor 1920 processes the acoustic environment simulation output information ASout 1768 using the headtracking data 620 to generate the headtracked acoustic environment simulation output information ASoutTr 1856.

As compared to FIG. 18, note that the system 1800 applies headtracking to the acoustic environment simulation input information ASin 1738, whereas the system 1900 applies headtracking to the acoustic environment simulation output information ASout 1768. Alternatively, the system 1800 may only apply head tracking to anechoic binaural signals La 1842 and Ra 1844, and not to the acoustic environment signals (e.g., the acoustic environment simulator 1830 may be omitted, and the mixer 1840 may operate on the acoustic environment simulation input information ASin 1738 instead of the headtracked acoustic environment simulation output information ASoutTr 1856).

Figure 20:
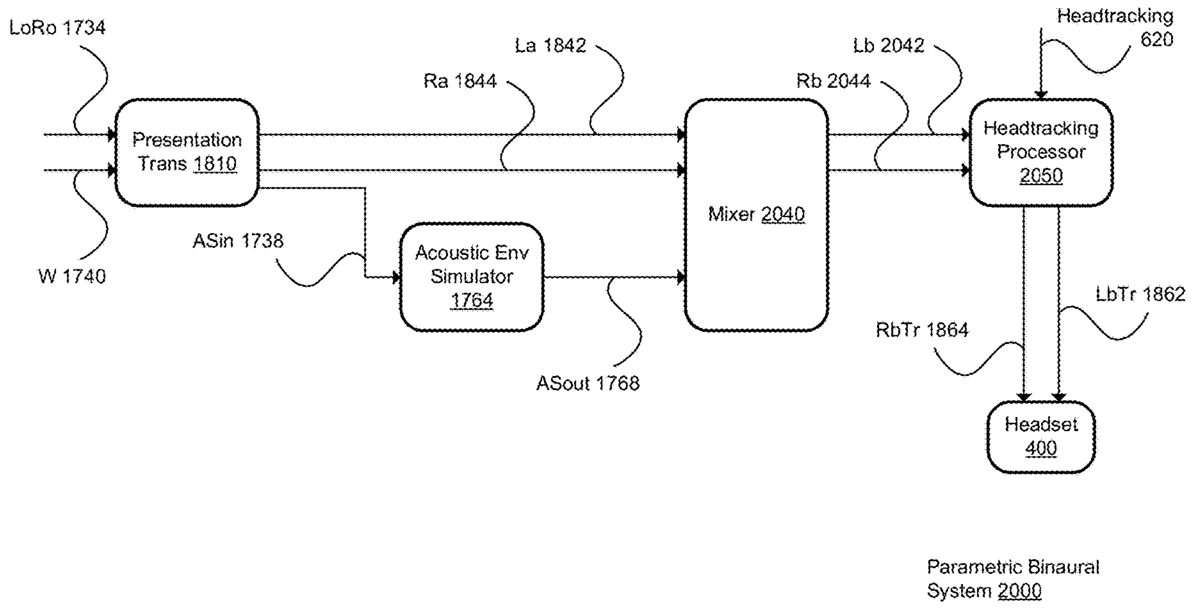
FIG. 20 is a block diagram of a parametric binaural system 2000 that adds headtracking to the decoder 1750 (see FIG. 17).

FIG. 20 is a block diagram of a parametric binaural system 2000 that adds headtracking to the decoder 1750 (see FIG. 17). The system 2000 may be implemented by electronics or by a computer system that includes electronics (e.g., the electronics 500 of FIG. 5). Various of the elements use the same labels as in previous figures (e.g., the headtracking data 620 of FIG. 6, the acoustic environment simulator 1764 of FIG. 17, etc.). The system 2000 includes the presentation transformation block 1810 (see FIG. 18), the acoustic environment simulator 1764 (see FIG. 17), a mixer 2040, and a headtracking processor 2050. The presentation transformation block 1810, acoustic environment simulator 1764, and headset 400 operate as described above regarding FIGS. 17-18.

The mixer 2040 mixes the left anechoic signal La 1842, the right anechoic signal Ra 1844, and the acoustic environment simulation output information ASout 1768 to generate a left binaural signal 2042 (Lb) and a right binaural signal 2044 (Rb).

The headtracking processor 2050 applies the headtracking data 620 to the left binaural signal Lb 2042 and the right binaural signal Rb 2044 to generate the headtracked left binaural signal LbTr 1862 and the headtracked right binaural signal RbTr 1864.

As compared to FIGS. 18-19, note that the systems 1800 and 1900 apply headtracking prior to mixing, whereas the system 2000 applies headtracking after mixing.

Figure 21:
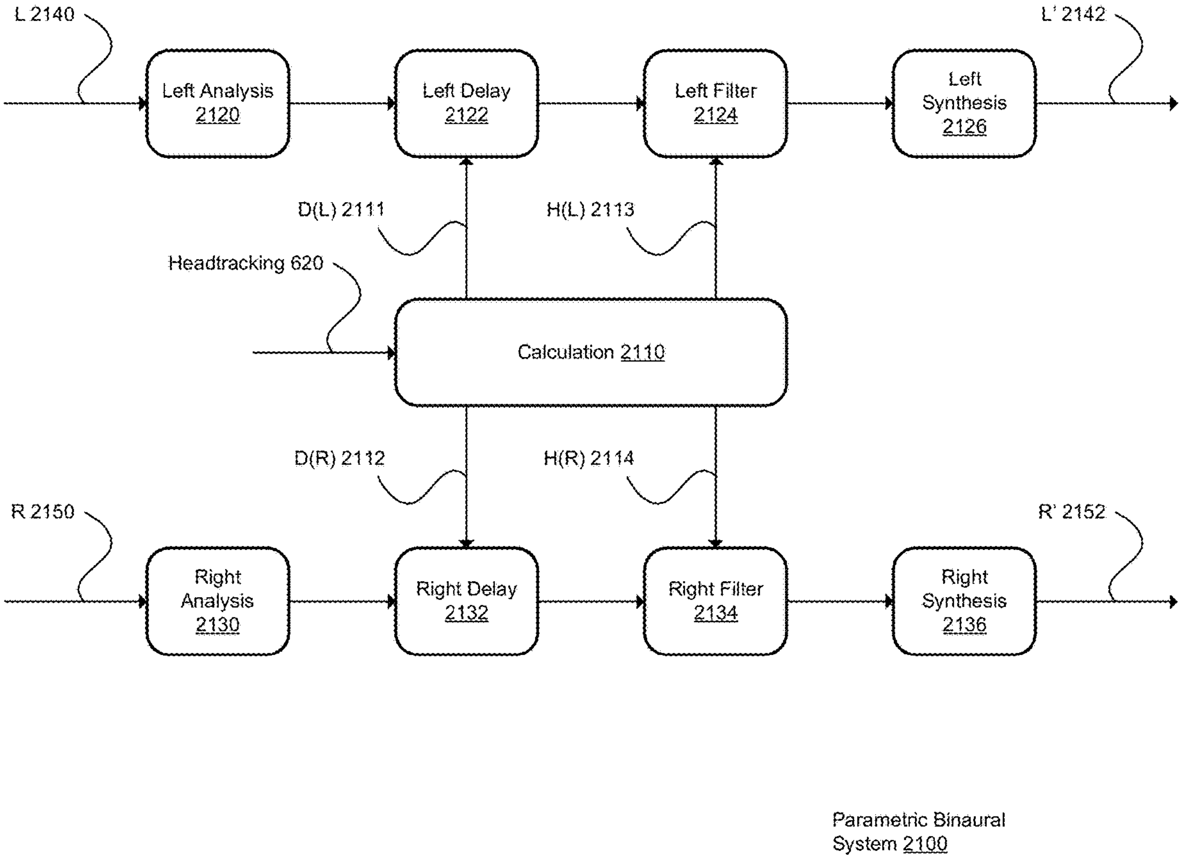
FIG. 21 is a block diagram of a parametric binaural system 2100 that modifies a binaural audio signal using headtracking information.

FIG. 21 is a block diagram of a parametric binaural system 2100 that modifies a binaural audio signal using headtracking information. The system 2100 is shown as functional blocks, in order to illustrate the operation of the headtracking system. The system 2100 may be implemented by the electronics 500 (see FIG. 5). The system 2100 is similar to the system 600 (see FIG. 6), with similar components being named similarly, but having different numbers; also, the system 2100 adds additional components for operation in the transform (frequency) domain. The system 2100 includes a calculation block 2110, a left analysis block 2120, a left delay block 2122, a left filter block 2124, a left synthesis block 2126, a right analysis block 2130, a right delay block 2132, a right filter block 2134, and a right synthesis block 2136. The system 2100 receives as inputs headtracking data 620, an input left signal L 2140, and an input right signal R 2150. The system 2100 generates as outputs an output left signal L' 2142 and an output right signal R' 2152.

In general, the calculation block 2110 generates a delay and filter parameters based on the headtracking data 620, provides a left delay D(L) 2111 to the left delay block 2122, provides a right delay D(R) 2112 to the right delay block 2132, provides the left filter parameters H(L) 2113 to the left filter block 2124, and provides the right filter parameters H(R) 2114 to the right filter block 2134.

As discussed above regarding FIG. 17, parametric binaural methods may be implemented in the transform (frequency) domain (e.g., the (hybrid) QMF domain, the HCQMF domain, etc.), whereas other of the systems described above (e.g., FIGS. 6-9, 12, etc.) operate in the time domain using delays, filtering and cross-fading. To integrate these features, the left analysis block 2120 performs time-to-frequency analysis of the input left signal L 2140 and provides the analyzed signal to the left delay block 2122; the right analysis block 2130 performs time-to-frequency analysis of the input right signal R 2150 and provides the analyzed signal to the right delay block 2132; the left synthesis block 2126 performs frequency-to-time synthesis on the output of the left filter 2124 to generate the output left signal L' 2142; and the right synthesis block 2136 performs frequency-to-time synthesis on the output of the right filter 2134 to generate the output right signal R' 2152. As such, the calculation block 2110 generates transform-domain representations (instead of time-domain representations) for the left delay D(L) 2111, the right delay D(R) 2112, the left filter parameters H(L) 2113, and the right filter parameters H(R) 2114. The filter coefficients and delay values may otherwise be calculated as discussed above regarding FIG. 6.

Figure 22:
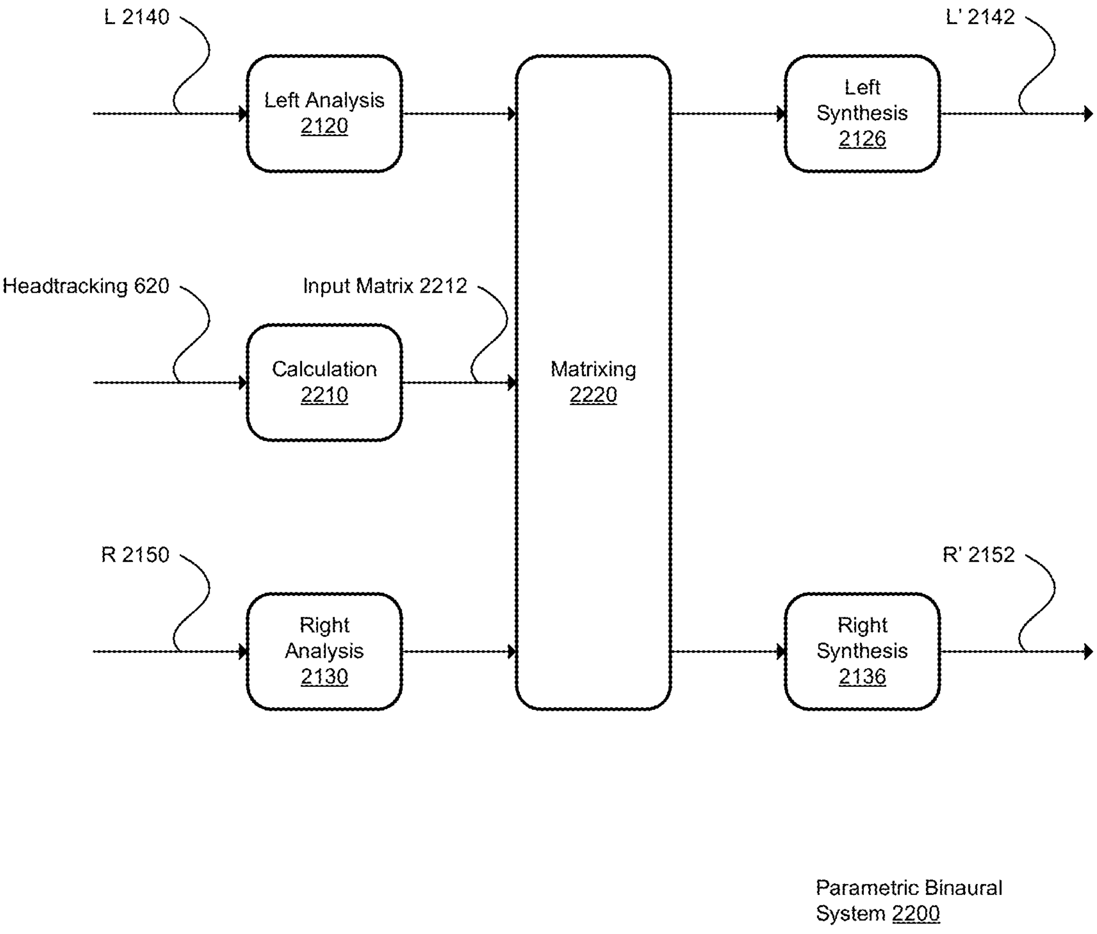
FIG. 22 is a block diagram of a parametric binaural system 2200 that modifies a binaural audio signal using headtracking information.

FIG. 22 is a block diagram of a parametric binaural system 2200 that modifies a binaural audio signal using headtracking information. The system 2200 is shown as functional blocks, in order to illustrate the operation of the headtracking system. The system 2200 may be implemented by the electronics 500 (see FIG. 5). The system 2200 is similar to the system 2100 (see FIG. 21), with similar blocks having similar names or numbers. As compared to the system 2100, the system 2200 includes a calculation block 2210 and a matrixing block 2220.

In a frequency-domain representation, a delay may be approximated by a phase shift for each frequency band, and a filter may be approximated by a scalar in each frequency band. The calculation block 2210 and the matrixing block 2220 then implement these approximations. Specifically, the calculation block 2210 generates an input matrix 2212 for each frequency band. The input matrix $M_{Head}$ 2212 may be a 2×2, complex-valued input-output matrix. The matrixing block 2220 applies the input matrix 2212, for each frequency band, to the input left signal L 2140 and the input right signal R 2150 (after processing by the respective left analysis block 2120 and right analysis block 2130), to generate the inputs to the respective left synthesis block 2126 and right synthesis block 2136. The magnitude and phase parameters of the matrix may be obtained by sampling the phase and magnitude of the delay and filter operations given in FIG. 21 (e.g., in the HCQMF domain, at the center frequency of the HCQMF band).

More specifically, if the delays D(L) 2111 and D(R) 2112 (see FIG. 21) are given in seconds, the filters H(L) 2113 and H(R) 2114 are given in discrete-time representations (e.g., discrete-time transforms such as Z-transforms) H(L, z) and H(R, z), and the center frequency of a given HCQMF band is given by f, one realization of the matrix operation implemented by the matrixing block 2220 is given by substituting z=exp(2πj f):

$$\begin{bmatrix} L' \\ R' \end{bmatrix} = M_{Head}\begin{bmatrix} L \\ R \end{bmatrix} = \begin{bmatrix} m_{11}(f) & 0 \\ 0 & m_{22}(f) \end{bmatrix}\begin{bmatrix} L \\ R \end{bmatrix} \tag{34}$$

with $$m_{11}(f) = \exp(-2\pi jfD(L))H(L, z = \exp(2\pi jf)) \tag{35}$$

$$m_{22}(f) = \exp(-2\pi jfD(R))H(R, z = \exp(2\pi jf)) \tag{36}$$

If the headtracking data changes over time, the calculation block 2210 may re-calculate a new matrix for each frequency band, and subsequently change the matrix (implemented by the matrixing block 2220) to the newly obtained matrix in each band. For improved quality, the calculation block 2210 may use interpolation when generating the input matrix 2212 for the new matrix, to ensure a smooth transition from one set of matrix coefficients to the next. The calculation block 2210 may apply the interpolation to the real and imaginary parts of the matrix independently, or may operate on the magnitude and phase of the matrix coefficients.

The system 2200 does not necessarily include channel mixing, since there are no cross terms between the left and right signals (see also the system 2100 of FIG. 21). However, channel mixing may be added to the system 2200 by adding a 2×2 matrix $M_{mix}$ for channel mixing. The matrixing block 2220 then implements the 2×2, complex-valued combined matrix expression of Equation 37:

$$\begin{bmatrix} L' \\ R' \end{bmatrix} = M_{Head}M_{mix}\begin{bmatrix} L \\ R \end{bmatrix} \tag{37}$$

Figure 23:
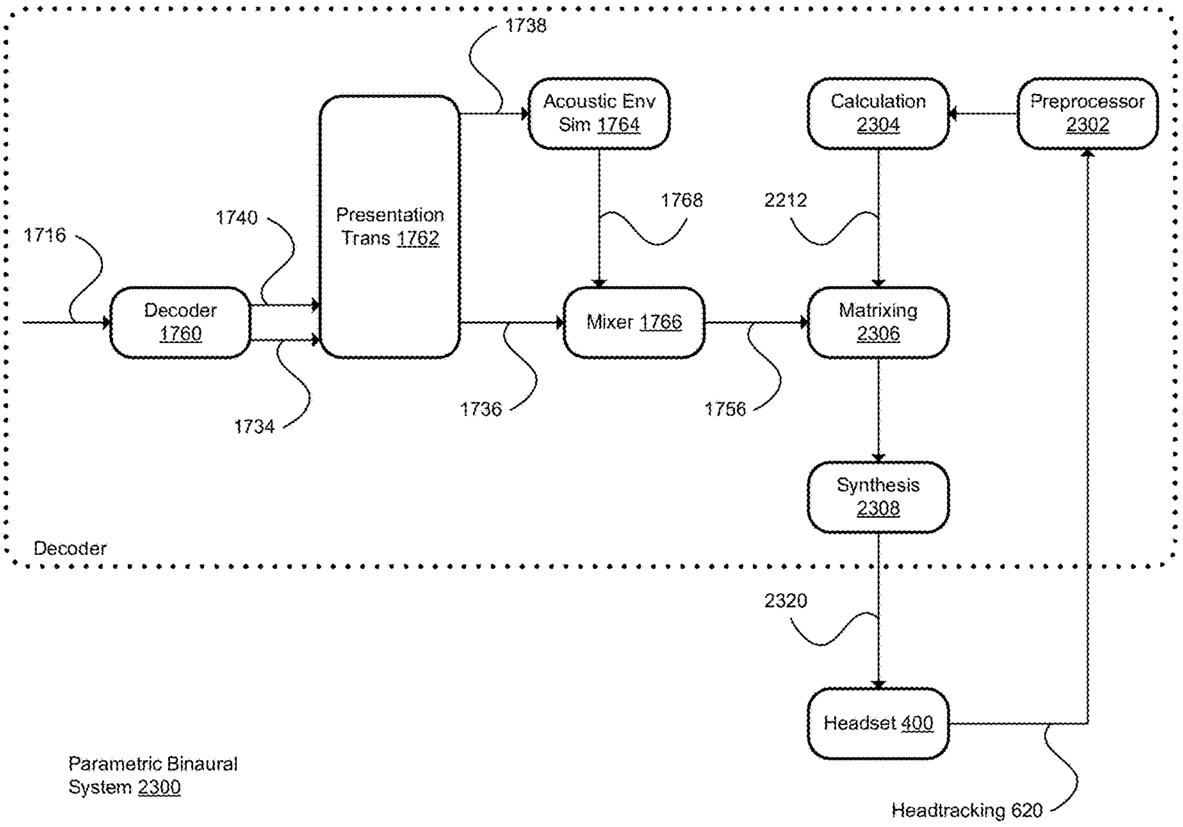
FIG. 23 is a block diagram of a parametric binaural system 2300 that modifies a stereo input signal (e.g., 1716) using headtracking information.

FIG. 23 is a block diagram of a parametric binaural system 2300 that modifies a stereo input signal (e.g., 1716) using headtracking information. The system 2300 generally adds headtracking to the decoder block 1750 (see FIG. 17), and uses similar names and labels for similar components and signals. The system 2300 is similar to the system 2000, in that the headtracking is applied after the mixing. The system 2300 may be implemented by electronics or by a computer system that includes electronics (e.g., the electronics 500 of FIG. 5). The system 2300 may connect to, or be a component of, a headset (e.g., the headset 400 of FIG. 4). The system 2300 includes a decoder block 1760, a presentation transformation block 1762, an acoustic environment simulator 1764, and a mixer 1766, which (along with the labeled signals) operate as described above in FIG. 17. The system 2300 also includes a preprocessor 2302, a calculation block 2304, a matrixing block 2306, and a synthesis block 2308.

Regarding the components mentioned before: Briefly, the decoder block 1760 generates a frequency-domain representation of the loudspeaker presentation (the loudspeaker signal LoRo 1734) and parameter data (the presentation transformation parameters W 1740). The matrixing block 1762 uses the presentation transformation parameters W 1740 to transform the loudspeaker signal LoRo 1734 into an anechoic binaural presentation (the anechoic binaural signal LaRa 1736) and the acoustic environment simulation input information ASin 1738 by means of a matrixing operation per frequency band. The acoustic environment simulator 1764 performs acoustic environment simulation using the acoustic environment simulation input information ASin 1738 to generate the acoustic environment simulation output information ASout 1768. The mixer 1766 mixes the anechoic binaural signal LaRa 1736 and the acoustic environment simulation output information ASout 1768 to generate the decoded signal 1756. The mixer 1766 may be similar to the mixer 2040 (see FIG. 20), where the anechoic binaural signal LaRa 1736 corresponds to the combination of the left anechoic signal La 1842 and the right anechoic signal Ra 1844, and the decoded signal 1756 corresponds to the left binaural signal Lb 2042 and the right binaural signal Rb 2044.

The preprocessor 2302 generally performs processing of the headtracking data 620 from the headtracking sensor (e.g., 512 in FIG. 5) to generate preprocessed headtracking data. The preprocessor 2302 may implement processing similar to that of the head angle processor 902 (see FIG. 9) or the preprocessor 1202 (see FIG. 12), as detailed above. The preprocessor 2302 provides the preprocessed headtracking data to the calculation block 2304.

The calculation block 2304 generally operates on the preprocessed headtracking data from the preprocessor 2302 to generate the input matrix for the matrixing block 2306. The calculation block 2304 may be similar to the calculation block 2210 (see FIG. 22), providing the input matrix 2212 for each frequency band to the matrixing block 2306. The calculation block 2304 may implement the equations discussed above regarding the calculation block 2210.

The matrixing block 2306 generally applies the input matrix from the calculation block 2304 to each frequency band of the decoded signal 1756 to generate the input to the synthesis block 2308. The matrixing block 2306 may be similar to the matrixing block 2220 (see FIG. 22), and may apply the input matrix 2212 for each frequency band to the decoded signal 1756 (which includes the left binaural signal Lb 2042 and the right binaural signal Rb 2044 of FIG. 20).

The synthesis block 2308 generally performs frequency-to-time synthesis (e.g., HCQMF synthesis) on the decoded signal 1756 to generate a binaural signal 2320. The synthesis block 2308 may be implemented as two synthesis blocks, similar to the left synthesis block 2126 and the right synthesis block 2136 (see FIG. 21), to generate the output left signal L' 2142 and the output right signal R' 2152 as the binaural signal 2320. The headset 400 outputs the binaural signal 2320 (e.g., via respective left and right speakers).

Figure 24:
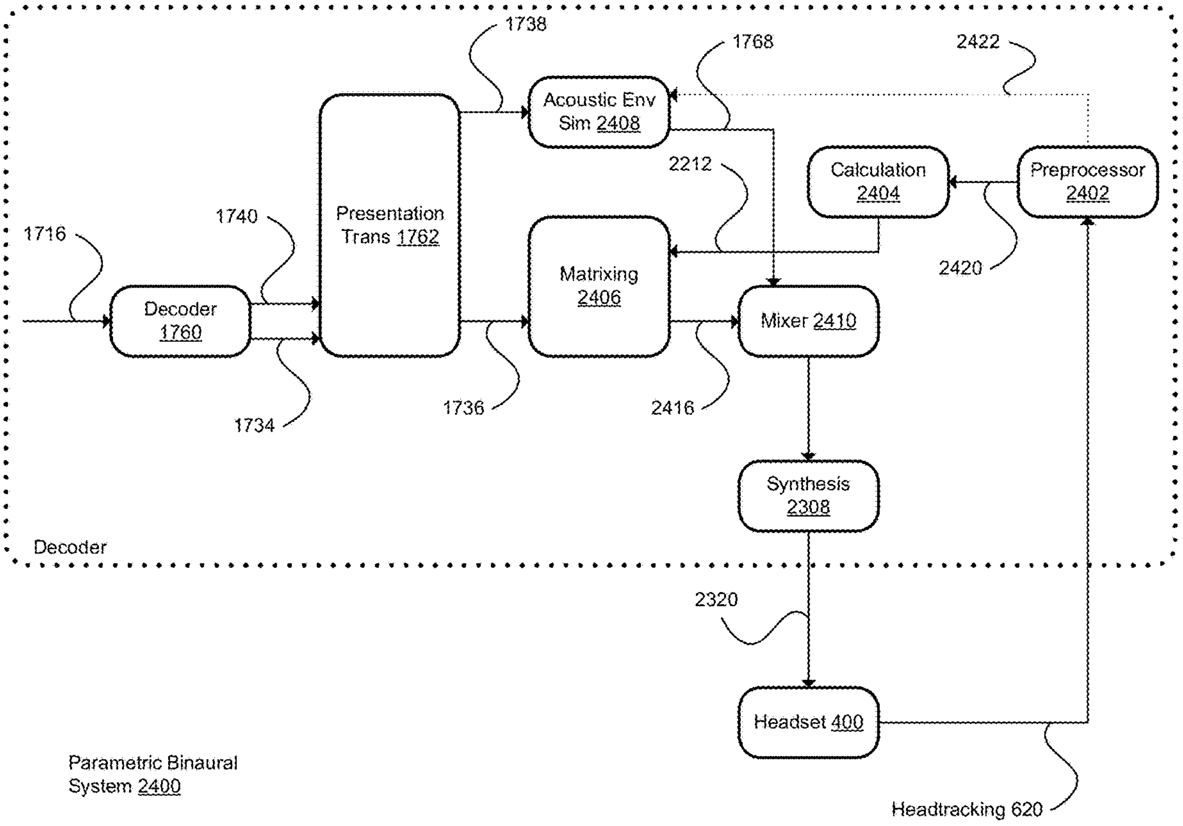
FIG. 24 is a block diagram of a parametric binaural system 2400 that modifies a stereo input signal (e.g., 1716) using headtracking information.

FIG. 24 is a block diagram of a parametric binaural system 2400 that modifies a stereo input signal (e.g., 1716) using headtracking information. The system 2400 generally adds headtracking to the decoder block 1750 (see FIG. 17), and uses similar names and labels for similar components and signals. The system 2400 is similar to the system 2300 (see FIG. 23), but applies the headtracking prior to the mixing. In this regard, the system 2400 is similar to the system 1800 (see FIG. 18) or the system 1900 (see FIG. 19). The system 2400 may be implemented by electronics or by a computer system that includes electronics (e.g., the electronics 500 of FIG. 5). The system 2400 may connect to, or be a component of, a headset (e.g., the headset 400 of FIG. 4). The system 2400 includes a decoder block 1760, a presentation transformation block 1762, and a synthesis block 2308, which operate as described above regarding the system 2300 (see FIG. 23). The system 2400 also includes a preprocessor 2402, a calculation block 2404, a matrixing block 2406, an acoustic environment simulator 2408, and a mixer 2410.

Regarding the components mentioned before: Briefly, the decoder block 1760 generates a frequency-domain representation of the loudspeaker presentation (the loudspeaker signal LoRo 1734) and presentation transformation parameter data (the presentation transformation parameters W 1740). The presentation transformation block 1762 uses the presentation transformation parameters W 1740 to transform the loudspeaker signal LoRo 1734 into an anechoic binaural presentation (the anechoic binaural signal LaRa 1736) and the acoustic environment simulation input information ASin 1738 by means of a matrixing operation per frequency band.

The preprocessor 2402 generally performs processing of the headtracking data 620 from the headtracking sensor (e.g., 512 in FIG. 5) to generate preprocessed headtracking data. The preprocessor 2302 may implement processing similar to that of the head angle processor 902 (see FIG. 9) or the preprocessor 1202 (see FIG. 12), as detailed above. The preprocessor 2402 provides preprocessed headtracking data 2420 to the calculation block 2404. As an option (shown by the dashed line), the preprocessor 2402 may provide preprocessed headtracking data 2422 to the acoustic environment simulator 2408.

The calculation block 2404 generally operates on the preprocessed headtracking data 2420 from the preprocessor 2302 to generate the input matrix for the matrixing block 2406. The calculation block 2404 may be similar to the calculation block 2210 (see FIG. 22), providing the input matrix 2212 for each frequency band to the matrixing block 2406. The calculation block 2404 may implement the equations discussed above regarding the calculation block 2210.

The matrixing block 2406 generally applies the input matrix from the calculation block 2404 to each frequency band of the anechoic binaural signal LaRa 1736 to generate a headtracked anechoic binaural signal 2416 for the mixer 2410. (Compare the matrixing block 2406 to the headtracking processor 1820 (see FIG. 18), where the headtracked anechoic binaural signal 2416 corresponds to the headtracked left anechoic signal LaTr 1852 and the headtracked right anechoic signal RaTr 1854.) As compared to the matrixing block 2306 (see FIG. 23), note that the matrixing block 2406 operates prior to the mixing block 2410, whereas the matrixing block 2306 operates after the mixing block 1766. In this manner, the matrixing block 2306 operates (indirectly) on the acoustic environment simulation output information ASout 1768, whereas the matrixing block 2406 does not.

The acoustic environment simulator 2408 generally performs acoustic environment simulation using the acoustic environment simulation input information ASin 1738 to generate the acoustic environment simulation output information ASout 1768. The acoustic environment simulator 2408 may be similar to the acoustic environment simulator 1764 (see FIG. 17). As an option (shown by the dashed line), the acoustic environment simulator 2408 may receive the preprocessed headtracking information 2422 from the preprocessor, and may modify the acoustic environment simulation output information ASout 1768 according to the preprocessed headtracking information 2422. In this option, the acoustic environment simulation output information ASout 1768 then may vary based on the headtracking information 620. One example of such variation would be to select impulse responses to apply. The acoustic environment simulation algorithm may store a range of binaural impulse responses into memory. Depending on the provided headtracking information, the acoustic environment simulation input may be convolved with one or another pair of impulse responses to generate the acoustic environment simulation output signal. Additionally, or alternatively, the acoustic environment simulation algorithm may simulate a pattern of early reflections. Depending on the headtracking information 620, the position or direction of the early reflection simulation may change.

The mixer 2410 generally mixes the acoustic environment simulation output information ASout 1768 and the headtracked anechoic binaural signal 2416 to generate a combined headtracked signal to the synthesis block 2308. The mixer 2410 may be similar to the mixer 1766 (see FIG. 17), but operating on the headtracked anechoic binaural signal 2416 instead of the anechoic binaural signal LaRa 1736.

The synthesis block 2308 operates in a manner similar to that discussed above regarding FIG. 23, and the headset 400 outputs the binaural signal 2320 (e.g., via respective left and right speakers).

Figure 25:
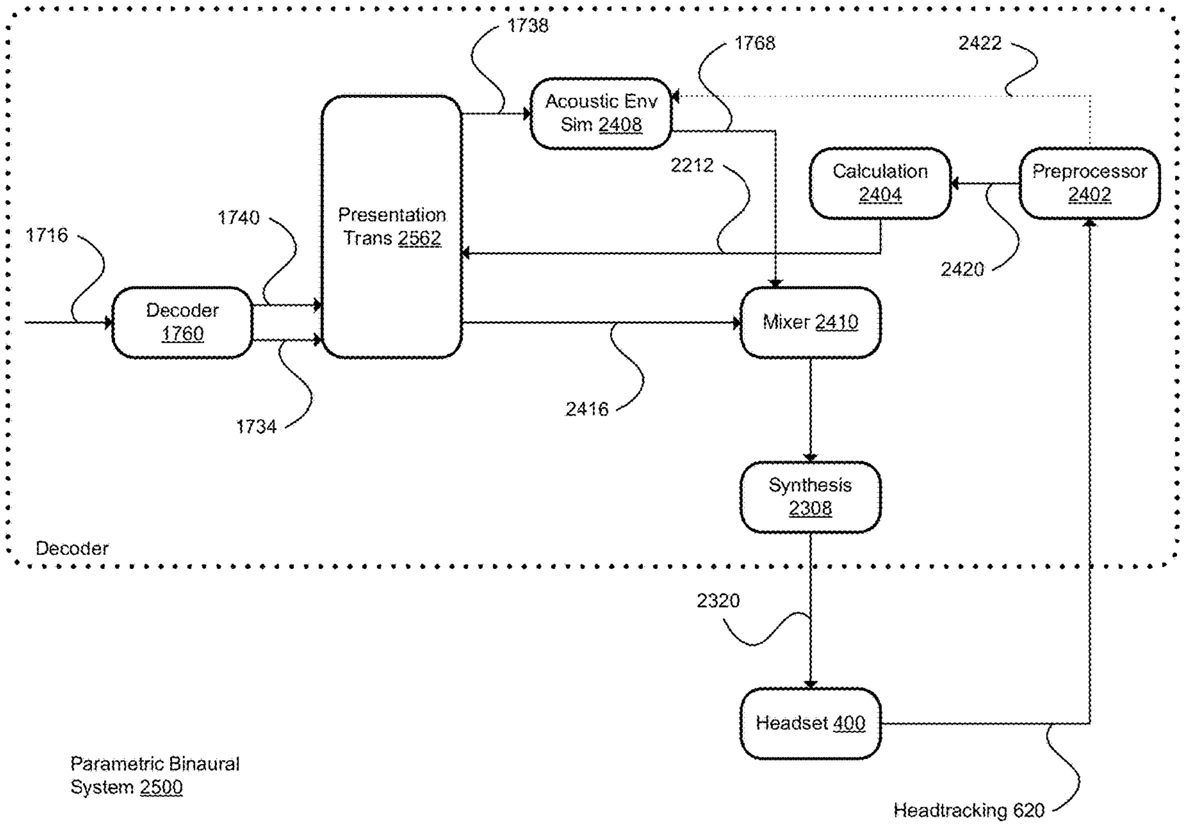
FIG. 25 is a block diagram of a parametric binaural system 2500 that modifies a stereo input signal (e.g., 1716) using headtracking information.

FIG. 25 is a block diagram of a parametric binaural system 2500 that modifies a stereo input signal (e.g., 1716) using headtracking information. The system 2500 generally adds headtracking to the decoder block 1750 (see FIG. 17), and uses similar names and labels for similar components and signals. The system 2500 is similar to the system 2400 (see FIG. 24), but with a single presentation transformation block. The system 2500 may be implemented by electronics or by a computer system that includes electronics (e.g., the electronics 500 of FIG. 5). The system 2500 may connect to, or be a component of, a headset (e.g., the headset 400 of FIG. 4). The system 2500 includes a decoder block 1760, a preprocessor 2402, a calculation block 2404, an acoustic environment simulator 2408 (including the option to receive the preprocessed headtracking information 2422), a mixer 2410, and a synthesis block 2308, which operate as described above regarding the system 2400 (see FIG. 24). The system 2500 also includes a presentation transformation block 2562.

The presentation transformation block 2562 combines the operations of the presentation transformation block 1762 and the matrixing block 2406 (see FIG. 24) in a single matrix. The presentation transformation block 2562 generates the acoustic environment simulation input information ASin 1738 in a manner similar to the presentation transformation block 1762. However, the presentation transformation block 2562 uses the input matrix from the calculation block 2404 in order to apply the headtracking information to the loudspeaker signal LoRo 1734, to generate the headtracked anechoic binaural signal 2416. The matrix to be applied in the presentation transformation block 2562 follows from matrix multiplication as follows. The presentation transformation process to convert LoRo 1734 into La 1842 and Ra 1844 (collectively, LaRa 1736) is assumed to be represented by 2×2 input-output matrix $M_{trans}$ Furthermore, the headtracking matrix 2306 to convert LaRa 1756 into head-tracked LaRa is assumed to be represented by 2×2 input-output matrix $M_{head}$. In this case, the combined matrix $M_{combined}$ to be applied by the presentation transformation block 2562 is then given by:

$$M_{combined}=M_{head}M_{trans} \quad (38)$$

The headtracking matrix $M_{head}$ will be equal to a unity matrix if no headtracking is supported, or when no positional changes of the head with respect to a reference position or orientation are detected. In the above example, the acoustic environment simulation input signal is not taken into account.

The synthesis block 2308 operates in a manner similar to that discussed above regarding FIG. 24, and the headset 400 outputs the binaural signal 2320 (e.g., via respective left and right speakers).

Figure 26:
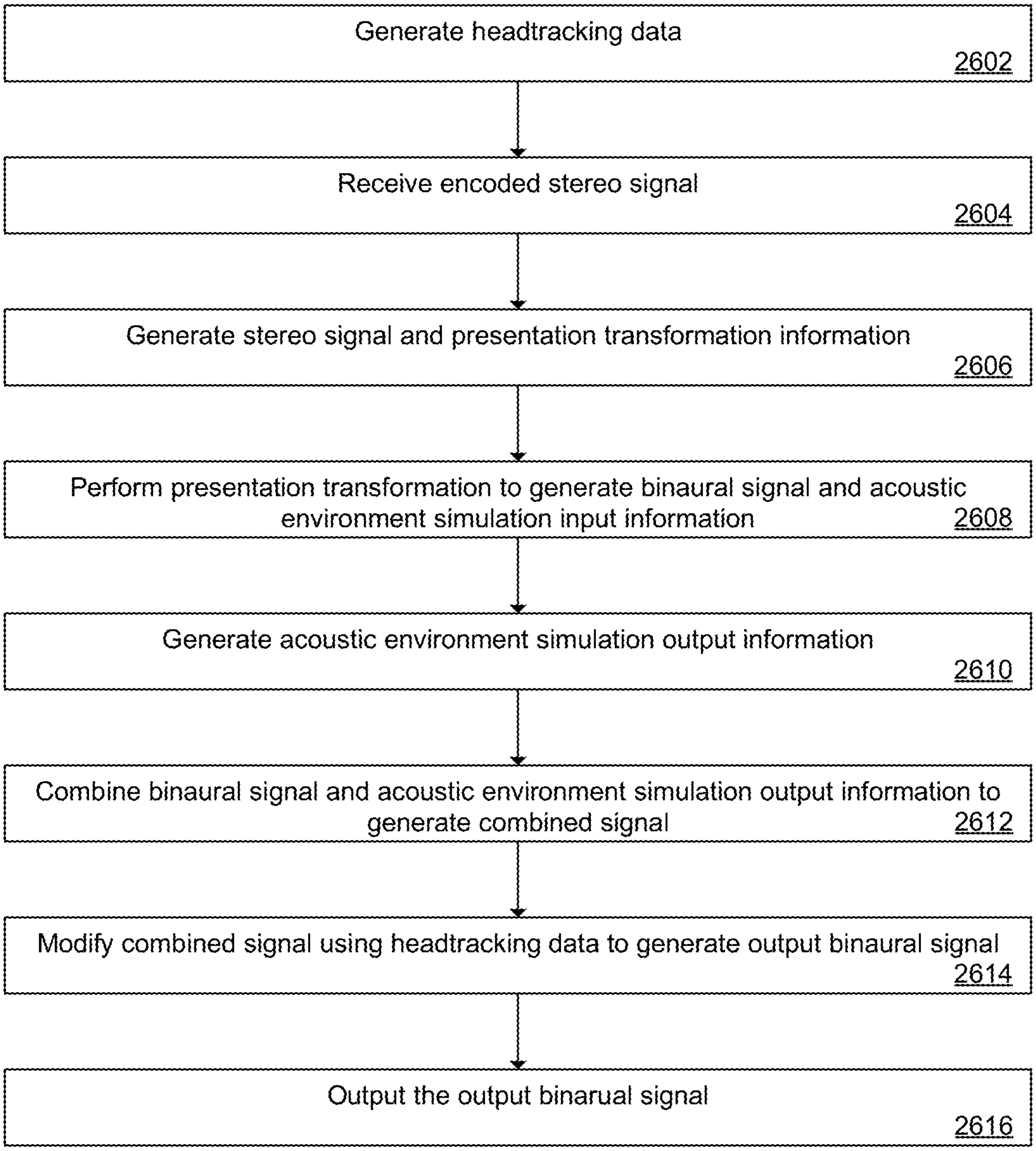
FIG. 26 is a flowchart of a method 2600 of modifying a parametric binaural signal using headtracking information.

FIG. 26 is a flowchart of a method 2600 of modifying a parametric binaural signal using headtracking information. The method 2600 may be performed by the system 2300 (see FIG. 23). The method 2600 may be implemented as a computer program that is stored by a memory of a system (e.g., the memory 504 of FIG. 5) or executed by a processor of a system (e.g., the processor 502 of FIG. 5).

At 2602, headtracking data is generated. The headtracking data relates to an orientation of a headset. A sensor may generate the headtracking data. For example, the headset 400 (see FIG. 4 and FIG. 23) may include the sensor 512 (see FIG. 5) that generates the headtracking data 620.

At 2604, an encoded stereo signal is received. The encoded stereo signal may correspond to the parametric binaural signal. The encoded stereo signal includes a stereo signal and presentation transformation information. The presentation transformation information relates the stereo signal to a binaural signal. For example, the system 2300 (see FIG. 23) receives the encoded signal 1716 as the encoded stereo signal. The encoded signal 1716 includes the loudspeaker signal LoRo 1734 and the presentation transformation parameters W 1740 (see the inputs to the encoder block 1730 in FIG. 17). The presentation transformation parameters W 1740 relate the loudspeaker signal LoRo 1734 to the anechoic binaural signal LaRa 1736 (note that the presentation transformation parameter estimation block 1728 of FIG. 17 uses the presentation transformation parameters W 1740 and the acoustic environment simulation input information ASin 1738 to relate the loudspeaker signal LoRo 1734 and the anechoic binaural signal LaRa 1736).

At 2606, the encoded stereo signal is decoded to generate the stereo signal and the presentation transformation information. For example, the decoder block 1760 (see FIG. 23) decodes the encoded signal 1716 to generate the loudspeaker signal LoRo 1734 and the presentation transformation parameters W 1740.

At 2608, presentation transformation is performed on the stereo signal using the presentation transformation information to generate the binaural signal and acoustic environment simulation input information. For example, the presentation transformation block 1762 (see FIG. 23) performs presentation transformation on the loudspeaker signal LoRo 1734 using the presentation transformation parameters W 1740 to generate the anechoic binaural signal LaRa 1736 and the acoustic environment simulation input information ASin 1738.

At 2610, acoustic environment simulation is performed on the acoustic environment simulation input information to generate acoustic environment simulation output information. For example, the acoustic environment simulator 1764 (see FIG. 23) performs acoustic environment simulation on the acoustic environment simulation input information ASin 1738 to generate the acoustic environment simulation output information ASout 1768.

At 2612, the binaural signal and the acoustic environment simulation output information are combined to generate a combined signal. For example, the mixer 1766 (see FIG. 23) combines the anechoic binaural signal LaRa 1736 and the acoustic environment simulation output information ASout 1768 to generate the decoded signal 1756.

At 2614, the combined signal is modified using the headtracking data to generate an output binaural signal. For example, the matrixing block 2306 (see FIG. 23) modifies the decoded signal 1756 using the input matrix 2212, which is calculated by the calculation block 2304 according to the headtracking data 620 (via the preprocessor 2302), to generate (with the synthesis block 2308) the binaural signal 2320.

At 2616, the output binaural signal is output. The output binaural signal may be output by at least two speakers. For example, the headset 400 (see FIG. 23) may output the binaural signal 2320.

The method 2600 may include further steps or substeps, e.g. to implement other of the features discussed above regarding FIGS. 17-23. For example, the step 2614 may include the substeps of calculating matrix parameters (e.g., by the calculation block 2304), performing matrixing (e.g., by the matrixing block 2306), and performing frequency-to-time synthesis (e.g., by the synthesis block 2308).

Figure 27:
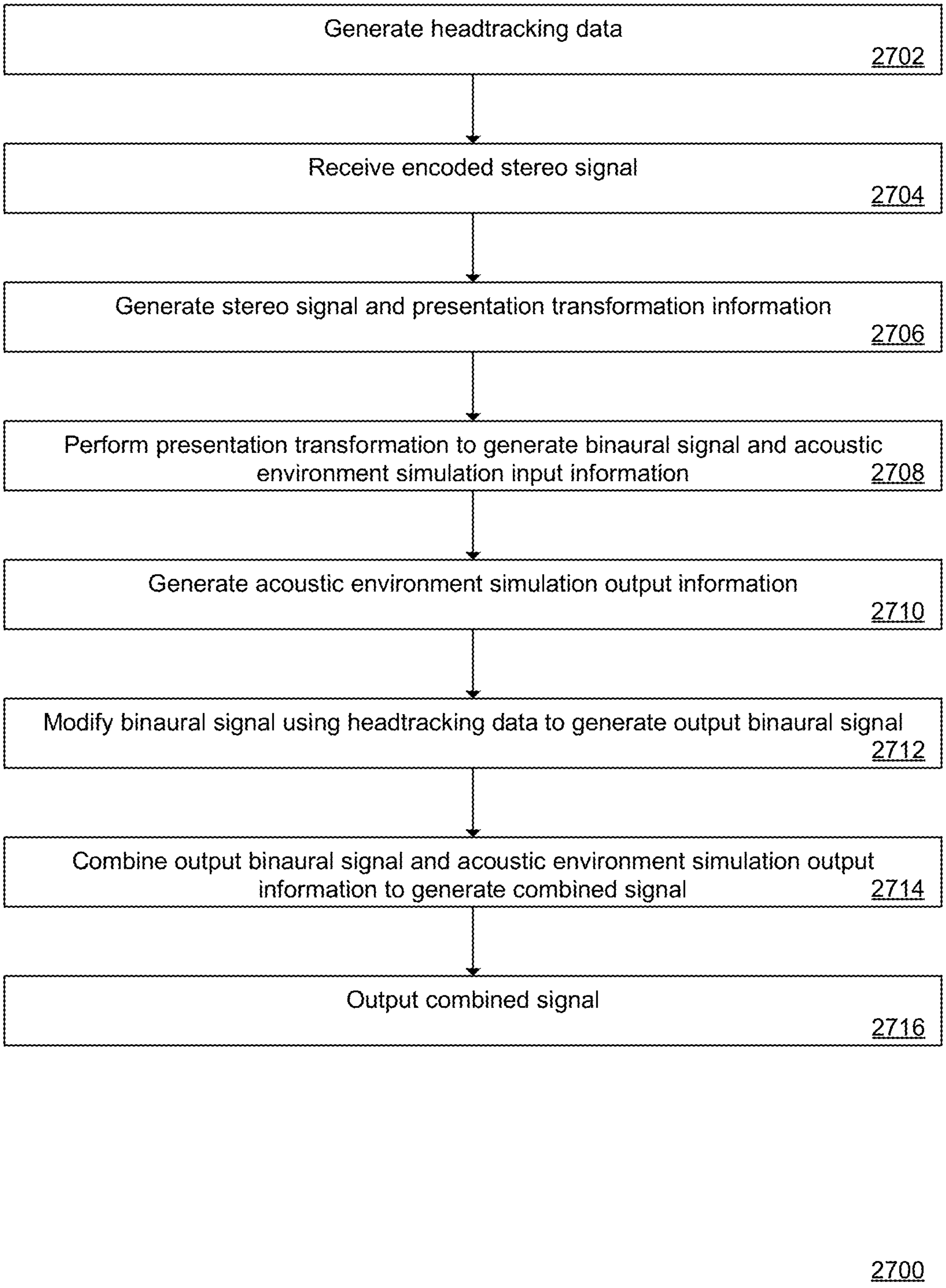
FIG. 27 is a flowchart of a method 2700 of modifying a parametric binaural signal using headtracking information.

FIG. 27 is a flowchart of a method 2700 of modifying a parametric binaural signal using headtracking information. The method 2700 may be performed by the system 2400 (see FIG. 24). Note that as compared to the method 2600 (see FIG. 26), the method 2700 applies the headtracking matrixing prior to combining, whereas the method 2600 performs the combining at 2612 prior to applying the headtracking at 2614. The method 2700 may be implemented as a computer program that is stored by a memory of a system (e.g., the memory 504 of FIG. 5) or executed by a processor of a system (e.g., the processor 502 of FIG. 5).

At 2702, headtracking data is generated. The headtracking data relates to an orientation of a headset. A sensor may generate the headtracking data. For example, the headset 400 (see FIG. 4 and FIG. 24) may include the sensor 512 (see FIG. 5) that generates the headtracking data 620.

At 2704, an encoded stereo signal is received. The encoded stereo signal may correspond to the parametric binaural signal. The encoded stereo signal includes a stereo signal and presentation transformation information. The presentation transformation information relates the stereo signal to a binaural signal. For example, the system 2400 (see FIG. 24) receives the encoded signal 1716 as the encoded stereo signal. The encoded signal 1716 includes the loudspeaker signal LoRo 1734 and the presentation transformation parameters W 1740 (see the inputs to the encoder block 1730 in FIG. 17). The presentation transformation parameters W 1740 relate the loudspeaker signal LoRo 1734 to the anechoic binaural signal LaRa 1736 (note that the presentation transformation parameter estimation block 1728 of FIG. 17 uses the presentation transformation parameters W 1740 and the acoustic environment simulation input information ASin 1738 to relate the loudspeaker signal LoRo 1734 and the anechoic binaural signal LaRa 1736).

At 2706, the encoded stereo signal is decoded to generate the stereo signal and the presentation transformation information. For example, the decoder block 1760 (see FIG. 24) decodes the encoded signal 1716 to generate the loudspeaker signal LoRo 1734 and the presentation transformation parameters W 1740.

At 2708, presentation transformation is performed on the stereo signal using the presentation transformation information to generate the binaural signal and acoustic environment simulation input information. For example, the presentation transformation block 1762 (see FIG. 24) performs presentation transformation on the loudspeaker signal LoRo 1734 using the presentation transformation parameters W 1740 to generate the anechoic binaural signal LaRa 1736 and the acoustic environment simulation input information ASin 1738.

At 2710, acoustic environment simulation is performed on the acoustic environment simulation input information to generate acoustic environment simulation output information. For example, the acoustic environment simulator 2408 (see FIG. 24) performs acoustic environment simulation on the acoustic environment simulation input information ASin 1738 to generate the acoustic environment simulation output information ASout 1768.

Optionally, the acoustic environment simulation output information ASout 1768 is modified according to the headtracking data. For example, the preprocessor 2402 (see FIG. 24) preprocesses the headtracking data 620 to generate the preprocessed headtracking information 2422, which the acoustic environment simulator 2408 uses to modify the acoustic environment simulation output information ASout 1768.

At 2712, the binaural signal is modified using the headtracking data to generate an output binaural signal. For example, the matrixing block 2406 (see FIG. 24) modifies the anechoic binaural signal LaRa 1736 using the input matrix 2212, which is calculated by the calculation block 2404 according to the headtracking data 620 (via the preprocessor 2402), to generate the headtracked anechoic binaural signal 2416.

At 2714, the output binaural signal and the acoustic environment simulation output information are combined to generate a combined signal. For example, the mixer 2410 (see FIG. 24) combines the headtracked anechoic binaural signal 2416 and the acoustic environment simulation output information ASout 1768 to generate (with the synthesis block 2308) the binaural signal 2320.

At 2716, the combined signal is output. The combined signal may be output by at least two speakers. For example, the headset 400 (see FIG. 24) may output the binaural signal 2320.

The method 2700 may include further steps or substeps, e.g. to implement other of the features discussed above regarding FIGS. 17-22 and 24. For example, the step 2712 may include the substeps of calculating an input matrix based on the headtracking data (e.g., by the calculation block 2404), and matrixing the binaural signal using the input matrix (e.g., by the matrixing block 2406) to generate the output binaural signal.

Figure 28:
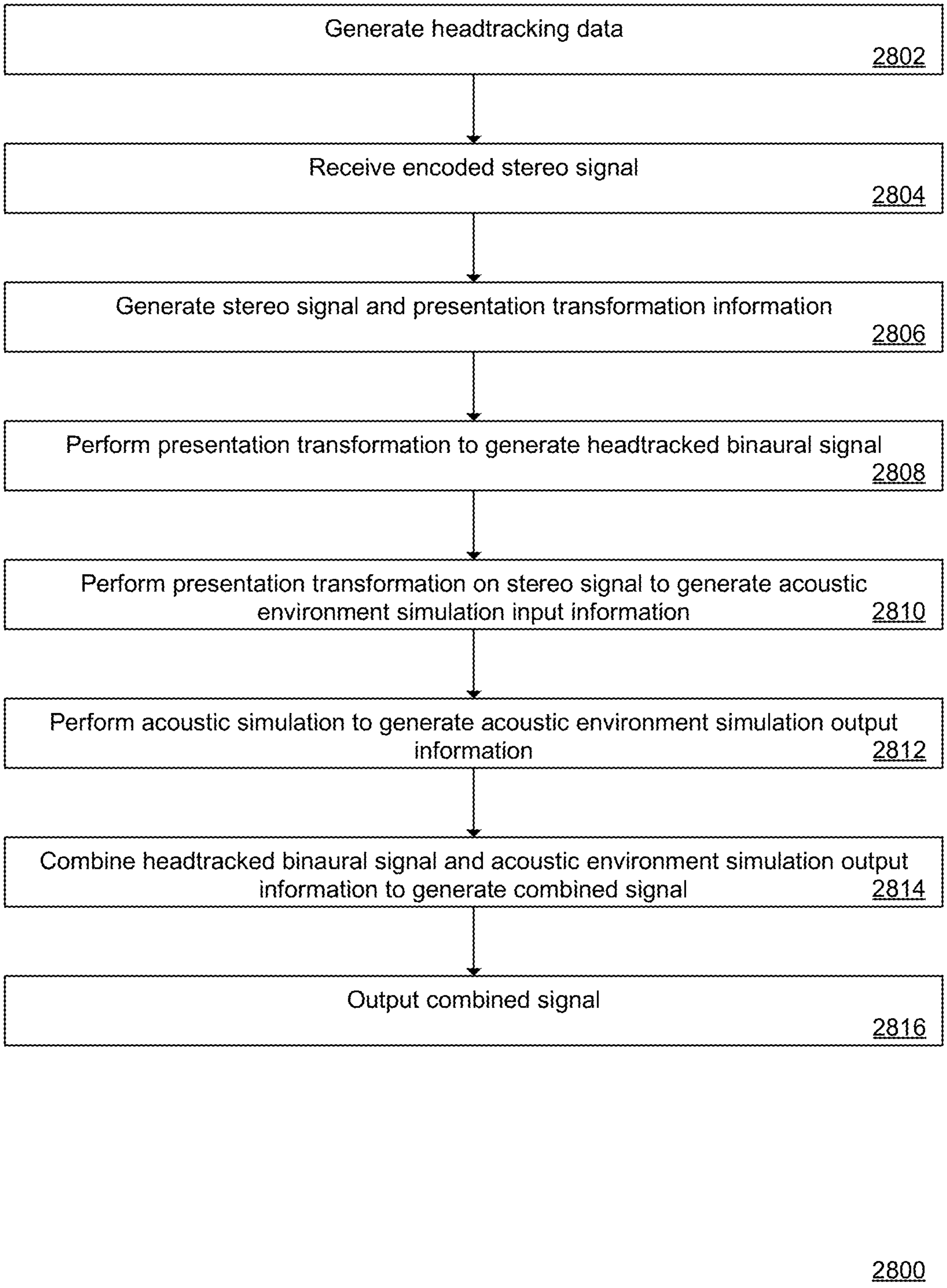
FIG. 28 is a flowchart of a method 2800 of modifying a parametric binaural signal using headtracking information.

FIG. 28 is a flowchart of a method 2800 of modifying a parametric binaural signal using headtracking information. The method 2800 may be performed by the system 2500 (see FIG. 25). Note that as compared to the method 2700 (see FIG. 25), the method 2800 applies the headtracking in the first matrix, whereas the method 2700 applies the headtracking in the second matrix (see 2712). The method 2800 may be implemented as a computer program that is stored by a memory of a system (e.g., the memory 504 of FIG. 5) or executed by a processor of a system (e.g., the processor 502 of FIG. 5).

At 2802, headtracking data is generated. The headtracking data relates to an orientation of a headset. A sensor may generate the headtracking data. For example, the headset 400 (see FIG. 4 and FIG. 25) may include the sensor 512 (see FIG. 5) that generates the headtracking data 620.

At 2804, an encoded stereo signal is received. The encoded stereo signal may correspond to the parametric binaural signal. The encoded stereo signal includes a stereo signal and presentation transformation information. The presentation transformation information relates the stereo signal to a binaural signal. For example, the system 2500 (see FIG. 25) receives the encoded signal 1716 as the encoded stereo signal. The encoded signal 1716 includes the loudspeaker signal LoRo 1734 and the presentation transformation parameters W 1740 (see the inputs to the encoder block 1730 in FIG. 17). The presentation transformation parameters W 1740 relate the loudspeaker signal LoRo 1734 to the anechoic binaural signal LaRa 1736 (note that the presentation transformation parameter estimation block 1728 of FIG. 17 uses the presentation transformation parameters W 1740 and the acoustic environment simulation input information ASin 1738 to relate the loudspeaker signal LoRo 1734 and the anechoic binaural signal LaRa 1736).

At 2806, the encoded stereo signal is decoded to generate the stereo signal and the presentation transformation information. For example, the decoder block 1760 (see FIG. 25) decodes the encoded signal 1716 to generate the loudspeaker signal LoRo 1734 and the presentation transformation parameters W 1740.

At 2808, presentation transformation is performed on the stereo signal using the presentation transformation information and the headtracking data to generate a headtracked binaural signal. The headtracked binaural signal corresponds to the binaural signal having been matrixed. For example, the presentation transformation block 2562 (see FIG. 25) applies the input matrix 2212 (which is based on the headtracking data 620) to the loudspeaker signal LoRo 1734 using the presentation transformation parameters W 1740 to generate the headtracked anechoic binaural signal 2416.

At 2810, presentation transformation is performed on the stereo signal using the presentation transformation information to generate acoustic environment simulation input information. For example, the presentation transformation block 2562 (see FIG. 25) performs presentation transformation on the loudspeaker signal LoRo 1734 using the presentation transformation parameters W 1740 to generate the acoustic environment simulation input information ASin 1738.

At 2812, acoustic environment simulation is performed on the acoustic environment simulation input information to generate acoustic environment simulation output information.

For example, the acoustic environment simulator 2408 (see FIG. 25) performs acoustic environment simulation on the acoustic environment simulation input information ASin 1738 to generate the acoustic environment simulation output information ASout 1768.

Optionally, the acoustic environment simulation output information ASout 1768 is modified according to the headtracking data. For example, the preprocessor 2402 (see FIG. 25) preprocesses the headtracking data 620 to generate the preprocessed headtracking information 2422, which the acoustic environment simulator 2408 uses to modify the acoustic environment simulation output information ASout 1768.

At 2814, the headtracked binaural signal and the acoustic environment simulation output information are combined to generate a combined signal. For example, the mixer 2410 (see FIG. 25) combines the headtracked anechoic binaural signal 2416 and the acoustic environment simulation output information ASout 1768 to generate (with the synthesis block 2308) the binaural signal 2320.

At 2816, the combined signal is output. The combined signal may be output by at least two speakers. For example, the headset 400 (see FIG. 25) may output the binaural signal 2320.

The method 2800 may include further steps or substeps, e.g. to implement other of the features discussed above regarding FIGS. 17-22 and 25. For example, the step 2808 may include the substeps of calculating an input matrix based on the headtracking data (e.g., by the calculation block 2404), and matrixing the stereo signal using the input matrix (e.g., by the presentation transformation block 2562) to generate the headtracked binaural signal.

Figure 29:
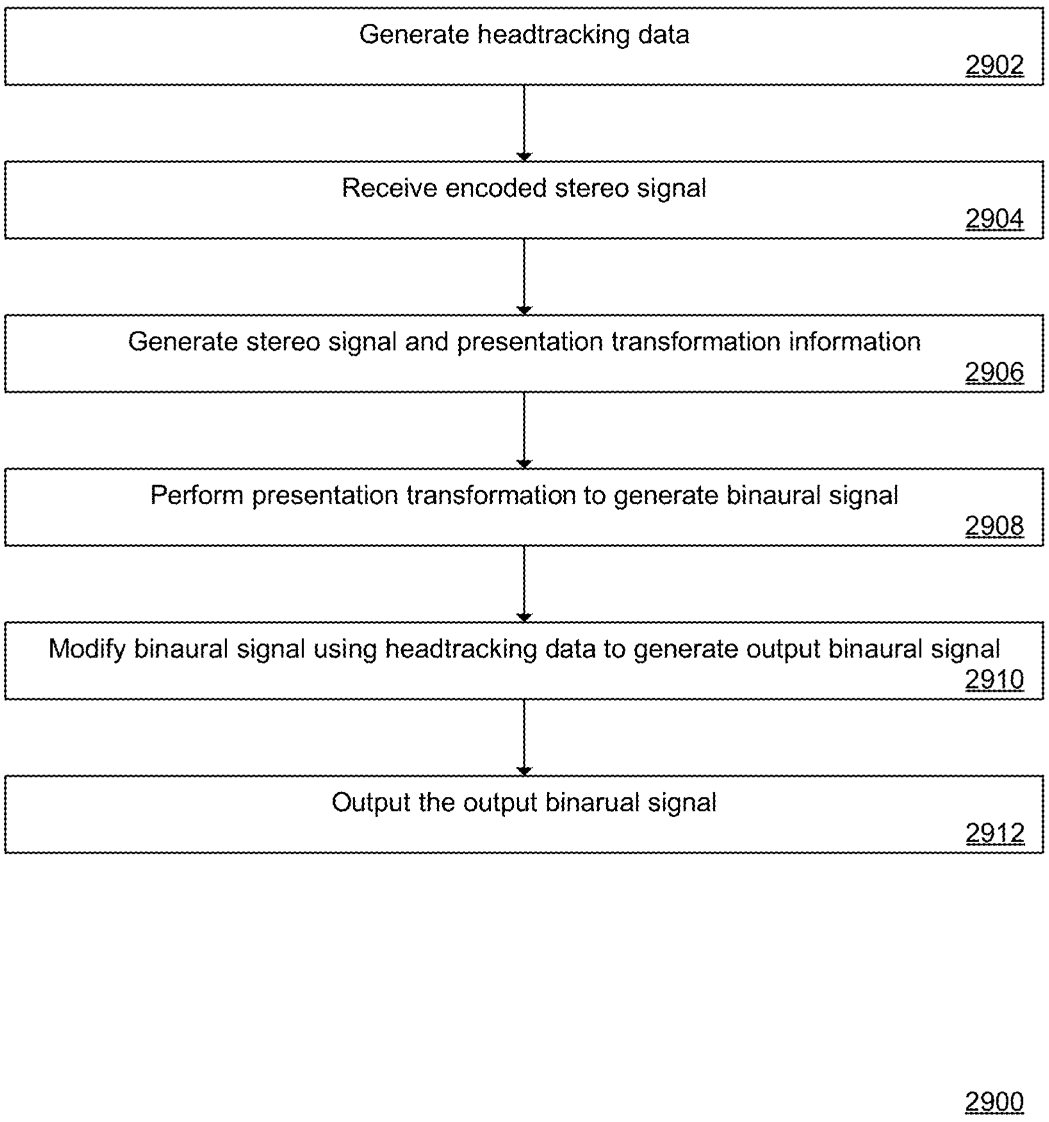
FIG. 29 is a flowchart of a method 2900 of modifying a parametric binaural signal using headtracking information.

FIG. 29 is a flowchart of a method 2900 of modifying a parametric binaural signal using headtracking information. The method 2900 may be performed by the system 2300 (see FIG. 23), modified as follows: The acoustic environment simulator 1764 and mixer 1766 are omitted, and the matrixing block 2306 operates on the anechoic binaural signal LaRa 1736 (instead of on the decoded signal 1756). The method 2900 may be implemented as a computer program that is stored by a memory of a system (e.g., the memory 504 of FIG. 5) or executed by a processor of a system (e.g., the processor 502 of FIG. 5).

At 2902, headtracking data is generated. The headtracking data relates to an orientation of a headset. A sensor may generate the headtracking data. For example, the headset 400 (see FIG. 4 and FIG. 23) may include the sensor 512 (see FIG. 5) that generates the headtracking data 620.

At 2904, an encoded stereo signal is received. The encoded stereo signal may correspond to the parametric binaural signal. The encoded stereo signal includes a stereo signal and presentation transformation information. The presentation transformation information relates the stereo signal to a binaural signal. For example, the system 2300 (see FIG. 23, and modified as discussed above) receives the encoded signal 1716 as the encoded stereo signal. The encoded signal 1716 includes the loudspeaker signal LoRo 1734 and the presentation transformation parameters W 1740 (see the inputs to the encoder block 1730 in FIG. 17). The presentation transformation parameters W 1740 relate the loudspeaker signal LoRo 1734 to the anechoic binaural signal LaRa 1736 (note that the presentation transformation parameter estimation block 1728 of FIG. 17 uses the presentation transformation parameters W 1740 and the acoustic environment simulation input information ASin 1738 to relate the loudspeaker signal LoRo 1734 and the anechoic binaural signal LaRa 1736).

At 2906, the encoded stereo signal is decoded to generate the stereo signal and the presentation transformation information. For example, the decoder block 1760 (see FIG. 23, and modified as discussed above) decodes the encoded signal 1716 to generate the loudspeaker signal LoRo 1734 and the presentation transformation parameters W 1740.

At 2908, presentation transformation is performed on the stereo signal using the presentation transformation information to generate the binaural signal. For example, the presentation transformation block 1762 (see FIG. 23, and modified as discussed above) performs presentation transformation on the loudspeaker signal LoRo 1734 using the presentation transformation parameters W 1740 to generate the anechoic binaural signal LaRa 1736.

At 2910, the binaural signal is modified using the headtracking data to generate an output binaural signal. For example, the matrixing block 2306 (see FIG. 23, and modified as discussed above) modifies the anechoic binaural signal LaRa 1736 using the input matrix 2212, which is calculated by the calculation block 2304 according to the headtracking data 620 (via the preprocessor 2302), to generate (with the synthesis block 2308) the binaural signal 2320.

At 2912, the output binaural signal is output. The output binaural signal may be output by at least two speakers. For example, the headset 400 (see FIG. 23, and modified as discussed above) may output the binaural signal 2320.

Note that as compared to the method 2600 (see FIG. 26), the method 2900 does not perform acoustic environment simulation, whereas the method 2600 performs acoustic environment simulation (note 2610). Thus, the method 2900 may be implemented with fewer components (e.g., by the system 2300 modified as discussed above), as compared to the unmodified system 2300 of FIG. 23.

Implementation Details

An embodiment may be implemented in hardware, executable modules stored on a computer readable medium, or a combination of both (e.g., programmable logic arrays). Unless otherwise specified, the steps executed by embodiments need not inherently be related to any particular computer or other apparatus, although they may be in certain embodiments. In particular, various general-purpose machines may be used with programs written in accordance with the teachings herein, or it may be more convenient to construct more specialized apparatus (e.g., integrated circuits) to perform the required method steps. Thus, embodiments may be implemented in one or more computer programs executing on one or more programmable computer systems each comprising at least one processor, at least one data storage system (including volatile and non-volatile memory and/or storage elements), at least one input device or port, and at least one output device or port. Program code is applied to input data to perform the functions described herein and generate output information. The output information is applied to one or more output devices, in known fashion.

Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a non-transitory computer-readable storage medium, configured with a computer program, where the storage medium so configured causes a computer system to operate in a specific and predefined manner to perform the functions described herein. (Software per se and intangible or transitory signals are excluded to the extent that they are unpatentable subject matter.)

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method of modifying a binaural signal using headtracking information, the method comprising:

receiving, by a headset, a binaural audio signal;

upmixing the binaural audio signal into a four-channel binaural signal, wherein the four-channel binaural signal includes a front binaural signal and a rear binaural signal;

generating, by a sensor, headtracking data, wherein the headtracking data relates to an orientation of the headset;

applying the headtracking data to the front binaural signal to generate a modified front binaural signal;

applying an inverse of the headtracking data to the rear binaural signal to generate a modified rear binaural signal;

combining the modified front binaural signal and the modified rear binaural signal to generate a combined binaural signal; and outputting, by at least two speakers of the headset, the combined binaural signal.

2. The method of claim 1, wherein upmixing the binaural audio signal comprises upmixing the binaural audio signal into a four-channel binaural signal using metadata.

3. The method of claim 1, wherein upmixing the binaural audio signal comprises upmixing the binaural audio signal into a four-channel binaural signal using a signal model.

4. The method of claim 1, wherein upmixing the binaural audio signal comprises upmixing the binaural audio signal into a four-channel binaural signal using a signal model, wherein the signal model models the binaural audio signal as a single direct signal, a left diffuse signal, and a right diffuse signal.

5. The method of claim 1, wherein the front binaural signal includes a first signal and a second signal, wherein applying the headtracking data to the front signal to generate the modified front binaural signal comprises:

calculating, by a processor, a delay based on the headtracking data, a first filter response based on the headtracking data, and a second filter response based on the headtracking data;

applying the delay to one of the first signal and the second signal, based on the headtracking data, to generate a delayed signal, wherein an other of the first signal and the second signal is an undelayed signal;

applying the first filter response to the delayed signal to generate a modified delayed signal; and applying the second filter response to the undelayed signal to generate a modified undelayed signal, wherein the modified front binaural signal includes the modified delayed signal and the modified undelayed signal.

6. The method of claim 1, wherein the rear binaural signal includes a first signal and a second signal, wherein applying the inverse of the headtracking data to the rear binaural signal to generate the modified rear binaural signal comprises:

inverting the headtracking data to generate the inverse of the headtracking data;

calculating, by a processor, a delay based on the inverse of the headtracking data, a first filter response based on the inverse of the headtracking data, and a second filter response based on the inverse of the headtracking data;

applying the delay to one of the first signal and the second signal, based on the inverse of the headtracking data, to generate a delayed signal, wherein an other of the first signal and the second signal is an undelayed signal;

applying the first filter response to the delayed signal to generate a modified delayed signal; and applying the second filter response to the undelayed signal to generate a modified undelayed signal, wherein the modified rear binaural signal includes the modified delayed signal and the modified undelayed signal.

* * * * *